US012622553B2

(12) United States Patent (10) Patent No.: US 12,622,553 B2

Schappler et al. (45) Date of Patent: May 12, 2026

---

(54) AGITATOR FOR A SURFACE TREATMENT APPARATUS AND A SURFACE TREATMENT APPARATUS HAVING THE SAME

(71) Applicant: SHARKNINJA OPERATING LLC, Needham, MA (US)

(72) Inventors: Devan Schappler, Bedford, NH (US); Max P. Lacoma, Huntington, NY (US); Xavier F. Cullere, Newton, MA (US); Daniel R. Der Marderosian, Westwood, MA (US); Charles S. Brunner, Stockton, NJ (US); Jeffery Zhang, Shenzhen (CN)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 17/869,439

(22) Filed: Jul. 20, 2022

(65) Prior Publication Data

US 2022/0354323 A1 Nov. 10, 2022

Related U.S. Application Data

(63) Continuation-in-part of application No. PCT/CN2022/101881, filed on Jun. 28, 2022, which (Continued)

(51) Int. Cl.
*A47L 9/04* (2006.01)
*A46B 9/00* (2006.01)
(Continued)

(52) U.S. Cl.
CPC ........... *A47L 9/0477* (2013.01); *A46B 9/005* (2013.01); *A46B 9/026* (2013.01); *A46B 9/06* (2013.01);
(Continued)

(58) Field of Classification Search
CPC ..... A47L 9/0477; A47L 9/0613; A46B 9/005; A46B 9/026; A46B 9/06; A46B 13/006;
(Continued)

(56) References Cited

U.S. PATENT DOCUMENTS 4,384,386 A 5/1983 Dorner et al.
5,056,181 A 10/1991 Tsuchiya et al.
(Continued)

FOREIGN PATENT DOCUMENTS

CN 1585615 2/2005
CN 102525340 7/2012
(Continued)

OTHER PUBLICATIONS

PCT Search Report and Written Opinion mailed Sep. 26, 2022, received in PCT Application No. PCT/CN2022/101881, 11 pages.
(Continued)

*Primary Examiner* — Marc Carlson
(74) *Attorney, Agent, or Firm* — Grossman Tucker Perreault & Pfleger, PLLC

(57) ABSTRACT

An agitator for a vacuum cleaner includes an agitator body and a resiliently deformable flap. The resiliently deformable flap includes a front face, a rear face, and one or more protrusions extending outwardly from the front face. An agitator for a vacuum cleaner includes an agitator body and a bristle strip and/or a plurality of tufts arranged in one or more rows along the agitator body. The bristle strip and/or a plurality of tufts includes a first bristle group including a plurality of nylon bristles and at least a second bristle group including a plurality of para-aramid bristles.

19 Claims, 62 Drawing Sheets

Related U.S. Application Data is a continuation-in-part of application No. 17/466,242, filed on Sep. 3, 2021, now Pat. No. 11,992,172, application No. 17/869,439 is a continuation-in-part of application No. 16/656,930, filed on Oct. 18, 2019, now Pat. No. 11,759,069.

(60) Provisional application No. 63/074,719, filed on Sep. 4, 2020.

(51) Int. Cl.

| | |
|---|---|
| *A46B 9/02* | (2006.01) |
| *A46B 9/06* | (2006.01) |
| *A46B 13/00* | (2006.01) |
| *A46B 13/02* | (2006.01) |
| *A46D 1/00* | (2006.01) |
| *B32B 3/30* | (2006.01) |
| *B32B 5/02* | (2006.01) |
| *B32B 25/10* | (2006.01) |
| *B32B 25/20* | (2006.01) |

(52) U.S. Cl.
CPC ............ *A46B 13/006* (2013.01); *A46B 13/02* (2013.01); *A46D 1/0207* (2013.01); *B32B 3/30* (2013.01); *B32B 25/10* (2013.01); *B32B 25/20* (2013.01); *A46B 2200/3033* (2013.01); *B32B 5/022* (2013.01); *B32B 5/024* (2013.01); *B32B 2262/0276* (2013.01); *B32B 2432/00* (2013.01)

(58) Field of Classification Search
CPC ............ A46B 13/02; A46B 2200/3033; A46D 1/0207; B32B 3/30; B32B 25/10; B32B 25/20; B32B 5/022; B32B 5/024; B32B 2262/0276; B32B 2432/00
See application file for complete search history.

(56) References Cited

U.S. PATENT DOCUMENTS

| | | | |
|---|---|---|---|
| 5,109,976 A | | 5/1992 | Mohri et al. |
| 5,611,109 A | | 3/1997 | Worwag |
| 6,237,188 B1 | | 5/2001 | Takemoto et al. |
| 6,367,781 B1 | | 4/2002 | Flynn et al. |
| 8,484,800 B2 | | 7/2013 | Forbes et al. |
| 8,601,643 B2 | | 12/2013 | Eriksson |
| 9,066,640 B2 | | 6/2015 | Iles et al. |
| 9,295,362 B2 | | 3/2016 | Eriksson |
| 9,314,140 B2 | | 4/2016 | Eriksson |
| 10,925,447 B2 | | 2/2021 | Der Marderosian et al. |
| 11,247,245 B2 | | 2/2022 | Brown et al. |
| 11,759,069 B2 | | 9/2023 | Cacin et al. |
| 2002/0124334 A1 | | 9/2002 | Worwag |
| 2005/0060839 A1 | | 3/2005 | Nishinaka et al. |
| 2005/0125941 A1 | | 6/2005 | Joung et al. |
| 2008/0052846 A1 | | 3/2008 | Kapoor et al. |
| 2012/0110779 A1 | | 5/2012 | Jacobson |
| 2013/0058635 A1 | | 3/2013 | Vrdoljak |
| 2013/0152337 A1 | | 6/2013 | Thorne |
| 2013/0192021 A1 | | 8/2013 | Eriksson |
| 2014/0150201 A1 | | 6/2014 | McGee |
| 2015/0013102 A1 | | 1/2015 | Bilger |
| 2015/0040340 A1 | | 2/2015 | Bilger et al. |
| 2015/0135474 A1 | | 5/2015 | Gidwell |
| 2015/0297054 A1 | | 10/2015 | Weeks et al. |
| 2015/0351596 A1 | | 12/2015 | Thorne |
| 2016/0128530 A1 | | 5/2016 | Thorne et al. |
| 2016/0174793 A1 | | 6/2016 | Burke et al. |
| 2016/0220080 A1 | | 8/2016 | Thorne |
| 2016/0220081 A1 | | 8/2016 | Xu et al. |
| 2016/0220082 A1 | | 8/2016 | Thorne et al. |
| 2016/0324388 A1 | | 11/2016 | Vrdoljak et al. |
| 2016/0374533 A1 | | 12/2016 | Innes et al. |
| 2017/0042319 A1 | | 2/2017 | Conrad et al. |

| | | | |
|---|---|---|---|
| 2017/0112343 A1 | | 4/2017 | Innes et al. |
| 2017/0127896 A1 | | 5/2017 | Carter et al. |
| 2017/0144810 A1 | | 5/2017 | Birdsell |
| 2017/0172363 A1 | | 6/2017 | Eriksson et al. |
| 2017/0209008 A1 | | 7/2017 | Isley et al. |
| 2017/0215667 A1 | | 8/2017 | Thorne et al. |
| 2017/0280957 A1 | | 10/2017 | Jeong et al. |
| 2017/0347848 A1 | | 12/2017 | Carter et al. |
| 2018/0035854 A1 | | 2/2018 | Thorne |
| 2018/0064301 A1 | | 3/2018 | Cottrell et al. |
| 2018/0068815 A1 | | 3/2018 | Cottrell |
| 2018/0070785 A1 | | 3/2018 | Udy et al. |
| 2018/0146773 A1 | | 5/2018 | Kress |
| 2018/0255991 A1 | | 9/2018 | Der Marderosian et al. |
| 2018/0296046 A1 | | 10/2018 | Thorne et al. |
| 2018/0306432 A1 | | 10/2018 | Ognjen et al. |
| 2018/0325252 A1 | | 11/2018 | Hopke et al. |
| 2018/0338654 A1 | | 11/2018 | Kelsey |
| 2018/0338656 A1 | | 11/2018 | Carter et al. |
| 2019/0038098 A1 | | 2/2019 | Thorne et al. |
| 2019/0059668 A1 | | 2/2019 | Thorne et al. |
| 2019/0069740 A1 | | 3/2019 | Thorne et al. |
| 2019/0069744 A1 | | 3/2019 | Liggett et al. |
| 2019/0090701 A1 | | 3/2019 | Tonderys et al. |
| 2019/0090705 A1 | | 3/2019 | Thorne et al. |
| 2019/0191947 A1 | | 6/2019 | Freese et al. |
| 2019/0193120 A1 | | 6/2019 | Brown et al. |
| 2019/0246853 A1 | | 8/2019 | Sardar et al. |
| 2019/0274500 A1 | | 9/2019 | Thorne et al. |
| 2019/0274501 A1 | | 9/2019 | Antonisami et al. |
| 2019/0302793 A1 | | 10/2019 | Leech et al. |
| 2019/0320865 A1 | | 10/2019 | Brown et al. |
| 2019/0320866 A1 | | 10/2019 | Thorne et al. |
| 2019/0335968 A1 | | 11/2019 | Harting et al. |
| 2019/0343349 A1 | | 11/2019 | Clare et al. |
| 2019/0357740 A1 | | 11/2019 | Thorne et al. |
| 2020/0000298 A1 | | 1/2020 | Brown et al. |
| 2020/0022543 A1 | | 1/2020 | Gill et al. |
| 2020/0022544 A1 | | 1/2020 | Gill et al. |
| 2020/0022553 A1 | | 1/2020 | Gill et al. |
| 2020/0037833 A1 | | 2/2020 | Niedzwecki et al. |
| 2020/0037843 A1 | | 2/2020 | Fiebig et al. |
| 2020/0046184 A1 | | 2/2020 | Freese et al. |
| 2020/0077855 A1 | | 3/2020 | Brown et al. |
| 2020/0085267 A1 | | 3/2020 | Thorne et al. |
| 2020/0085269 A1 | | 3/2020 | Thorne |
| 2020/0121144 A1 | | 4/2020 | Gacin et al. |
| 2020/0121148 A1 | | 4/2020 | Hoffman et al. |
| 2020/0138260 A1 | | 5/2020 | Sutter et al. |
| 2020/0166949 A1 | | 5/2020 | Leech et al. |
| 2020/0170470 A1 | | 6/2020 | Liggett et al. |
| 2020/0201348 A1 | | 6/2020 | Leech |
| 2020/0205631 A1 | | 7/2020 | Brown et al. |
| 2020/0205634 A1 | | 7/2020 | Sutter et al. |
| 2020/0237171 A1 | | 7/2020 | Xu et al. |
| 2020/0288929 A1 | | 9/2020 | Brunner |
| 2020/0288930 A1 | | 9/2020 | Wells |
| 2020/0297172 A1 | | 9/2020 | Tonderys et al. |
| 2020/0301430 A1 | | 9/2020 | Irkliy et al. |
| 2020/0315418 A1 | | 10/2020 | Howard et al. |
| 2020/0345196 A1 | | 11/2020 | Innes et al. |
| 2020/0367711 A1 | | 11/2020 | Thorne et al. |
| 2020/0371526 A1 | | 11/2020 | Kamada |
| 2020/0383547 A1 | | 12/2020 | Sutter et al. |
| 2021/0007567 A1 | | 1/2021 | Kasper et al. |
| 2021/0007569 A1 | | 1/2021 | Howard et al. |
| 2021/0022574 A1 | | 1/2021 | Harting |
| 2021/0030227 A1 | | 2/2021 | Mathieu et al. |
| 2021/0038032 A1 | | 2/2021 | Brown |
| 2021/0059495 A1 | | 3/2021 | Gill et al. |
| 2021/0085144 A1 | | 3/2021 | Woodrow et al. |
| 2021/0169289 A1 | | 6/2021 | Thorne et al. |
| 2021/0175772 A1 | | 6/2021 | Aini |
| 2021/0177223 A1 | | 6/2021 | Der Marderosian et al. |
| 2021/0186282 A1 | | 6/2021 | Mathieu et al. |
| 2021/0204684 A1 | | 7/2021 | Heman-Ackah et al. |
| 2021/0254615 A1 | | 8/2021 | Vrdoljak et al. |
| 2021/0307581 A1 | | 10/2021 | Thorne et al. |
| 2021/0315428 A1 | | 10/2021 | Udy et al. |

(56) References Cited

U.S. PATENT DOCUMENTS

| | | |
|---|---|---|
| 2021/0386261 A1 | 12/2021 | Woodrow et al. |
| 2021/0386262 A1 | 12/2021 | Uchendu et al. |
| 2022/0031131 A1 | 2/2022 | McClay et al. |
| 2022/0031133 A1 | 2/2022 | Der Marderosian et al. |
| 2022/0031134 A1 | 2/2022 | Yang et al. |
| 2022/0061614 A1 | 3/2022 | Yu et al. |
| 2022/0071459 A1 | 3/2022 | Gacin et al. |
| 2022/0095864 A1 | 3/2022 | Der Marderosian et al. |
| 2022/0125256 A1 | 4/2022 | Lessard et al. |
| 2022/0287521 A1 | 9/2022 | Cottrell et al. |
| 2022/0322903 A1 | 10/2022 | Lessard |
| 2022/0400922 A1 | 12/2022 | McClay et al. |
| 2022/0408994 A1 | 12/2022 | Hill |
| 2023/0043567 A1 | 2/2023 | Copeland et al. |
| 2023/0070147 A1 | 3/2023 | Harting et al. |
| 2023/0157495 A1 | 5/2023 | Copeland et al. |
| 2023/0248192 A1 | 8/2023 | Brown et al. |
| 2023/0320550 A1 | 10/2023 | Teuscher et al. |
| 2023/0329502 A1 | 10/2023 | Chirikjian |
| 2023/0355065 A1 | 11/2023 | Finnegan et al. |
| 2023/0414052 A1 | 12/2023 | McClay et al. |
| 2024/0008699 A1 | 1/2024 | Innes et al. |
| 2024/0415352 A1 | 12/2024 | McClay et al. |

FOREIGN PATENT DOCUMENTS

| | | |
|---|---|---|
| CN | 102727136 | 10/2012 |
| CN | 103549922 | 2/2014 |
| CN | 103584799 | 2/2014 |
| CN | 203898204 | 10/2014 |
| CN | 104605789 | 5/2015 |
| CN | 205513160 | 8/2016 |
| CN | 106246478 | 12/2016 |
| CN | 106470585 | 3/2017 |
| CN | 107049152 | 8/2017 |
| CN | 111787836 | 10/2020 |
| CN | 213282741 | 5/2021 |
| CN | 112888352 | 6/2021 |
| EP | 2941994 | 11/2015 |
| EP | 3073881 | 10/2016 |
| JP | H0219123 | 1/1990 |
| JP | H0229224 | 1/1990 |
| JP | H0549566 | 3/1993 |
| JP | H06142018 | 5/1994 |
| JP | 07039488 | 2/1995 |
| JP | H08164098 | 6/1996 |
| JP | 2000139786 | 5/2000 |
| JP | 3661208 B2 * | 6/2005 |
| JP | 2008043351 | 2/2008 |
| JP | 2010246848 | 11/2010 |
| JP | 2011188951 | 9/2011 |
| WO | 2015055458 | 4/2015 |

OTHER PUBLICATIONS

PCT Search Report and Written Opinion mailed Aug. 24, 2022, received in PCT Application No. PCT/CN2022/101930, 10 pages.
U.S. Office Action issued Feb. 15, 2024, received in U.S. Appl. No. 17/869,461, 11 pages.
Extended European Search Report Issued Jun. 6, 2025, received in European Apllication No. 22862841.8, 9 pages.

* cited by examiner

1200

1300

1308    1305    1302    1304

1306

1500

1502    1504

5100

AGITATOR FOR A SURFACE TREATMENT APPARATUS AND A SURFACE TREATMENT APPARATUS HAVING THE SAME

CROSS REFERENCE TO RELATED APPLICATIONS

The present application is a continuation of PCT application PCT/CN22/101930, filed Jun. 28, 2022, which is a continuation-in-part of U.S. application Ser. No. 17/466, 242, filed Sep. 3, 2021, which claims the benefit of U.S. Provisional Application Ser. No. 63/074,719 filed on Sep. 4, 2020, all of which are fully incorporated herein by reference. The present application is also a continuation-in-part of U.S. application Ser. No. 16/656,930 filed on Oct. 18, 2019, which is fully incorporated herein by reference.

TECHNICAL FIELD

The present disclosure relates generally to a vacuum cleaner, and more particularly, to a vacuum cleaner including a system to migrate and/or remove debris from an agitator.

BACKGROUND

A vacuum cleaner may be used to clean a variety of surfaces. Some vacuum cleaners include a rotating agitator (e.g., brush roll). While the known vacuum cleaners are generally effective at collecting debris, some debris (for example, elongated debris such as hair, fur, or the like) may become entangled in the agitator. The entangled debris may reduce the efficiency of the agitator, and may cause damage to the motor, bearings, support structure, and/or drive train that rotates the agitator. Moreover, it may be difficult to remove the entangled debris from the agitator because it is entangled in the bristles.

BRIEF DESCRIPTION OF THE DRAWINGS

Embodiments are illustrated by way of example in the accompanying figures, in which like reference numbers indicate similar parts, and in which.

DETAILED DESCRIPTION

While the making and using of various embodiments of the present disclosure are discussed in detail below, it should be appreciated that the present disclosure provides many applicable inventive concepts that can be embodied in a wide variety of specific contexts. The specific embodiments discussed herein are merely illustrative of specific ways to make and use the disclosure and do not limit the scope of the disclosure.

The present disclosure is generally directed to an agitator for a surface treatment apparatus. The agitator includes a body and a deformable flap that extends from the body. The deformable includes one or more tapers that extend within a corresponding end region of the deformable flap. The agitator is configured to be received within an agitator chamber of the surface treatment apparatus such that the agitator can be rotated within the agitator chamber. Rotation of the agitator causes the deformable flap to engage a surface to be cleaned (e.g., a floor) such that debris deposited thereon can be disturbed by the deformable flap. In operation, the one or more tapers may encourage a migration of fibrous debris (e.g., hair) along a longitudinal axis of the body towards a common location (e.g., a removal location).

Figure 1:
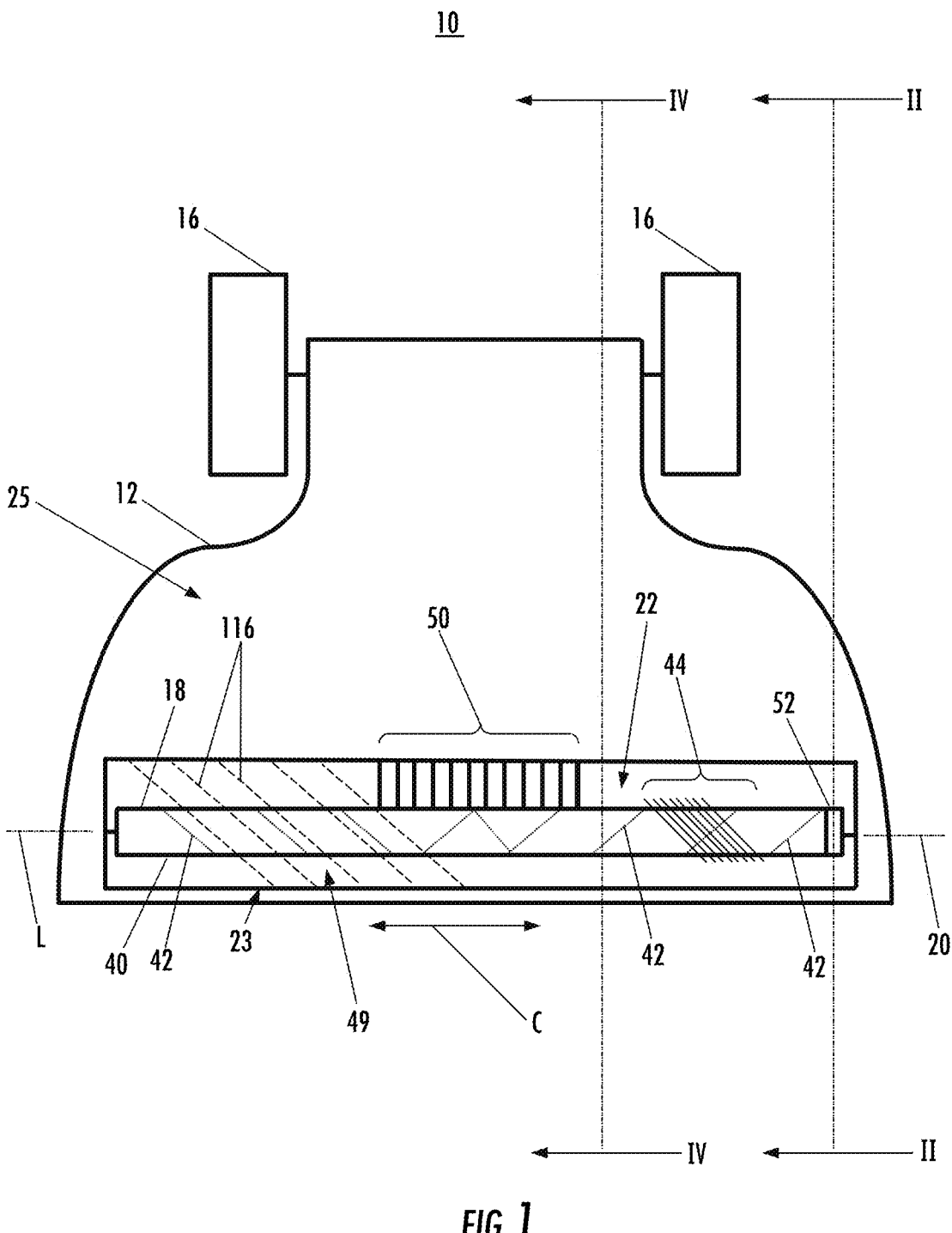
FIG. 1 is a bottom view of one embodiment of a vacuum cleaner, consistent with embodiments of the present disclosure.
Figure 2:
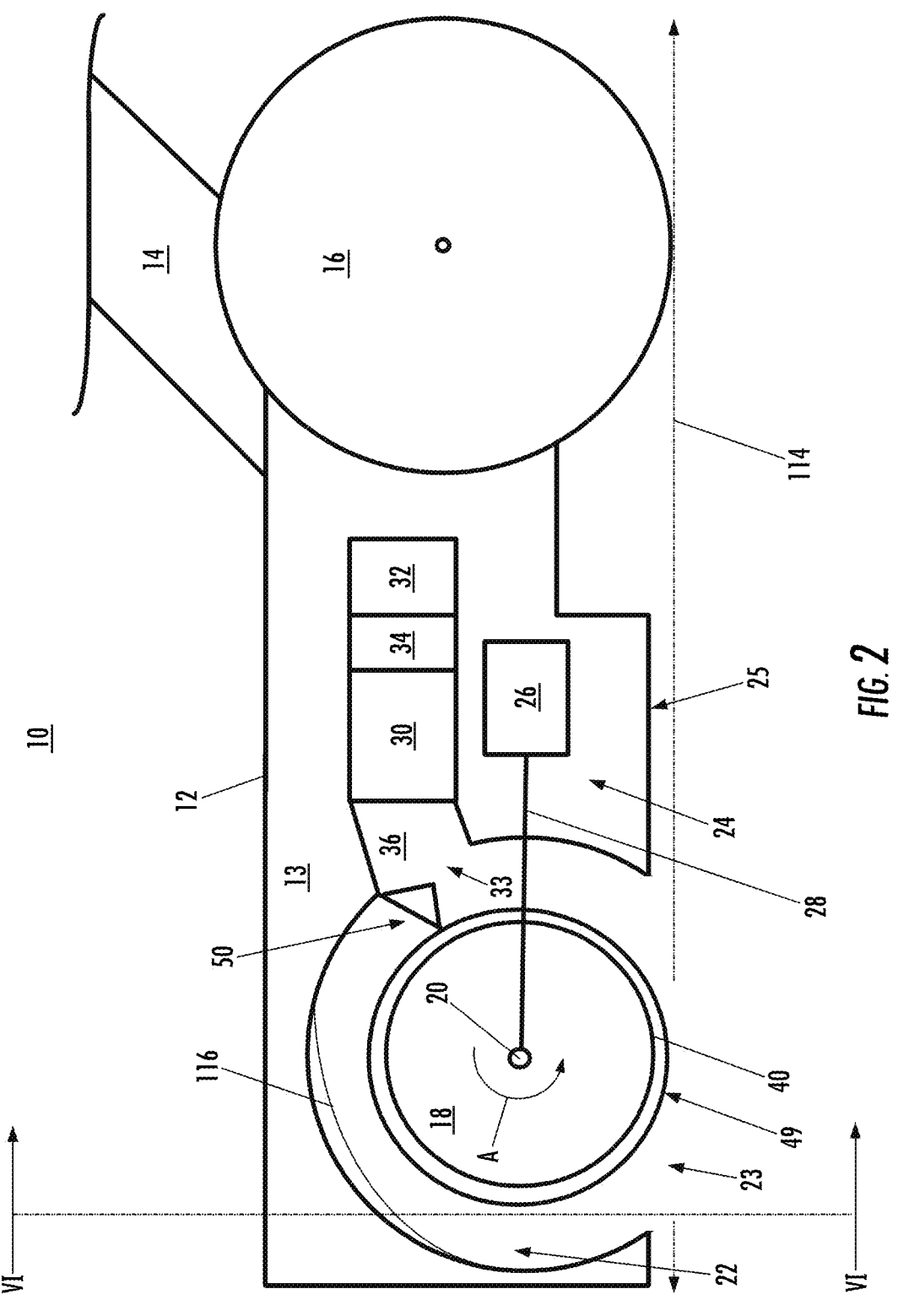
FIG. 2 is a cross-sectional view of the vacuum cleaner of FIG. 1 taken along line II-II, consistent with embodiments of the present disclosure.

Turning now to FIGS. 1 and 2, one embodiment of a vacuum cleaner 10 is generally illustrated. The term vacuum cleaner 10 is intended to refer to any type of vacuum cleaner including, but not limited to, hand-operated vacuum cleaners and robot vacuum cleaners. Non-limiting examples of hand-operated vacuum cleaners include upright vacuum cleaners, canister vacuum cleaners, stick vacuum cleaners, and central vacuum systems. Thus, while various aspects of the present disclosure may be illustrated and/or described in the context of a hand-operated vacuum cleaner or a robot vacuum cleaner, it should be understood the features disclosed herein are applicable to both hand-operated vacuum cleaners and robot vacuum cleaners unless specifically stated otherwise.

With this in mind, FIG. 1 generally illustrates a bottom view of a vacuum cleaner 10 and FIG. 2 generally illustrates a cross-section of the vacuum cleaner 10 taken along lines II-II of FIG. 1. It should be understood that the vacuum cleaner 10 shown in FIGS. 1 and 2 is for exemplary purposes only and that a vacuum cleaner consistent with the present disclosure may not include all of the features shown in FIGS. 1 and 2, and/or may include additional features not shown in FIGS. 1 and 2. For exemplary purposes only, a vacuum cleaner 10 may include a cleaning head (which may also be referred to as a nozzle and/or cleaning nozzle) 12 and optionally a handle 14. In the illustrated embodiment, the handle 14 is pivotally coupled to the cleaning head 12 such that the user may grasp the handle 14 while standing to move the cleaning head 12 on a surface to be cleaned 114 (e.g., a floor) using one or more wheels 16. It should be appreciated; however, that the cleaning head 12 and the handle 14 may be an integrated or unitary structure (e.g., such as a handle-held vacuum cleaner). Alternatively, the handle 14 may be eliminated (e.g., such as in a robot vacuum cleaner).

The cleaning head 12 includes a cleaning head body or housing 13 that at least partially defines/includes one or more agitator chambers 22. The agitator chambers 22 include one or more openings (or air inlets) 23 defined within and/or by a portion of the bottom surface/plate 25 of the cleaning head 12/cleaning head body 13. At least one rotating agitator or brush roll 18 is configured to be coupled to the cleaning head 12 (either permanently or removably coupled thereto) and is configured to be rotated about a pivot axis 20 (e.g., in the direction and/or reverse direction of arrow A, FIG. 2) within the agitator chambers 22 by one or more rotation systems 24. The rotation systems 24 may be at least partially disposed in the vacuum head 12 and/or handle 14, and may one or more motors 26 (either AC and/or DC motors) coupled to one or more belts and/or gear trains 28 for rotating the agitators 18.

The vacuum cleaner 10 includes a debris collection chamber 30 in fluid communication with the agitator chamber 22 such that debris collected by the rotating agitator 18 may be stored. The agitator chamber 22 and debris chamber 30 may be fluidly coupled to a vacuum source 32 (e.g., a suction motor or the like) for generating an airflow (e.g., partial vacuum) in the agitator chamber 22 and debris collection chamber 30 and to suck up debris proximate to the agitator chamber 22 and/or agitator 18. As may be appreciated, the rotation of the agitator 18 may aid in agitating/loosening debris from the cleaning surface. Optionally, one or more filters 34 may be provided to remove any debris (e.g., dust particles or the like) entrained in the vacuum air flow. The debris chamber 30, vacuum source 32, and/or filters 34 may be at least partially located in the cleaning head 12 and/or handle 14. Additionally, one or more suction tubes, ducts, or the like 36 may be provided to fluidly couple the debris chamber 30, vacuum source 32, and/or filters 34. For example, the suction tube 36 may include a suction inlet and/or suction opening 33, FIG. 2, which separates the suction tube 36 from the agitation chamber 22 (e.g., which is the entrance of the suction tube 36 from the agitation chamber 22). The vacuum cleaner 10 may include and/or may be configured to be electrically coupled to one or more power sources such as, but not limited to, an electrical cord/plug, batteries (e.g., rechargeable, and/or non-rechargeable batteries), and/or circuitry (e.g., AC/DC converters, voltage regulators, step-up/down transformers, or the like) to provide electrical power to various components of the vacuum cleaner 10 such as, but not limited to, the rotation systems 24 and/or the vacuum source 32.

The agitator 18 includes an elongated agitator body 40 that is configured to extend along and rotate about a longitudinal/pivot axis 20. The agitator 18 (e.g., but not limited to, one or more of the ends of the agitator 18) is permanently or removably coupled to the vacuum head 12 and may be rotated about the pivot axis 20 by the rotation system 24. In the illustrated embodiment, the elongated agitator body 40 has a generally cylindrical cross-section, though other cross-sectional shapes (such as, but not limited to, oval, hexagonal, rectangular, octagonal, concaved, convex, and the like) are also possible. The agitator 18 may have bristles, fabric, felt, nap, pile, and/or other cleaning elements (or any combination thereof) 42 around the outside of the elongated agitator body 40. Examples of brush rolls and other agitators 18 are shown and described in greater detail in U.S. Pat. No. 9,456,723 and U.S. Patent Application Pub. No. 2016/0220082, which are fully incorporated herein by reference.

As the agitator 18 rotates within the agitation chamber 22, the agitator 18 may come into contact with elongated (or fibrous) debris such as, but not limited to, hair, string, and the like. The fibrous debris 44 may have a length that is much longer than the diameter of the agitator 18. By way of a non-limiting example, the fibrous debris 44 may have a length that is 2-10 times longer than the diameter of the agitator 18. Because of the rotation of the agitator 18 as well as the length and flexibility of the fibrous debris 44, the fibrous debris 44 will tend to wrap around the diameter of the agitator 18.

As may be appreciated, an excessive amount of fibrous debris 44 building up on the agitator 18 may reduce the efficiency of the agitator 18 and/or cause damage to the vacuum cleaner 10 (e.g., the rotation systems 24 or the like). To address the problem of fibrous debris 44 wrapping around the agitator 18, the vacuum cleaner 10 may include one or more hair migration systems 49 and/or one or more combing units 50 (also referred to as a debrider) disposed at least partially within the agitation chamber 22. As explained herein, the hair migration system 49 may be configured to cause at least some of the fibrous debris 44 wrapped around the agitator 18 to move along the agitator 18 (and optionally be removed from the agitator 18) as the agitator 18 rotates about the pivot axis 20. The combing unit 50 (which may optionally be used in combination with the hair migration system 49) may be configured to dislodge at least some of the fibrous debris 44 that is wrapped around the agitator 18, wherein the dislodged fibrous debris 44 may be entrained into the suction air flow, through the suction tube 36, and ultimately to the debris collection chamber 30. The hair migration system 49 may include one or more ribs 116, bristles 60, and/or sidewalls 62 (e.g., resiliently deformable sidewalls/flaps). At least one rib 116 (shown in hidden lines) can extend within the surface cleaning head 12 and can be configured to engage (e.g., contact) the agitator 18 such that fibrous debris can be urged towards one or more predetermined locations on the agitator 18. For example, the at least one rib 116 can extend transverse (e.g., at a non-perpendicular angle) to a longitudinal axis L of the agitator 18 such that, as fibrous debris becomes entangled around the agitator 18, the fibrous debris engages (e.g., contacts) the rib 116 and is urged towards a predetermined location along the agitator 18. While the vacuum cleaner 10 is illustrated with both the hair migration system 49 and combing unit 50, it should be appreciated that some examples of the vacuum cleaner 10 may include only the hair migration system 49 or combing unit 50.

Figure 3:
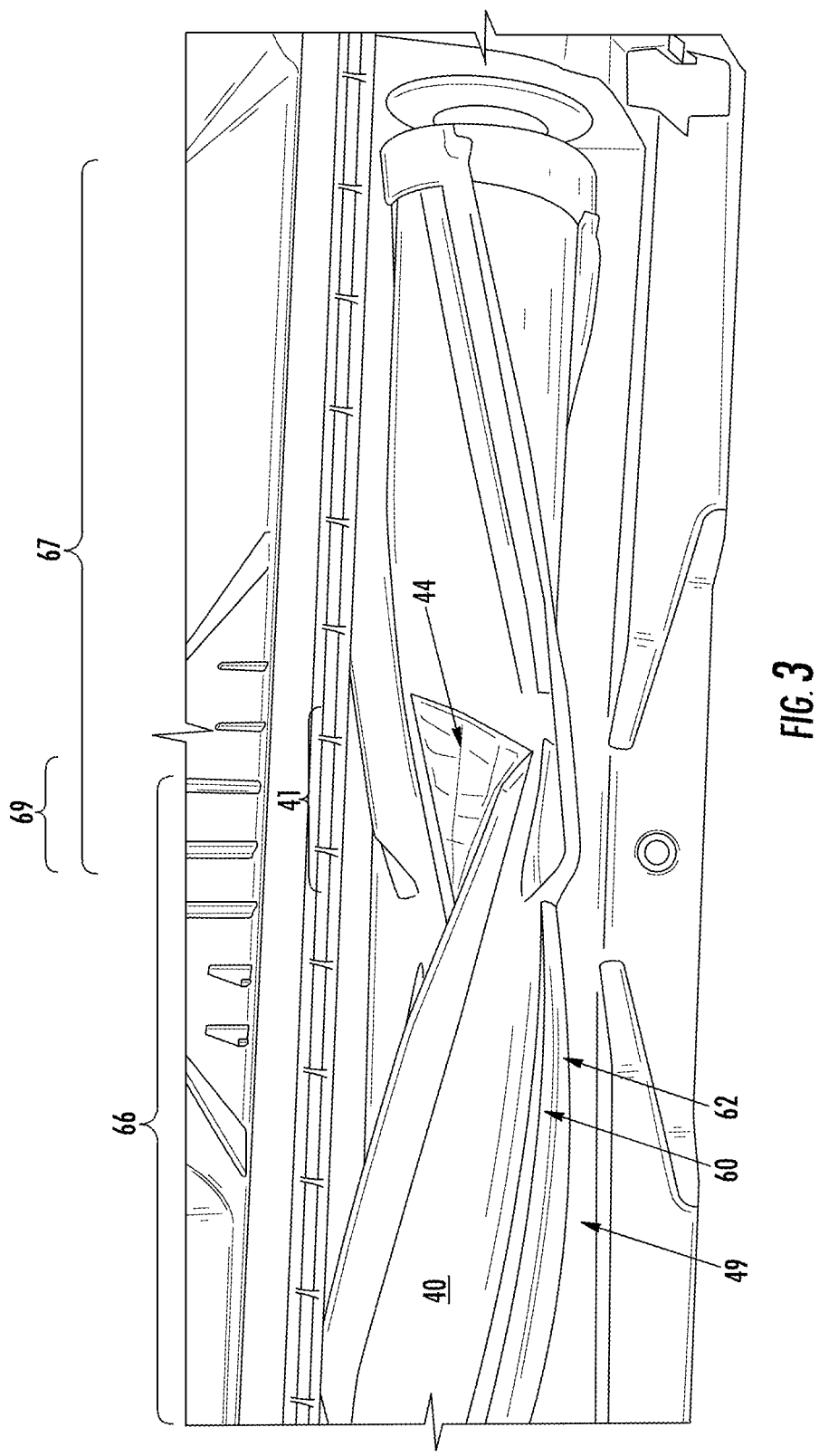
FIG. 3 generally illustrates one example of a hair migration system, consistent with embodiments of the present disclosure.

Turning now to FIG. 3, one example of a hair migration system 49 is generally illustrated. The hair migration system 49 may include a plurality of bristles 60 on the agitator 18 aligned in one or more rows or strips. Alternatively (or in addition), the hair migration system 49 may include one or more sidewalls and/or continuous sidewalls (which in some examples may be referred to as a flap or resiliently deformable flap) 62 adjacent to at least one row of bristles 60. The rows of bristles 60 and/or continuous sidewall 62 are configured to reduce hair from becoming entangled in the bristles 60 of the agitator 18. Optionally, the combination of the bristles and sidewall 62 may be configured to generate an Archimedes screw force that urges/causes the hair to migrate towards one or more collection areas of the agitator 18 (e.g., but not limited to, a central region 41 of the agitator 18). The bristles 60 may include a plurality of tufts of bristles 60 arranged in rows and/or one or more rows of continuous bristles 60.

The plurality of bristles 60 extend outward (e.g., generally radial outward) from the elongated agitator body 40 (e.g., a base portion) to define one or more continuous rows. One or more of the continuous rows of bristles 60 may be coupled (either permanently or removably coupled) to the elongated agitator body 40 using one or more form locking connections (such as, but not limited to, a tongue and groove connection, a T-groove connection, or the like), interference connections (e.g., interference fit, press fit, friction fit, Morse taper, or the like), adhesives, fasteners overmoldings, or the like.

The rows of bristles 60 at least partially revolve around and extend along at least a portion of the longitudinal axis/pivot axis 20 of the elongated agitator body 40 of the agitator 18. As defined herein, a continuous row of bristles 60 is defined as a plurality of bristles 60 in which the spacing between adjacent bristles 60 along the axis of rotation 20 is less than or equal to 3 times the largest cross-sectional dimension (e.g., diameter) of the bristles 60.

As mentioned above, the plurality of bristles 60 are aligned in and/or define at least one row that at least partially revolves around and extends along at least a portion of the longitudinal axis/pivot axis 20 of the elongated agitator body 40 of the agitator 18. For example, at least one of the rows of bristles 60 may be arranged in a generally helical, arcuate, and/or chevron configuration/pattern/shape. Optionally, one or more of the rows of bristles 60 (e.g., the entire row or a portion thereof) may have a constant pitch (e.g., constant helical pitch). Alternatively (or in addition), one or more of the rows of bristles 60 (e.g., the entire row or a portion thereof) may have a variable pitch (e.g., variable helical pitch). For example, at least a portion of the row of bristles 60 may have a variable pitch that is configured to accelerate the migration of hair and/or generally direct debris towards a desired location (e.g., the central region 41 of the agitator 18 and/or towards the primary inlet 33 of the suction tube 36).

In one example, at least one row of bristles 60 may be arranged proximate to (e.g., immediately adjacent to) at least one sidewall 62. The sidewall 62 may be disposed as close as possible to the nearest row of bristles 60, while still allowing the bristles 60 to bend freely left-to-right. For example, one or more of the sidewalls 62 may extend substantially continuously along the row of bristles 60. In one embodiment, the sidewall 62 may have a length at least as long as the length of the adjacent row of bristles 60. The sidewall 62 may extend substantially parallel to at least one of the rows of bristles 60. As used herein, the term "substantially parallel" is intended to mean that the separation distance between the sidewall 62 and the row of bristles 60 remains within 25% of the greatest separation distance along the entire longitudinal length of the row of bristles 60, for example, within 20% of the greatest separation distance along the entire longitudinal length of the row of bristles 60 and/or within 15% of the greatest separation distance along the entire longitudinal length of the row of bristles 60. Also, as used herein, the term "immediately adjacent to" is intended to mean that no other structural feature or element having a height greater than the height of the sidewall 62 is disposed between the sidewall 62 and a closest row of bristles 60, and that the separation distance D between the sidewall 62 and the closest row of bristles 60 is less than, or equal to, 5 mm (for example, less than or equal to 3 mm, less than or equal to 2.5 mm, less than or equal to 1.5 mm, and/or any range between 1.5 mm to 3 mm).

One or more of the sidewalls 62 may therefore at least partially revolve around and extend along at least a portion of the longitudinal axis/pivot axis 20 of the elongated agitator body 40 of the agitator 18. For example, at least one of the sidewalls 62 may be arranged in a generally helical, arcuate, and/or chevron configuration/pattern/shape. Optionally, one or more of the sidewalls 62 (e.g., the entire row or a portion thereof) may have a constant pitch (e.g., constant helical pitch). Alternatively (or in addition), one or more of the sidewalls 62 (e.g., the entire row or a portion thereof) may have a variable pitch (e.g., variable helical pitch).

While the agitator 18 is shown having a row of bristles 60 with a sidewall 62 arranged behind the row of bristles 60 as the agitator 18 rotates about the pivot axis 20, the agitator 18 may include one or more sidewalls 62 both in front of the row of bristles 60, behind the row of bristles 60, and/or without the rows of bristles 60. As noted above, one or more of the sidewalls 62 may extend outward from a portion of the elongated agitator body 40 as generally illustrated in FIG. 3. For example, one or more of the sidewalls 62 may extend outward from a base of the elongated agitator body 40 from which the row of bristles 60 is coupled and/or may extend outward from a portion of an outer periphery of the elongated agitator body 40. Alternatively (or in addition), one or more of the sidewalls 62 may extend inward from a portion of the elongated agitator body 40. For example, the radially distal-most portion of the sidewall 62 may be disposed at a radial distance from the pivot axis 20 of the elongated agitator body 40 that is within 20 percent of the radial distance of the adjacent, surrounding periphery of the elongated agitator body 40, and the proximal-most portion of the sidewall 62 (i.e., the portion of the sidewall 62 which begins to extend away from the base) may be disposed at a radial distance that is less than the radial distance of the adjacent, surrounding periphery of the elongated agitator body 40. As used herein, the term "adjacent, surrounding periphery" is intended to refer to a portion of the periphery of the elongated agitator body 40 that is within a range of 30 degrees about the pivot axis 20.

In some examples, the agitator 18 may include at least one row of bristles 60 substantially parallel to at least one sidewall 62. According to one embodiment, at least a portion (e.g., all) of the bristles 60 in a row may have an overall height Hb (e.g., a height measured from the pivot axis 20) that is longer than the overall height Hs (e.g., a height measured from the pivot axis 20) of at least one of the adjacent sidewalls 62. Alternatively (or in addition), at least a portion (e.g., all) of the bristles 60 in a row may have a height Hb that is 2-3 mm (e.g., but not limited to, 2.5 mm) longer than the height Hs of at least one of the adjacent sidewalls 62. Alternatively (or in addition), the height Hs of at least one of the adjacent sidewalls 62 may be 60 to 100% of the height Hb of at least a portion (e.g., all) of the bristles 60 in the row. For example, the bristles 60 may have a height Hb in the range of 12 to 32 mm (e.g., but no limited to, within the range of 18 to 20.5 mm) and the adjacent sidewall 62 may have a height Hs in the range of 10 to 29 mm (e.g., but no limited to, within the range of 15 to 18 mm).

The bristles 60 may have a height Hb that extends at least 2 mm beyond the distal-most end of the sidewall 62. The sidewall 62 may have a height Hs of at least 2 mm from the base, and may have a height Hs that is 50% or less of the height Hb of the bristles 60. At least one sidewall 62 may be disposed close enough to the at least one row of bristles 60 to increase the stiffness (e.g., decrease the range or motion) of the bristles 60 in at least one front-to-back direction as the agitator 18 is rotated during normal use. The sidewall 62 may therefore allow the bristles 60 to flex much more freely in at least one side-to-side direction compared to a front-to-back direction. For example, the bristles 60 may be 25%-40% (including all values and ranges therein) stiffer in the front-to-back direction compared to side-to-side direction. According to one embodiment, the sidewall 62 may be located adjacent to (e.g., immediately adjacent to) the row of bristles 60. For example, the distal most end of the sidewall 62 (i.e., the end of the sidewall 62 furthest from the center of rotation PA) may be 0-10 mm from the row of bristles 60, such as 1-9 mm from the row of bristles 60, 2-7 mm from the row of bristles 60, and/or 1-5 mm from the row of bristles 60, including all ranges and values therein.

In another example, at least a portion (e.g., all) of the bristles 60 in a row may have an overall height Hb that is shorter than the overall height Hs of at least one of the adjacent sidewalls 62. Alternatively (or in addition), at least a portion (e.g., all) of the bristles 60 in a row may have a height Hb that is 2-3 mm (e.g., but not limited to, 2.5 mm) shorter than the height Hs of at least one of the adjacent sidewalls 62. Alternatively (or in addition), the height Hb of at least a portion (e.g., all) of the bristles 60 in the row may be 60 to 100% of the Height Hs of at least one of the adjacent sidewalls 62. For example, the bristles 60 may have a height Hb in the range of 10 to 29 mm (e.g., but no limited to, within the range of 15 to 18 mm) and the adjacent sidewall 62 may have a height Hs in the range of 12 to 32 mm (e.g., but no limited to, within the range of 18 to 20.5 mm). The sidewall 62 may have a height Hs that extends at least 2 mm beyond the distal-most end of the bristles 60. The bristles may have a height Hb of at least 2 mm from the base, and may up a height Hb that is 50% or less of the height Hs of the sidewall 62.

According to one embodiment, the sidewall 62 includes flexible and/or elastomeric materials, and may be generally referred to as flaps and/or resiliently deformable flaps. Examples of a flexible and/or elastomeric material include, but are not limited to, rubber, silicone, and/or the like. The sidewall 62 may include a combination of a flexible material and fabric. The combination of a flexible material and fabric may reduce wear of the sidewall 62, thereby increasing the lifespan of the sidewall 62 as well as providing an additional method for cleaning and agitation. The rubber may include natural and/or synthetic, and may be either a thermoplastic and/or thermosetting plastic. The rubber and/or silicone may be combined with polyester fabric and/or nylon fabric (e.g. PA66). In one embodiment, sidewall 62 may include cast rubber and fabric (e.g., polyester fabric). The cast rubber may include natural rubber cast with a polyester fabric. Alternatively (or in addition), the cast rubber may include a polyurethane (such as, but not limited to, PU 45 Shore A) and cast with a polyester fabric.

Because the sidewall 62 may be assembled on a helical path, there may be a need for the top edge and bottom edge of the sidewall 62 to follow different helices each with a different helical radius. When a flexible material with reinforcement is selected to pass life requirements, the stretch required along these edges should be accounted for in order for the as-assembled sidewall 62 position to agree with the different helical radius and helical path of each edge (because the fiber materials of the composite sidewall 62 can reduce the flexibility of the sidewall 62). If this is not met, then the distal end of the sidewall 62 may not be positioned at a constant distance from the bristles 60 (e.g., within 10 mm as described herein). Therefore, the sidewall 62 geometry and the material choices may be selected to satisfy the spatial/positional requirements of the sidewall 62, the flexibility required to perform the anti-wrap function, and the durability to withstand normal use in a vacuum cleaner. The addition of a fabric may be useful in higher agitator rotation speed applications (e.g., but not limited to, upright vacuum applications).

The agitator 18 (e.g., the bristles 60 and/or sidewall 62) should be aligned within the agitator chamber 22 such that the bristles 60 and/or sidewall 62 are able to contact the surface to be cleaned. The bristles 60 and/or sidewall 62 should be stiff enough in at least one of the directions to engage the surface to be cleaned (e.g., but not limited to, carpet fibers) without undesirable bending (e.g., stiff enough to agitate debris from the carpet), yet flexible enough to allow side-to-side bending. Both the size (e.g., height Hs) and location of the sidewalls 62 relative to the row of bristles 60 may be configured to generally prevent and/or reduce hair from becoming entangled around the base or bottom of the bristles 60. The bristles 60 may be sized so that when used on a hard floor, it is clear of the floor in use. However, when the surface cleaning apparatus 10 is on carpet, the wheels will sink in and the bristles 60 and/or sidewall 62 will penetrate the carpet. The length of bristles 60 and/or sidewall 62 may be chosen so that it is always in contact with the floor, regardless of floor surface. Additional details of the agitator 18 (such as, but not limited to, the bristles 60 and/or sidewall 62) are described in U.S. Patent Application Publication Number 2018/0070785 filed on Sep. 8, 2017, entitled "Agitator with Hair Removal," which is fully incorporated herein by reference.

As noted herein, the hair migration system 49 (e.g., the combination of the bristles 60 and/or the sidewall 62) may be configured to migrate fibrous debris 44 in a desired and/or target direction and/or to a desired location. In accordance with at least one aspect of the present disclosure, the hair migration system 49 is configured to migrate the fibrous debris 44 towards the combing unit 50 and/or towards a region of the agitator 18 which is proximate to an inlet of the suction tube 36 which is fluidly coupled to the agitation chamber 22. In the illustrated embodiment, the hair migration system 49 is configured to migrate the fibrous debris 44 towards a central region 41 of the agitator 18 (e.g., which may be proximate to the combing unit 50) and the primary inlet 33 of the suction tube 36 (FIGS. 4-6) when the agitator 18 is rotating within the agitation chamber 22. For example, the hair migration system 49 may be configured to migrate the fibrous debris 44 along the agitator 18 towards the combing unit 50 to allow the combing unit 50 to remove the fibrous debris 44 from the agitator 18, whereupon the fibrous debris 44 may be entrained in the suction air flow into the suction tube 36.

In at least one example, the hair migration system 49 may include a first and at least a second (e.g., a left and a right) hair migration sections 66, 67. Each hair migration section 66, 67 may include one or more sidewalls 62 and/or the bristles 60 as generally described herein. The sidewalls 62 and/or the bristles 60 of one or more of the hair migration sections 66, 67 may have a generally helical pattern and/or a generally chevron pattern. According to one aspect, at least a portion of the hair migration sections 66, 67 may partially overlap in an overlap region 69. In the illustrated example, only the sidewalls 62 overlap; however, it should be appreciated that only the bristles 60 may overlap and/or both the sidewalls 62 and the bristles 60 may partially overlap. As used herein, the hair migration sections 66, 67 are considered to overlap if the sidewalls 62 and/or the bristles 60 of the adjacent hair migration sections 66, 67 pass through the radial cross-section as the agitator 18 rotates about the pivot axis 20 within the agitator chamber 22. The amount and/or degree of overlap (i.e., the size of the overlap region 69) may vary depending upon the intended application. For example, the size of the overlap region 69 may vary depending upon the length of the combing unit 50, the overall length of the agitator 18, the rotational speed of the agitator 18, or the like. According to one embodiment, the size of the overlap region 69 may be 10-30 mm, and the agitator 18 may have a length of 225 mm. According to another embodiment, the size of the overlap region 69 may be 4-20% of the length of the agitator 18. Of course, these are merely examples.

Optionally, the height of one or more of the sidewalls 62 and/or the bristles 60 may taper in at least a portion of the overlap region 69. The reduction in the height of the sidewalls 62 and/or the bristles 60 in the overlap region 69 may facilitate removal of fibrous debris 44 from the agitator 18 by reducing the compressive force that the fibrous debris 44 applies to the agitator 18.

While the hair migration system 49 is shown having two adjacent hair migration sections 66, 67 which each extend across only a portion of the length of the agitator 18, it should be appreciated that the hair migration system 49 may have greater than or less than two migration sections 66, 67. For example, the hair migration system 49 may include one or more continuous hair migration sections that extend substantially along the entire length of the agitator 18. In particular, the elongated hair migration section may have a generally helical and/or generally chevron pattern that may change direction at the target location in order to migrate towards the target location from both ends of the agitator 18.

Figure 4:
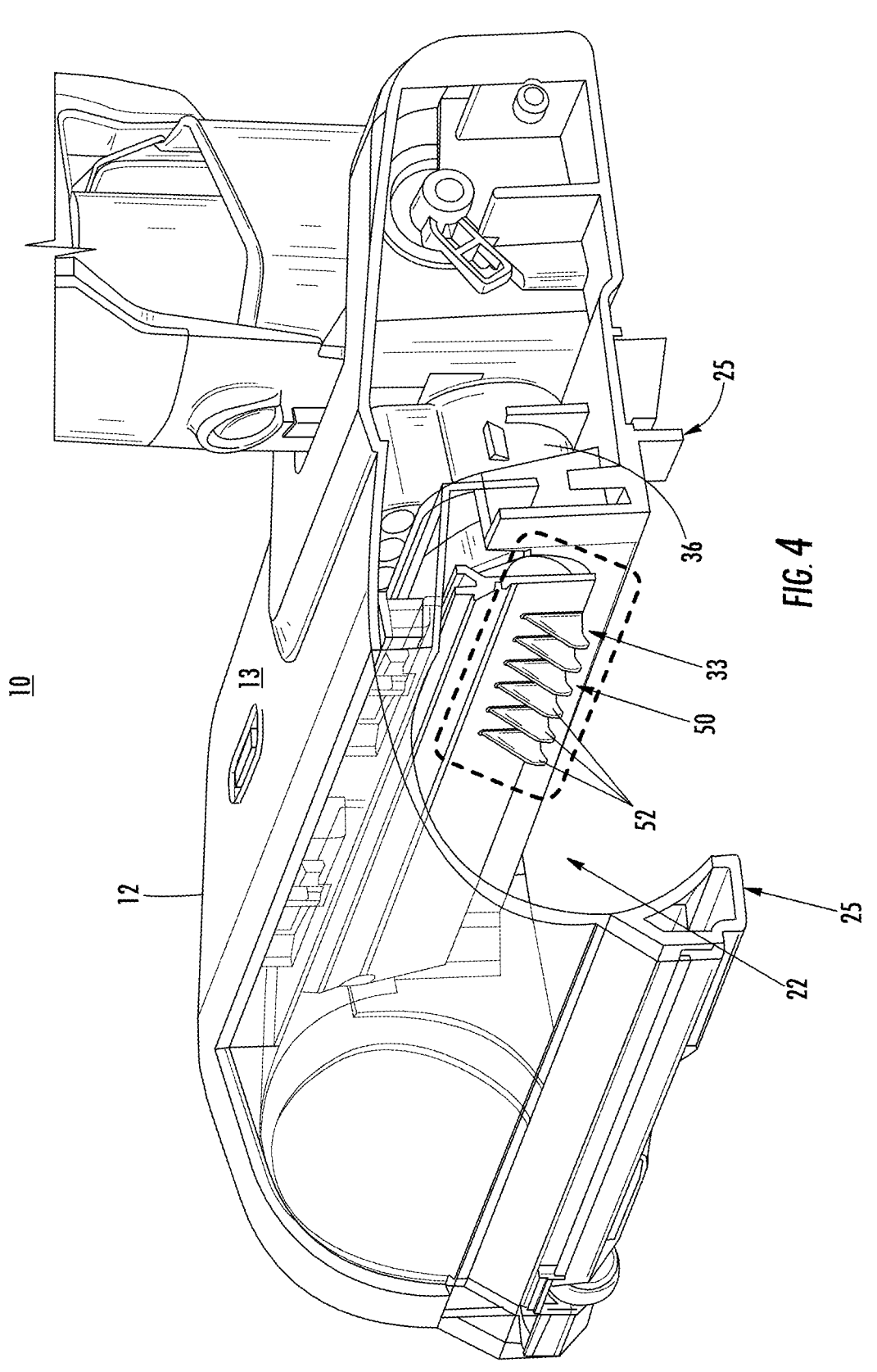
FIG. 4 generally illustrates a perspective cross-sectional view of one embodiment of a combing unit taken along lines IV-IV of FIG. 1.
Figure 5:
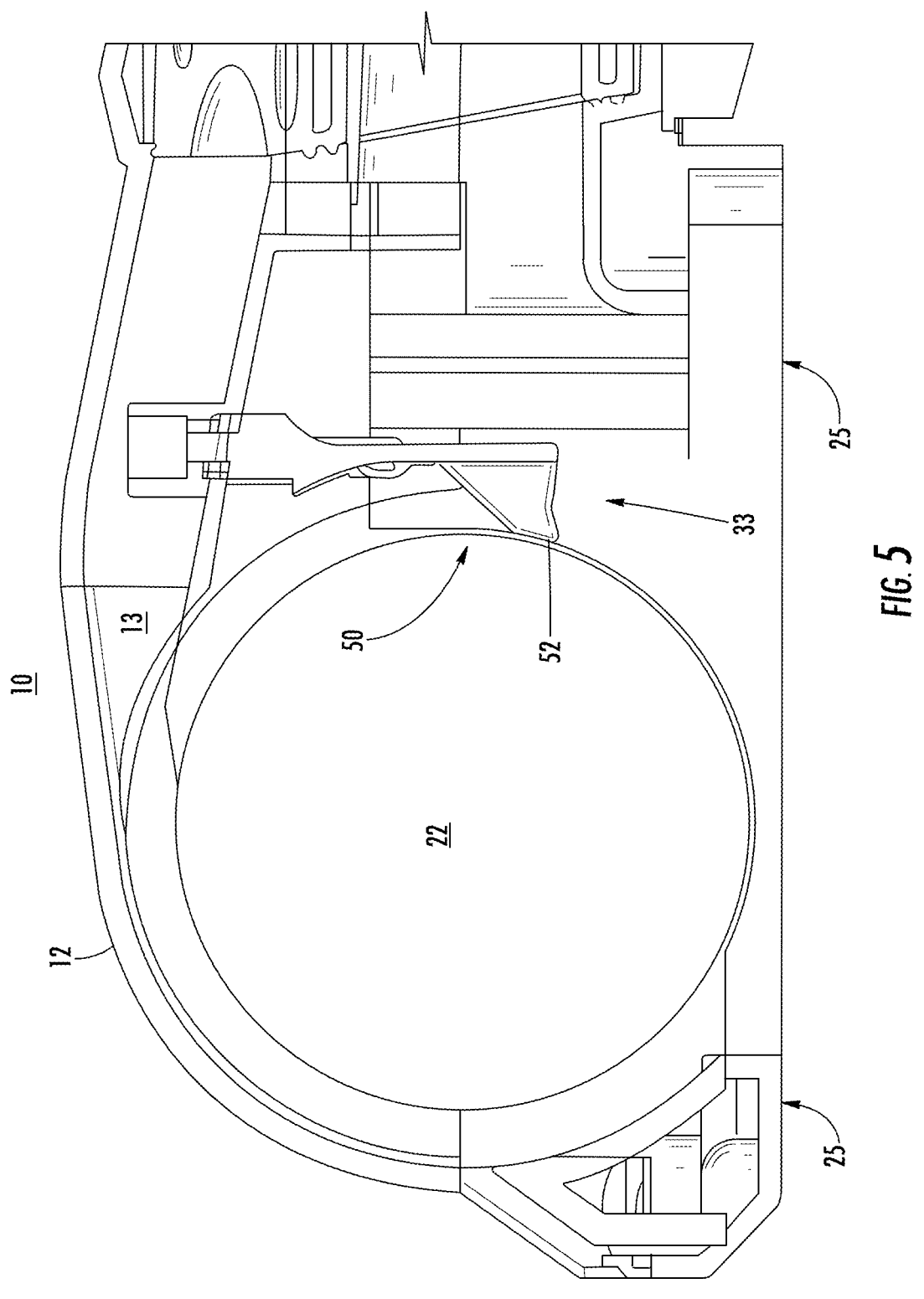
FIG. 5 generally illustrates a cross-sectional view of the combing unit of FIG. 4 taken along lines IV-IV of FIG. 1.
Figure 6:
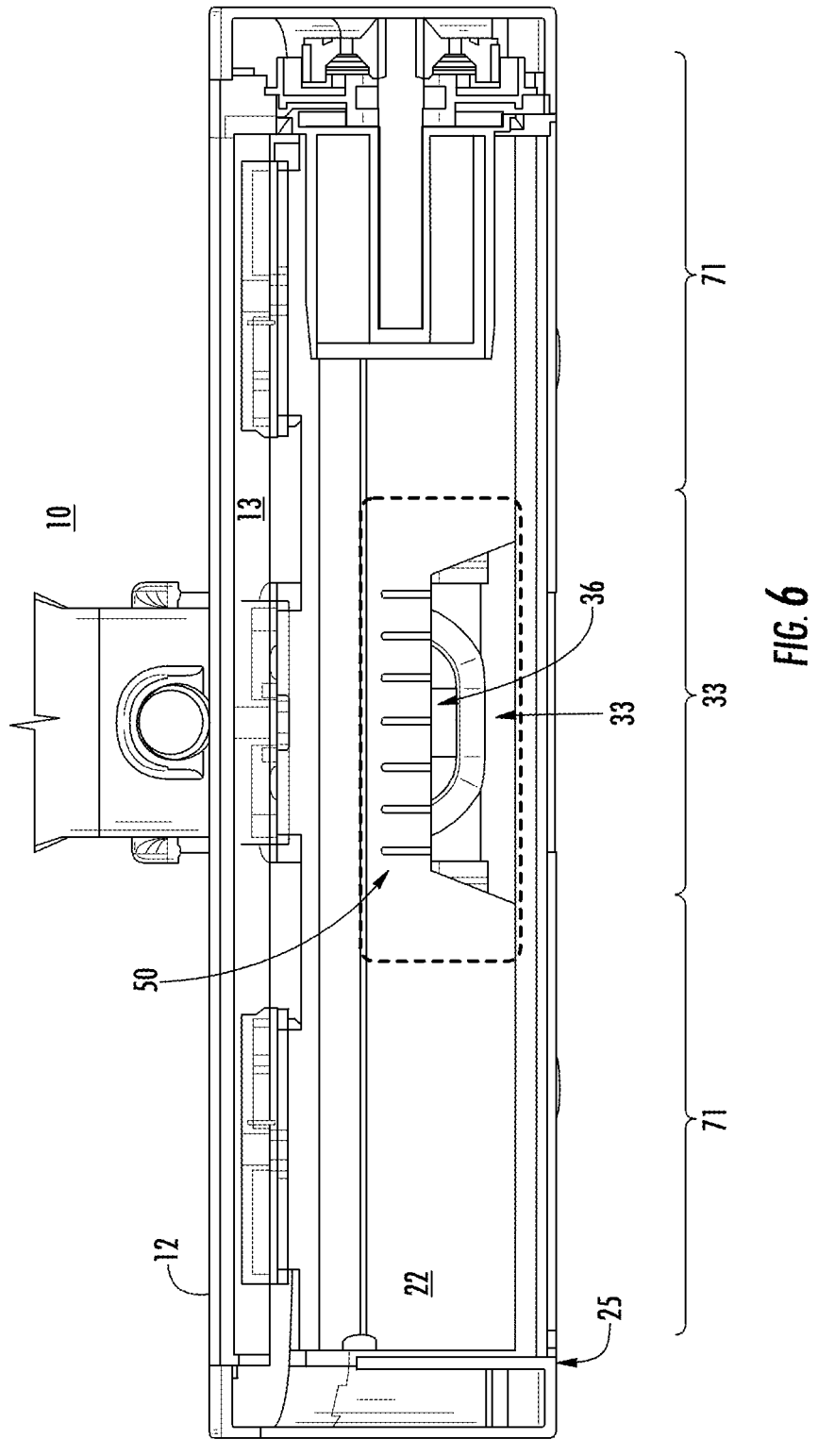
FIG. 6 generally illustrates a cross-sectional view of the combing unit of FIG. 4 taken along lines VI-VI of FIG. 2.

Turning now to FIGS. 4-6, one example of the combing unit 50 is generally illustrated. In particular, FIG. 4 generally illustrates a perspective cross-sectional view taken along lines IV-IV of FIG. 1 without the agitator 18 for clarity, FIG. 5 generally illustrates a cross-sectional view taken along lines IV-IV of FIG. 1, and FIG. 6 generally illustrates a cross-sectional view taken along lines VI-VI of FIG. 2 without the agitator 18 for clarity. While only a single combing unit 50 is shown, it should be appreciated that the vacuum cleaner 10 may include a plurality of combing units 50.

The combing unit 50 may be at least partially disposed in the agitator chamber 22 and may include a plurality of fingers, ribs, and/or teeth 52 forming a comb-like structure that is configured to contact a portion of the length of the agitator 18 (e.g., the bristles 60 and/or sidewalls 62 as discussed herein). The fingers 52 are configured to extend (e.g., protrude) from a portion of the vacuum cleaner 10 (such as, but not limited to, the body 13, agitator chamber 22, bottom surface 25, and/or debris collection chamber 30) generally towards the agitator 18 such that at least a portion of the fingers 52 contact an end portion of the bristles 60 and/or one or more of the sidewalls 62. Rotation of the agitator 18 causes the fingers 52 of the combing unit 50 to pass between the plurality of bristles 60 and/or contact one or more of the more of the sidewalls 62, thereby preventing hair from becoming entangled on the agitator 18. It should be appreciated that the shape or the fingers, ribs, and/or teeth 52 are not limited to those shown and/or described in the instant application unless specifically claimed as such.

According to one embodiment, at least some of the fingers 52 (e.g., all of the fingers 52) extend generally towards the agitator 18 such that a distal most end of the fingers 52 is within 2 mm of the sidewall 62 as the sidewall 62 rotates past the fingers 52. As such, the fingers 52 may or may not contact the sidewall 62.

Alternatively (or in addition), at least some of the fingers 52 (e.g., all of the fingers 52) extend generally towards the agitator 18 such that a distal most end of the fingers 52 contact (e.g., overlap) the sidewall 62 as the sidewall 62 rotates past the fingers 52. For example, the distal most end of the fingers 52 may contact up to 3 mm of the distal most end of the sidewall 62, for example, 1-3 mm of the distal most end of the sidewall 62, 0.5-3 mm of the distal most end of the sidewall 62, up to 2 mm of the distal most end of the sidewall 62, and/or 2 mm of the sidewall 62, including all ranges and values therein.

The fingers 52 may be placed along all or a part of the longitudinal length L of the combing unit 50, for example, either evenly or randomly spaced along longitudinal length L. According to one embodiment, the density of the fingers 52 (e.g., number of fingers 52 per inch) may be in the range of 0.5-16 fingers 52 per inch such as, but not limited to, 1-16 fingers 52 per inch, 2-16 fingers 52 per inch, 4 to 16 fingers 52 per inch and/or 7-9 fingers 52 per inch, including all ranges and values therein. For example, the fingers 52 may have a 2-5 mm center to center spacing, a 3-4 mm center to center spacing, a 3.25 mm center to center spacing, a 1-26 mm center to center spacing, up to a 127 mm center to center spacing, up to a 102 mm center to center spacing, up to a 76 mm center to center spacing, up to a 50 mm center to center spacing, a 2-26 mm center to center spacing, a 2-50.8 mm center to center spacing, and/or a 1.58-25.4 mm center to center spacing, including all ranges and values therein.

The width of the fingers 52 (e.g., also referred to as teeth) may be configured to occupy a minimum width subject to manufacturing and strength requirements. The reduced width of the fingers 52 may minimize wear on the agitator 18 and facilitate airflow between the fingers 52 for clearing of hair. The collective widths of the plastic fingers 52 may be 30% or less than the total width of the combing unit 50, particularly when the combing unit 50 is plastic.

The width of the fingers 52 along the profile and brush roll axis 20 may be based on structural and molding requirements. The profile of the distal end of the fingers 52 may be arcuate (e.g., rounded) or may form a sharp tip (e.g., the leading edge and the trailing edge may intersect at the inflection point to form an acute angle). According to one embodiment, the profile of the distal end of the fingers 52 may be rounded and smooth, based on material and production factors. For example, the profile of the distal end of the fingers 52 may be 0.6-2.5 mm in diameter (such as, but not limited to, 1-2 mm in diameter and/or 1.6 mm in diameter) for a 28 mm diameter agitator 18.

The root gap of the fingers 52 (e.g., the transition between adjacent fingers 52) may have a radial gap clearance that is from 0 to 25% of the major diameter of the agitator 18. For example, the root gap of the fingers 52 may be between 2-7% of the major diameter of the agitator 18 such as, but not limited to, 3-6% of the major diameter of the agitator 18 and/or 5.4% of the major diameter of the agitator 18. By way of a non-limiting example, the root gap of the fingers 52 may be a 1.5 mm gap for a 28 mm agitator 18.

While the fingers 52 are illustrated being spaced in a direction extending along a longitudinal length L of the combing unit 50 that is generally parallel to the pivot axis 20 of the agitator 18, it should be appreciated that all or a portion of the fingers 52 may extend along one or more axes (e.g., a plurality of axes) in one or directions that are transverse to the pivot axis 20 (e.g., but not limited to, a V shape).

The combing unit(s) 50 extends across only a portion of the length of the agitation chamber 22, for example, the portion corresponding to the primary suction inlet 33 of the suction tube 36. At least one combing unit 50 may be disposed proximate to the primary suction inlet 33 of the suction tube 36. As used herein, the phrase "proximate to the primary suction inlet 33 of the suction tube 36" and the like is intended to mean that the combing unit 50 is disposed within and/or upstream of the primary suction inlet 33 at a distance less than 20% of the cross-sectional area of the primary suction inlet 33 of the suction tube 36.

In the illustrated example, the vacuum cleaner 10 is shown having a primary suction inlet 33 (best seen in FIG. 6) and two adjacent secondary suction inlets 71 which extend laterally (e.g., left and right) from the primary suction inlet 33 along the length of the agitation chamber 22. The primary suction inlet 33 and the secondary suction inlets 71 of the suction tube 36 are defined as the transitional areas between the agitation chamber 22 and the suction tube 36 which defines the beginning of the suction path from the agitation chamber 22. While the vacuum cleaner 10 is shown having only a single primary suction inlet 33 and two adjacent secondary suction inlets 71, it should be understood that the vacuum cleaner 10 may have less or greater than two secondary suction inlets 71 and/or more than one primary suction inlet 33. In an embodiment having more than one primary suction inlet 33, the vacuum cleaner 10 may optionally include more than one combing unit 50. In addition, the vacuum cleaner 10 may not have any secondary suction inlets 71.

The primary suction inlet 33 of the suction tube 36 is defined as having a height which is larger than the height of the adjacent secondary suction inlets 71. As such, the primary suction inlet 33 may have a larger pressure (but lower velocity) compared to the secondary suction inlets 71. For example, the secondary suction inlets 71 may have a height which is less than 25% of the height of the primary suction inlet 33, e.g., the secondary suction inlets 71 may have a height which is less than 20% of the height of the primary suction inlet 33; the secondary suction inlets 71 may have a height which is less than 15% of the height of the primary suction inlet 33; and/or the secondary suction inlets 71 may have a height which is less than 10% of the height of the primary suction inlet 33, including all values and ranges therein. The primary suction inlet(s) 33 collectively have a length that is less than the length of the agitation chamber 22. For example, the collective length of the primary suction inlet(s) 33 is less than 80% of the length of the agitation chamber 22, e.g., the collective length of the primary suction inlet(s) 33 may be less than 60% of the length of the agitation chamber 22; the collective length of the primary suction inlet(s) 33 may be less than 50% of the length of the agitation chamber 22; the collective length of the primary suction inlet(s) 33 may be less than 40% of the length of the agitation chamber 22; and/or the collective length of the primary suction inlet(s) 33 may be less than 30% of the length of the agitation chamber 22, including all values and ranges therein.

According to one aspect, the upper surface of the secondary suction inlets 71 may be disposed 3-5 mm from the surface to be cleaned when the vacuum cleaner 10 is disposed on the surface to be cleaned. The secondary suction inlets 71 may be configured to extend from the primary suction inlet 33 across substantially the entire length of the agitation chamber 22. This configuration may enhance suction of the vacuum cleaner 10 by reducing and/or eliminating dead spots within the agitation chamber 22 in which the air flow is too low to entrain debris. Additionally (or alternatively), the upper surface of the primary suction inlet 33 may be 12-18 mm (e.g., 15 mm) from the upper surface of the secondary suction inlets 71 (e.g., 15-21 mm from the floor).

Figure 7:
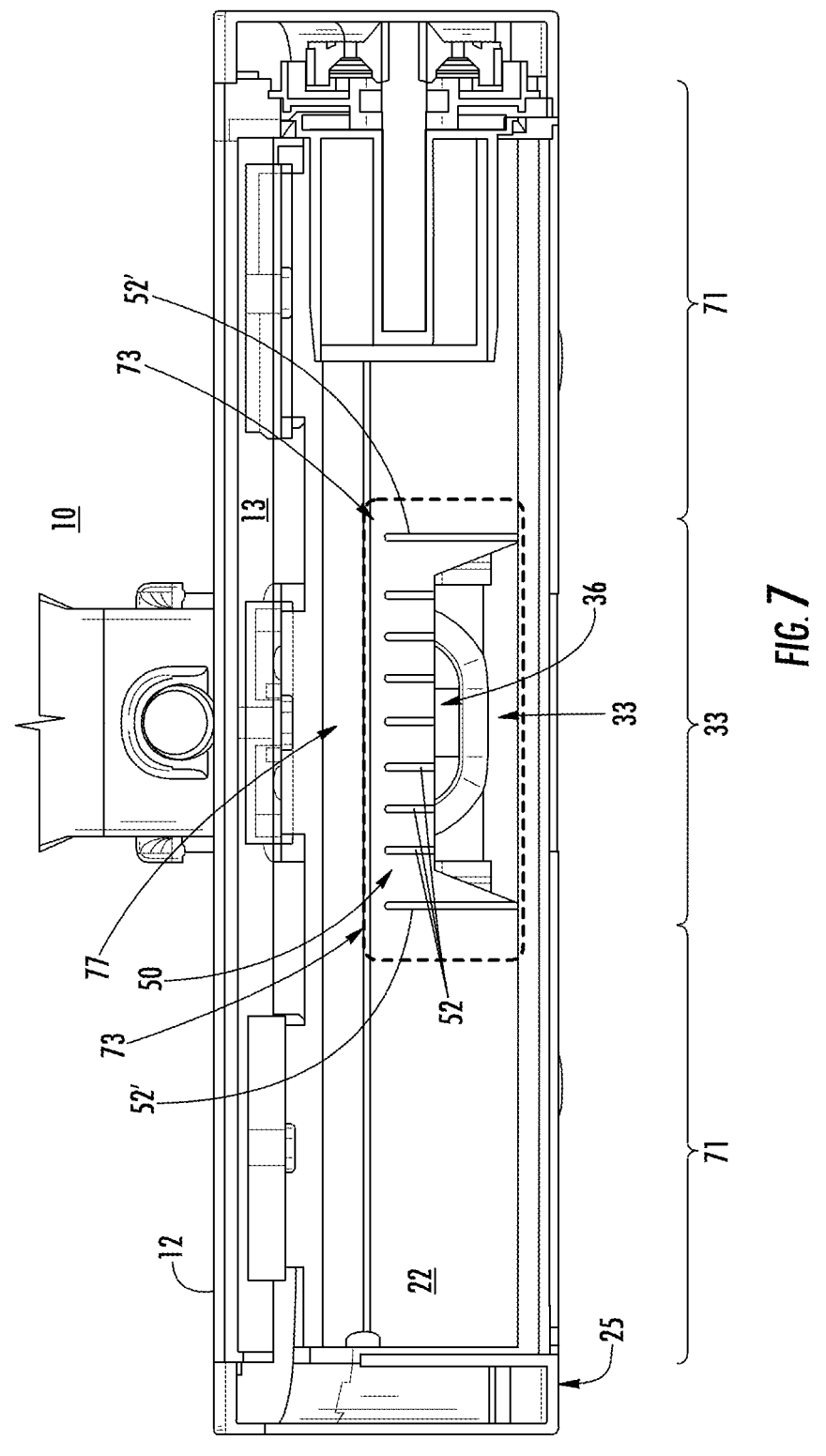
FIG. 7 generally illustrates a cross-sectional view of another embodiment of the combing unit taken along lines VI-VI of FIG. 2.
Figure 7A:
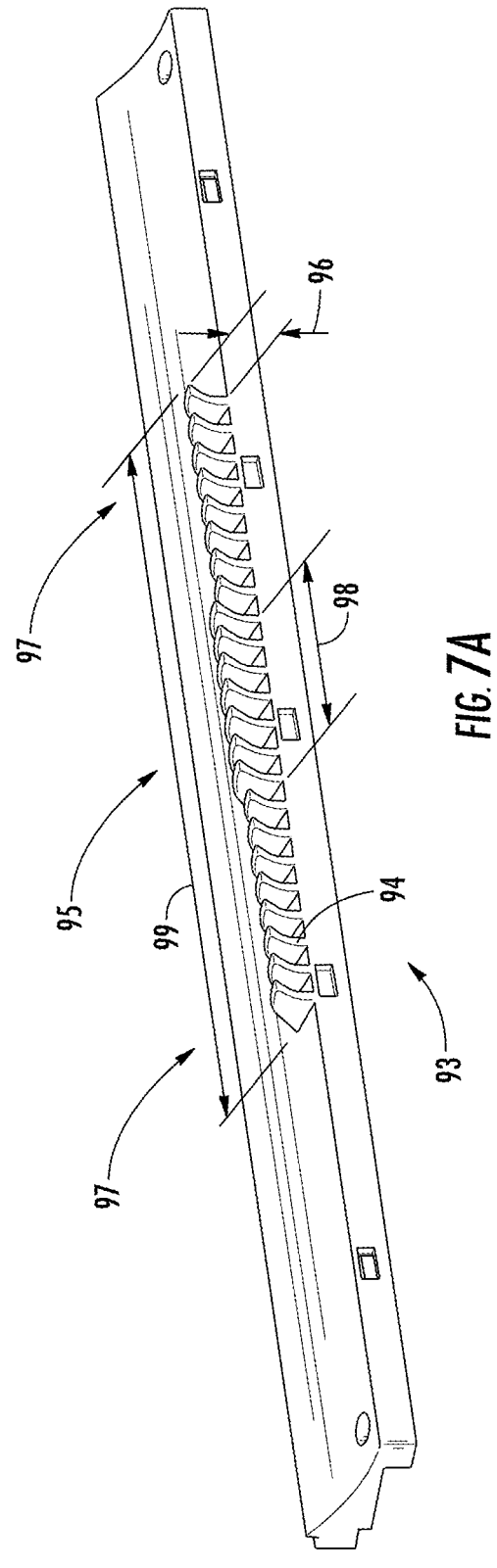
FIG. 7A shows a perspective view of an example of a combing unit having teeth in a central region with a length that measures greater than teeth in a lateral (or end) region, consistent with embodiments of the present disclosure.

As discussed herein, the fingers 52 of the combing unit 50 may be configured to contact the agitator 18, e.g., the bristles 60 and/or sidewall 62. According to one aspect, the fingers 52 of the combing unit 50 may all have substantially the same height as generally illustrated in FIGS. 4-6. According to one aspect, the fingers 52 may have a height of 8-10 mm, and the combing unit 50 may have an overall length of 30-40 mm (e.g., but not limited to, 35 mm). The plurality of fingers 52 of the combing unit 50 may extend across the entire length of the upper portion of the primary suction inlet 33. Alternatively, one or more of the fingers 52 may have a different length. For example, one or more of the fingers 52' on the lateral region 73 may have a longer length as generally illustrated in FIG. 7. In other words, the one or more fingers 52' corresponding to the lateral region 73 may have a length that measures greater than the teeth 52 which correspond to a central region 77. By way of further example, one or more of the fingers 52' within the lateral region 73 may have a length that measures less than the one or more fingers 52 within the central region 77. An example of a combing unit 93 having a plurality of fingers 94, wherein the portion of the plurality of fingers 94 correspond-ing to a central region 95 of the combing unit 93 have a length 96 that measures greater than the length 96 of the portion of the plurality of finger 94 corresponding to lateral regions 97, is shown in FIG. 7A. As shown in FIG. 7A, the central region 95 extends between each of the lateral regions 97. A length 98 of the central region 95 may measure in a range of 20% to 60% of a length 99 of the combing unit 93.

Figure 8:
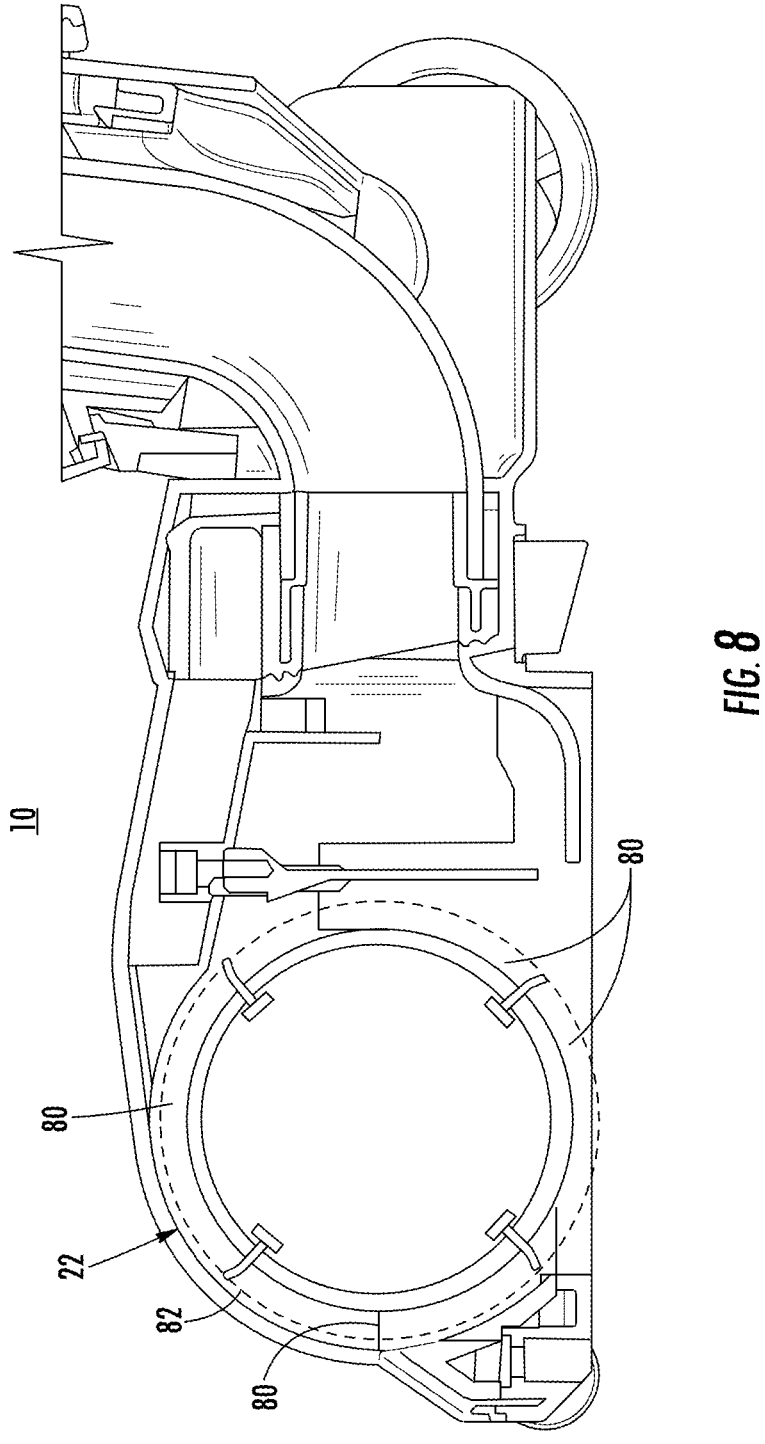
FIG. 8 generally illustrates a cross-sectional view of one embodiment of a plurality of sectioned agitator chambers of the vacuum cleaner of FIG. 1 taken along line II-II.

Turning now to FIG. 8, the present disclosure may also feature a plurality of sectioned agitator chambers 80. In particular, the sectioned agitator chambers 80 may extend between the agitator 18 and an inner wall 82 defining the agitation chamber 22. The pressure within the sectioned agitator chambers 80 may be higher and/or lower compared to the pressure within the remaining sections of the agitation chamber 22 (e.g., the pressure of the agitation chamber 22 proximate to the opening 23) and/or the suction tube 36. The sectioned agitator chambers 80 may be defined by the bristles 60 and/or sidewalls 62 extending from the agitator body 40 and contacting against the inner wall 82 of the agitation chamber 22. In particular, the bristles 60 and/or sidewalls 62 may create localized sealing with the inner wall 82. The shape, size, and pattern of the bristles 60 and/or sidewalls 62 may be used to adjust the pressure within the sectioned agitator chambers 80 as the agitator 18 rotates about the pivot axis 20. While the illustrated example is shown having four sectioned agitator chambers 80, it should be appreciated that the vacuum cleaner 10 may have greater than or less than four sectioned agitator chambers 80.

Figure 9:
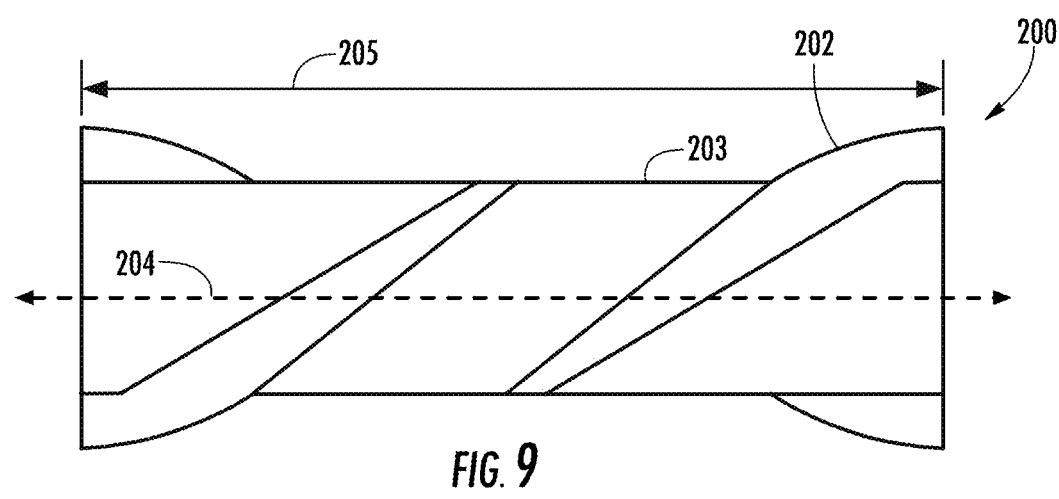
FIG. 9 is a side schematic view of an agitator capable of being used with the vacuum cleaner of FIG. 1, consistent with embodiments of the present disclosure.

Turning now to FIG. 9, a schematic view of an agitator 200, which may be an example of the agitator 18 of FIG. 1, is generally illustrated. As shown, the agitator 200 includes at least one resiliently deformably flap 202 (which may be an example of the sidewall 62) extending helically around an elongated main body 203 of the agitator 200 in a direction along a longitudinal axis 204 of the agitator 200. As dis-cussed herein, the agitator 200 may not include any bristles; however, it should be appreciated that the agitator 200 may optionally include bristles in addition to (or without) the flaps 202.

The flap 202 may generally be described as a continuous strip that extends longitudinally along at least a portion of and in a direction away from the elongated main body 203 of the agitator 200. In some instances, the flap 202 can extend longitudinally along the elongated main body 203 for a substantial portion (e.g., at least 30%, at least 40%, at least 50%, at least 60%, at least 70%, at least 80%, at least 90%, at least 95%, or at least 99%) of a length 205 the elongated main body 203. The flap 202 is configured to engage (e.g., contact) a surface to be cleaned as the agitator 200 is rotated such that debris is urged in a direction of, for example, the opening/air inlet 23 of the vacuum cleaner 10 of FIG. 1.

In some instances, the flap 202 can extend helically around the main body 203 of the agitator 200 according to a first direction. In other instances, the flap 202 can extend helically around the main body 203 of the agitator 200 according to a first and a second direction such that at least one chevron shape is formed.

The helical shape of the flap 202, as the flap 202 extends around the elongated main body 203 of the agitator 200, can be configured to urge fibrous debris towards one or more predetermined locations along the agitator 200. For example, when fibrous debris, such as hair, becomes entangled around the agitator 200, engagement (e.g., con-tact) of the flap 202 with the surface to be cleaned and/or the rib 116 of FIG. 1 can cause the fibrous debris to be urged along the agitator 200 in accordance with a helical shape of the flap 202.

Figure 10:
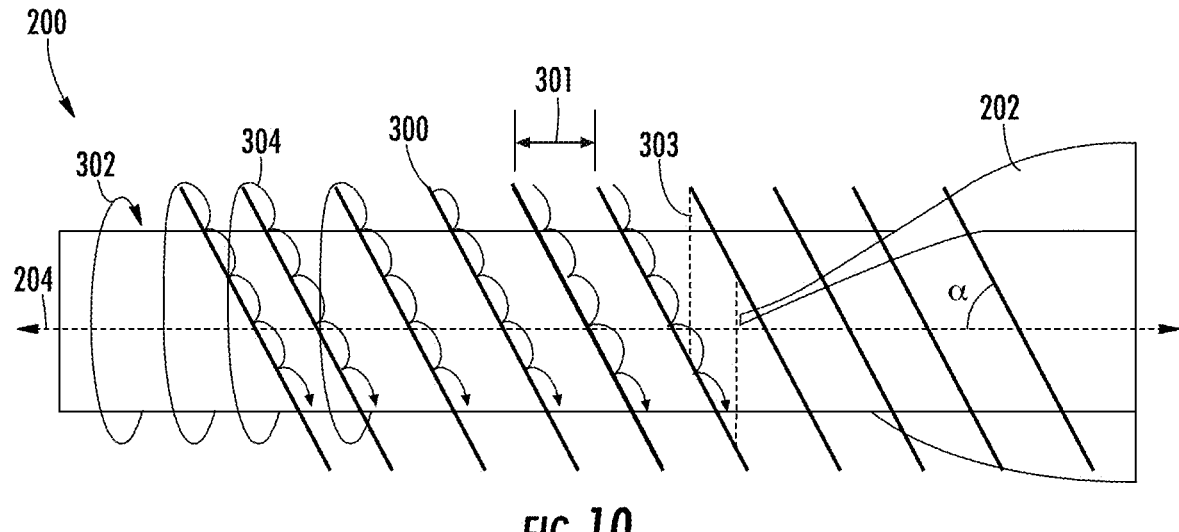
FIG. 10 shows a schematic view of a plurality of ribs configured to engage (e.g., contact) the agitator of FIG. 9, consistent with embodiments of the present disclosure.

FIG. 10 shows a schematic example of a plurality of ribs 300, which may be examples of the rib 116, engaging (e.g., contacting) the agitator 200. As shown, each of the ribs 300 extend transverse to the longitudinal axis 204 of the agitator 200 at a non-perpendicular angle and are configured to engage (e.g., contact) at least a portion of the flap 202. For example, a rib angle α formed between the longitudinal axis 204 and a respective one or more of the ribs 300 may measure in range of about 30° to about 60°. As the number of ribs 300 is increased and the rib angle α is decreased, the rate at which fibrous debris is urged along the agitator 200 may be increased.

In some instances, the ribs 300 can be configured to extend at least partially around the agitator 200. As such, the ribs 300 can have an arcuate shape. Such a configuration may increase the amount of engagement (e.g., contact) between the flaps 202 and the ribs 300. The ribs 300 are configured to cause the flap 202 to deform in response to the flap 202 engaging (e.g., contacting) the ribs 300. For example, the ribs 300 may be made of a plastic (e.g., acrylonitrile butadiene styrene), a metal (e.g., an aluminum or steel alloy), and/or any other suitable material and the flap 202 may be made of a rubber (e.g., a natural or synthetic rubber) and/or any other suitable material.

In some instances, each of the ribs 300 can extend parallel to each other. In other instances, one or more of the ribs 300 may not extend parallel to at least one other of the ribs 300 (e.g., at least one rib 300 may extend transverse to at least one other rib 300). As shown, in some instances, each of the ribs 300 may be evenly spaced. In other instances, the ribs 300 may not be evenly spaced. For example, a separation distance 301 extending between the ribs 300 may decrease or increase in a migration direction 304 that extends along the longitudinal axis 204 of the agitator 200. The migration direction 304 may generally be described as the direction in which the fibrous debris is urged.

As shown, each of the ribs 300 can be oriented such that at least a portion of at least one rib 300 overlaps at least a portion of at least one other rib 300 (e.g., a longitudinal location along a first rib corresponds to a longitudinal location along an adjacent rib). As a result, an overlap region 303 can extend between two adjacent ribs 300. The overlap region 303 may result in a substantially continuous urging of fibrous debris along the migration direction 304.

As the agitator 200 is rotated according to a rotation direction 302, the flap 202 engages (e.g., contacts) a portion of at least one of the ribs 300 and moves along a peripheral edge of the ribs 300. The inter-engagement between the ribs 300 and the flap 202 urges fibrous debris in the migration direction 304.

In some instances, there may be a plurality of migration directions 304. For example, the agitator 200 can be con-figured to urge fibrous debris towards opposing ends of the agitator 200. The migration direction 304 may be based, at least in part, on a helical pitch of the flap 202, the rotation direction 302, and/or the rib angle α.

Figure 11:
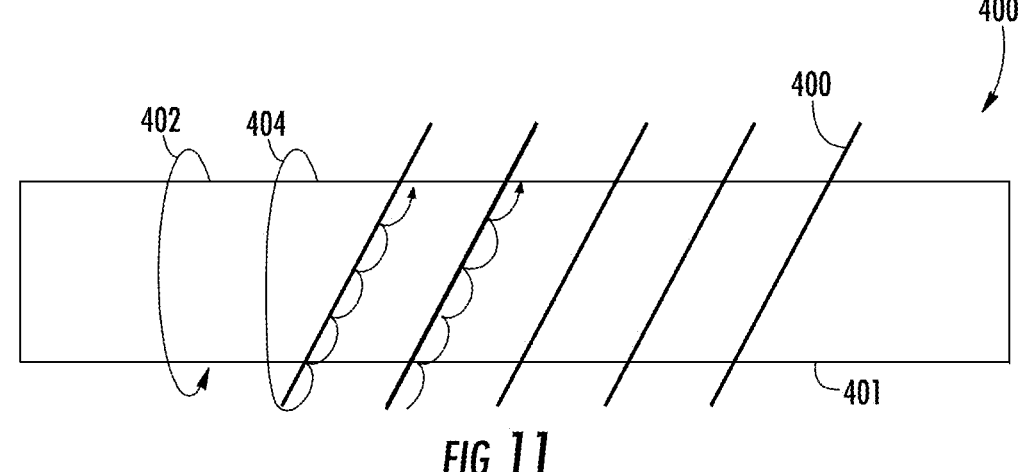
FIG. 11 shows a schematic view of a plurality of ribs configured to engage (e.g., contact) an agitator, consistent with embodiments of the present disclosure.

FIG. 11 shows a schematic example of a plurality of ribs 400, which may be examples of the rib 116, engaging (e.g., contacting) an agitator 401, which may be an example of the agitator 200 of FIG. 9. As shown, a rotation direction 402 and a migration direction 404 are opposite that of FIG. 10.

As such, the migration directions 304 and 404 may generally be described as being based, at least in part, on an orientation of the ribs 300 and 400.

Figure 12:
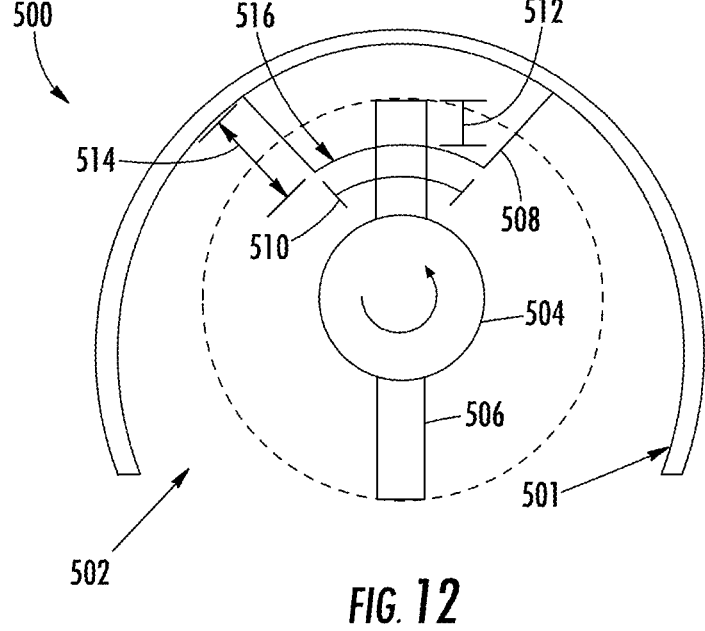
FIG. 12 shows a schematic cross-sectional end view of a surface cleaning head, consistent with embodiments of the present disclosure.

FIG. 12 shows a schematic cross-sectional end view of a surface cleaning head 500, which may be an example of the surface cleaning head 12 of FIG. 1. As shown, the surface cleaning head 500 includes an agitator chamber 502 configured to receive an agitator 504, which may be an example of the agitator 200 of FIG. 9. The agitator 504 includes a plurality of flaps 506 and the surface cleaning head 500 includes at least one rib 508 configured to engage (e.g., contact) the plurality of flaps 506. As shown, the at least one rib 508 extends from an inner surface 501 of the agitator chamber 502. For example, the at least one rib 508 may be formed from or coupled to at least a portion of the surface cleaning head 500.

An overlap distance 512 between the rib 508 and the flap 506 may be measured from an engaging surface 516 of the at least one rib 508 to a distal most portion of the flap 506 adjacent the rib 508 when the flap 506 is engaging (e.g., contacting) the at least one rib 508. For example, the overlap distance 512 may measure, at its maximum, in a range of about 1 millimeter (mm) to about 3 mm. By way of further example, the overlap distance 512 may measure, at its maximum, in a range of about 1 mm to about 2 mm.

In instances having a plurality of ribs 508, a measure of a height 514 of one or more ribs 508 may differ from at least one other rib 508. As such, the overlap distance 512 can be configured to vary between ribs 508. Additionally, or alternatively, a measure of a length 510 of the engaging surface 516 may differ from at least one other rib 508. Alternatively, a measure of the height 514 and/or a measure of the length 510 of the engaging surface 516 may be substantially the same for each of the ribs 508.

In some instances, a friction increasing material may be coupled to at least a portion of the engaging surface 516. For example, a rubber (e.g., natural or synthetic rubber) may extend along at least a portion of the engaging surface 516. Such a configuration may improve the rate at which fibrous materials are urged along the agitator 504.

Figure 13:
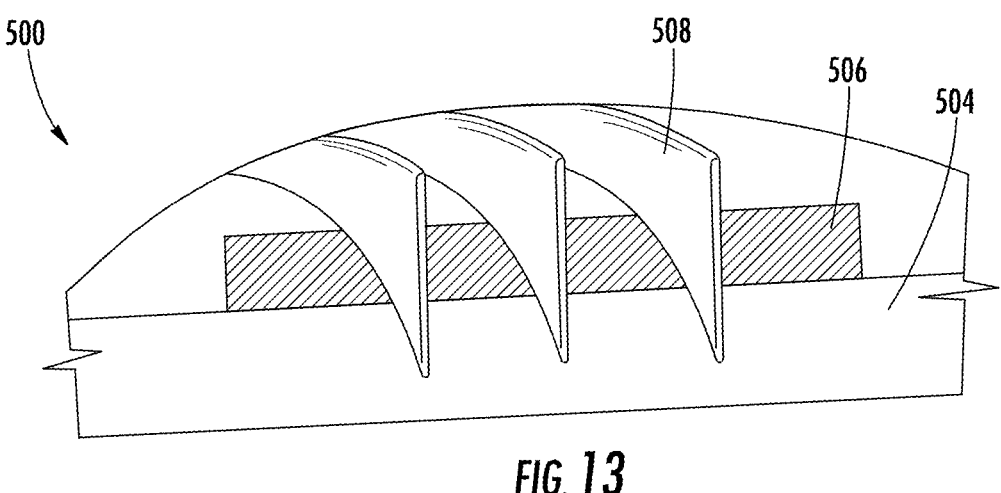
FIG. 13 shows a cross-sectional perspective view of the surface cleaning head of FIG. 12, consistent with embodiments of the present disclosure.

FIG. 13 shows a schematic cross-sectional perspective view of a surface cleaning head 500. As shown, the surface cleaning head 500 may include a plurality of ribs 508 that are each configured to engage (e.g., contact) a flap 506. As shown, the ribs 508 are configured to extend at least partially around at least a portion of the agitator 504.

Figure 14:
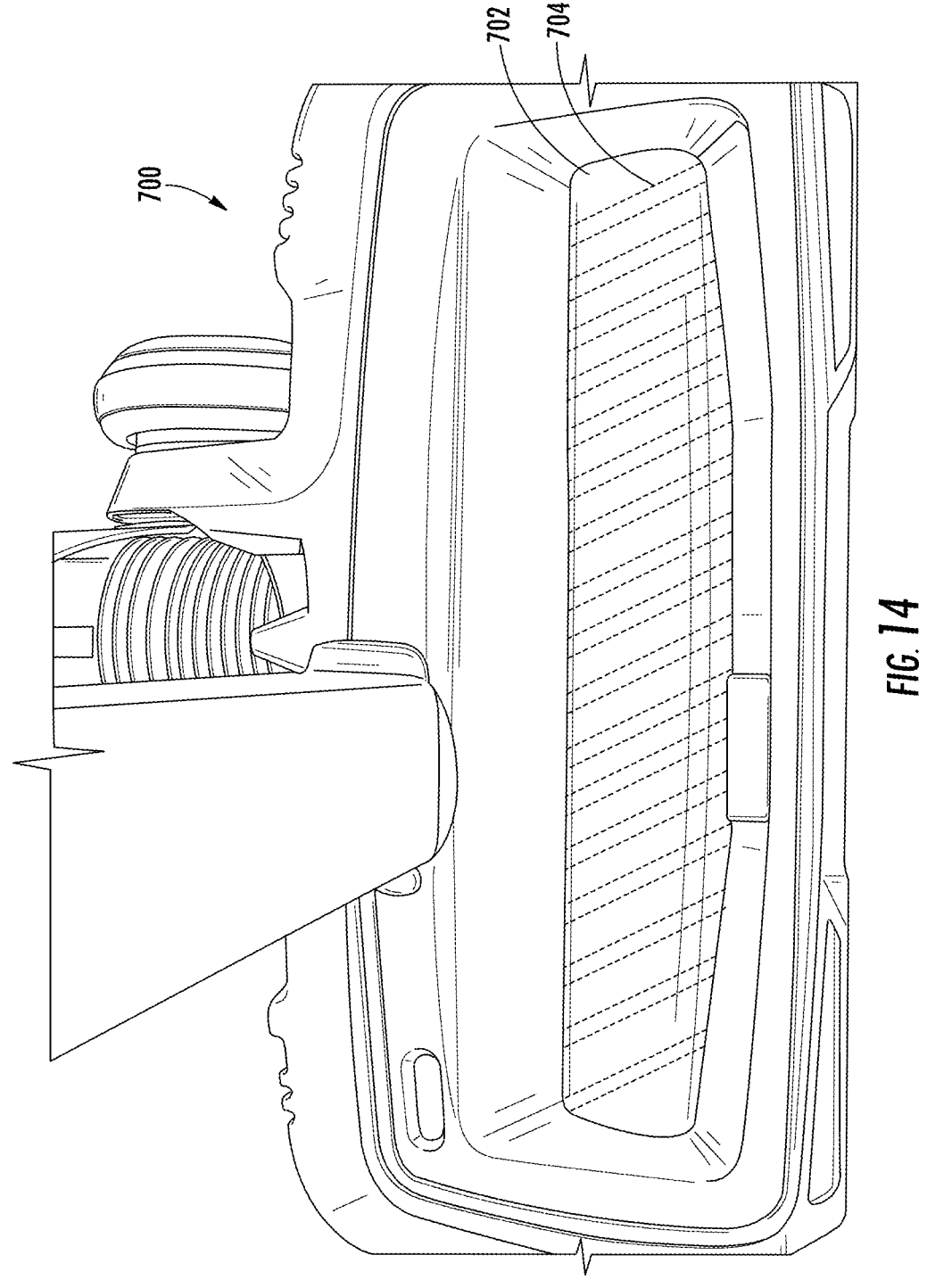
FIG. 14 shows a perspective view of a surface cleaning head, consistent with embodiments of the present disclosure.
Figure 14A:
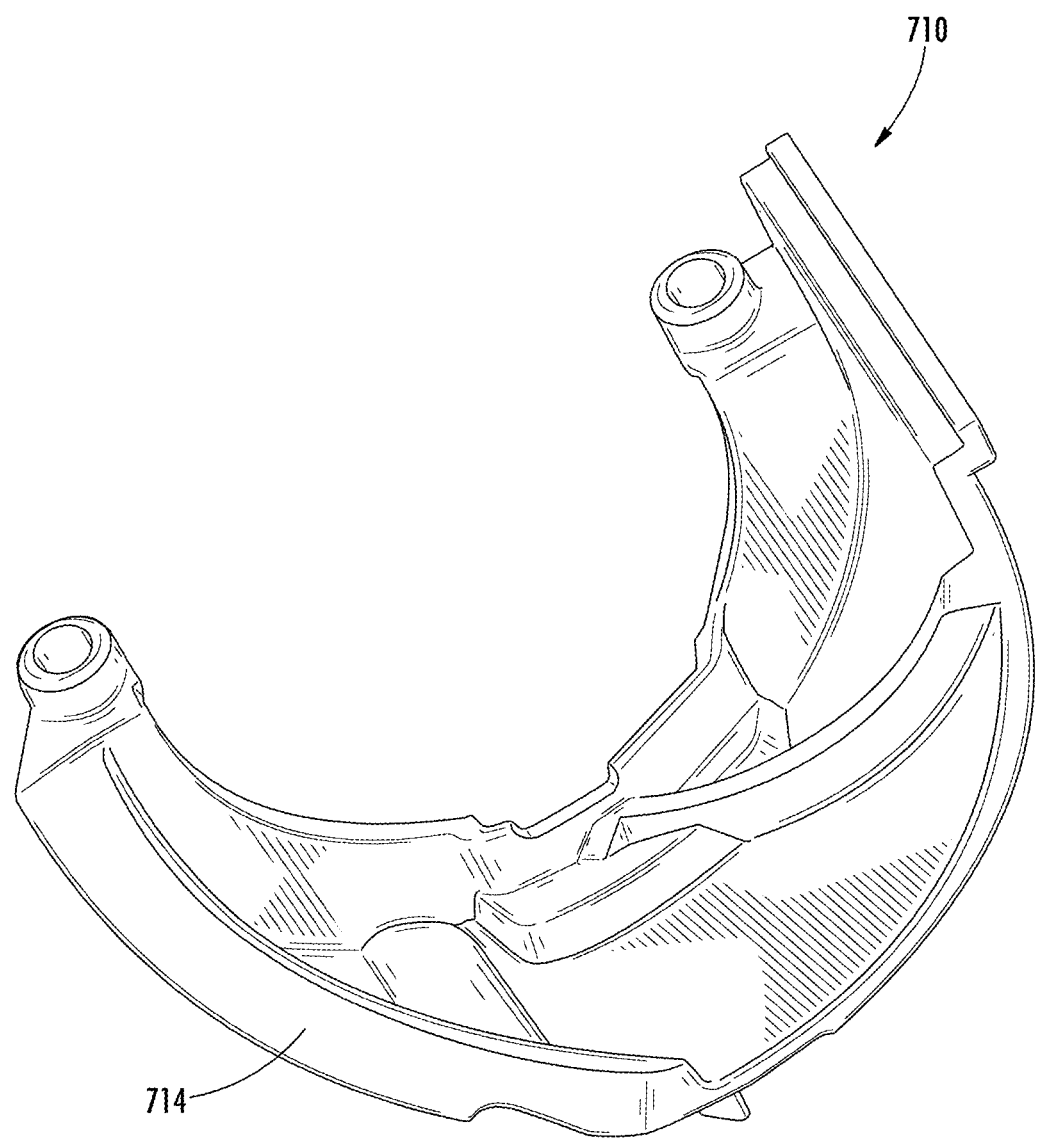
FIG. 14A shows a perspective view of an example of an agitator cover, consistent with embodiments of the present disclosure.
Figure 14B:
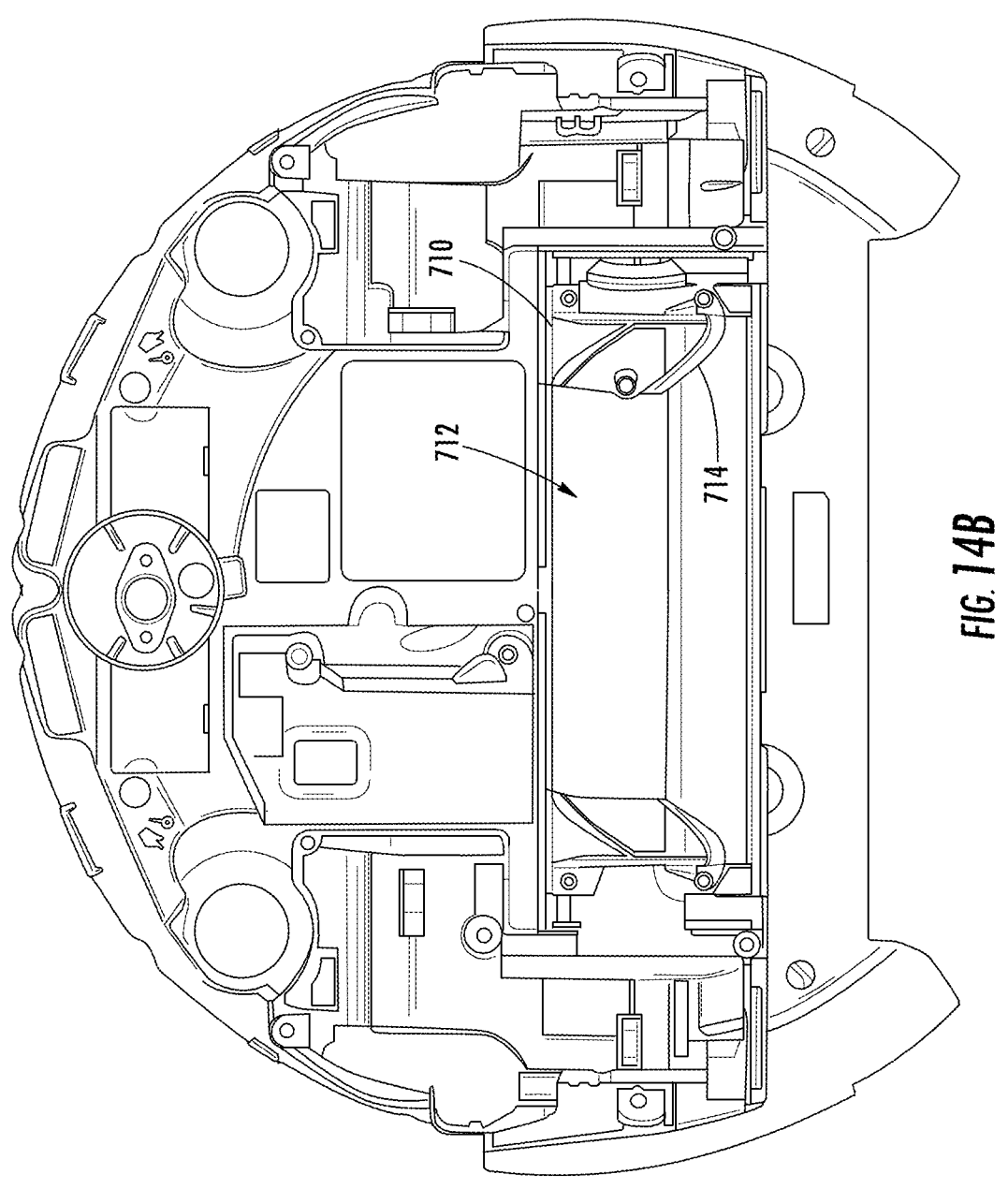
FIG. 14B shows a perspective view of a portion of a robotic cleaner having the agitator cover 14A coupled thereto, consistent with embodiments of the present disclosure.

FIG. 14 shows a perspective view of a surface cleaning head 700, which may be an example of the surface cleaning head 12 of FIG. 1. The surface cleaning head 700 may include an agitator cover 702 having a plurality of ribs 704 (shown in hidden lines) extending therefrom. The agitator cover 702 may be coupled to or integrally formed from the surface cleaning head 700 such that the agitator cover 702 defines at least a portion of an agitator chamber within which an agitator (e.g., the agitator 18) rotates. In some instances, the agitator cover 702 may not be visible to a user of the surface cleaning head 700 and may have length that measures less than that of the agitator. For example, the surface cleaning head 700 may include a plurality of agitator covers 702, wherein each agitator cover 702 corresponds to a respective distal end of the agitator and the combined length of the agitator covers 702 measures less that a total length of the agitator. FIG. 14A shows an example of an agitator cover 710 that has a length that measures less than a total length of the agitator and FIG. 14B shows an example of an agitator chamber 712 of a robotic cleaner having a plurality of agitator covers 710 disposed therein at opposing distal ends of the agitator chamber 712. The agitator covers 710 include ribs 714 and may be coupled to or integrally formed from the agitator chamber 712 such that the ribs 714 are positioned to engage at least a portion of an agitator. In other words, the agitator chamber 712 includes ribs at opposing distal ends of the agitator chamber 712. By positioning the agitator covers 710 at opposing distal ends of the agitator chamber 712, migration of fibrous debris over the ends of the agitator (e.g., into the bearings and/or axle) may be reduced and/or prevented while mitigating wear to the agitator.

The ribs 704 are configured to engage (e.g., contact) an agitator (e.g., the agitator 18) disposed within the surface cleaning head 700 such that fibrous debris (e.g., hair) entangled around the agitator can be urged towards one or more locations along the agitator at least in part by the ribs 704.

In some instances, the ribs 704 may extend along only a portion of the agitator cover 702. For example, the ribs 704 may extend along a central portion of the agitator cover 702 (e.g., a portion corresponding to 20% to 60% of the length of the agitator cover 702 that is substantially centrally located between distal ends of the agitator cover 702). By way of further example, the ribs 704 may extend along one or more distal end portions of the agitator cover 702 (e.g., a portion corresponding to 15% to 40% of the length of the agitator cover 702 that is proximate to or extend from a distal end of the agitator cover 702).

While the ribs 704 are shown as being disposed along the agitator cover 702, the ribs 704 may be disposed elsewhere within the surface cleaning head 700. As such, the ribs 704 can generally be described as being disposed within the surface cleaning head 700 such that the ribs 704 are stationary relative to the agitator when the agitator is rotated. For example, the ribs 704 may be disposed along a sidewall of the surface cleaning head 700. In these instances, the ribs 704 may not obscure a view of the agitator through the agitator cover 702, when the agitator cover 702 is transparent and visible to a user.

Figures 15, 16:
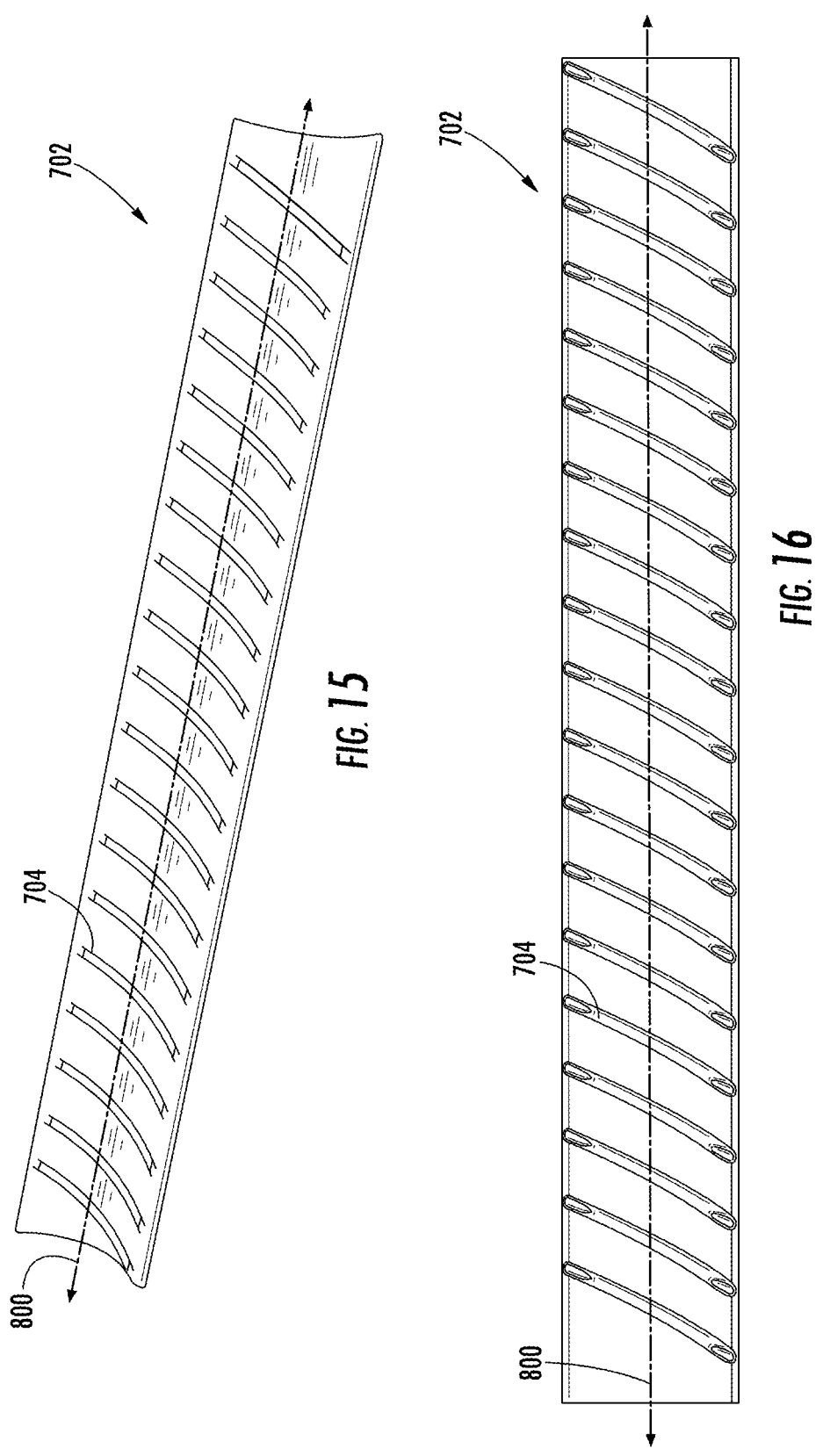
FIG. 15 shows a perspective view of an agitator cover which is capable of being used with the surface cleaning head of FIG. 14, consistent with embodiments of the present disclosure.
FIG. 16 shows a bottom view of the agitator cover of FIG. 15, consistent with embodiments of the present disclosure.

FIGS. 15 and 16 show a bottom perspective view and a bottom view of the agitator cover 702 of FIG. 14, respectively. As shown, the plurality of ribs 704 each extend parallel to each other and transverse (e.g., at a non-perpendicular angle) to a longitudinal axis 800 of the agitator cover 702. The ribs 704 may generally be described as being oriented to urge fibrous debris towards a single distal end of the agitator.

Figures 17, 18:
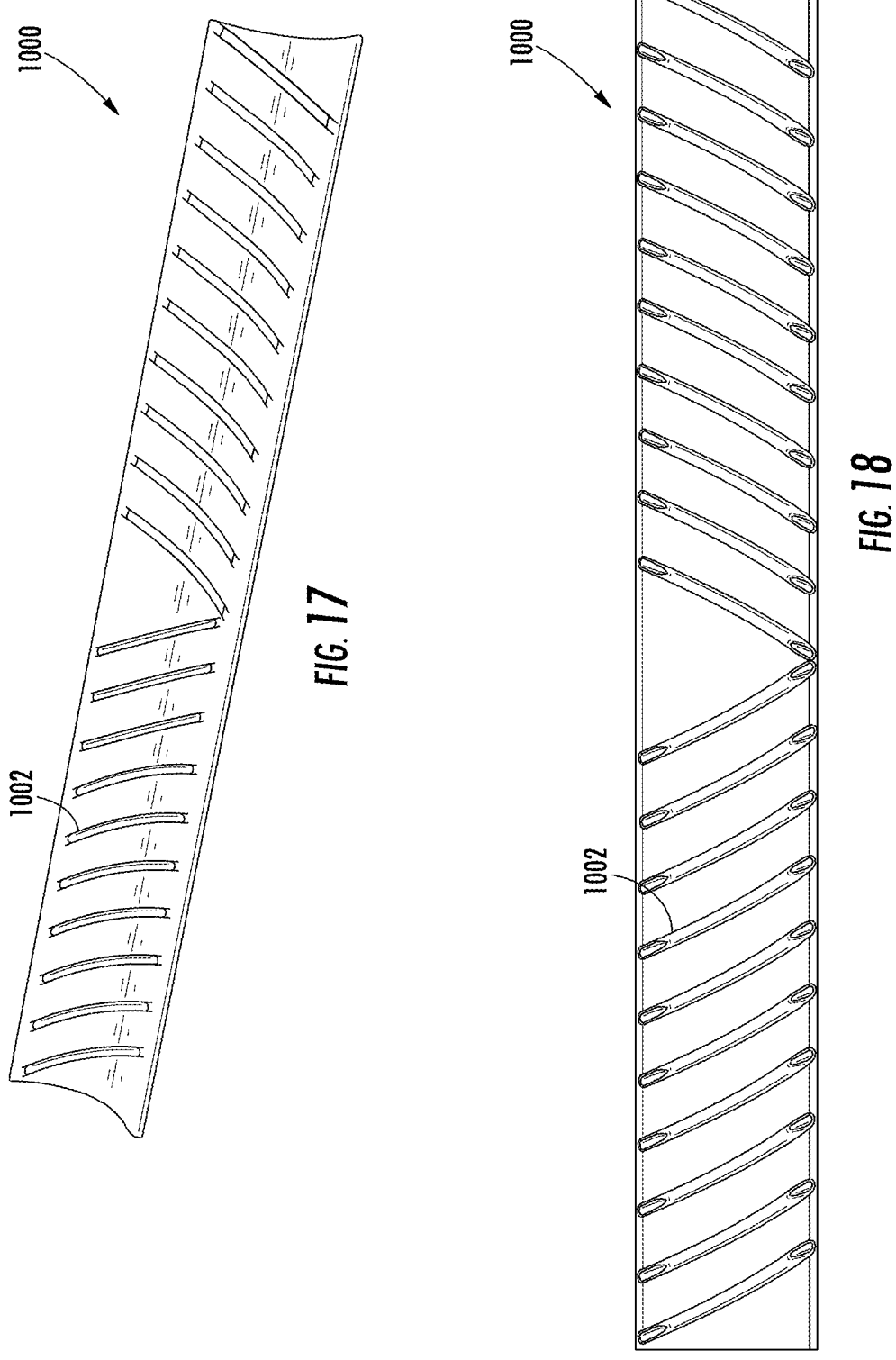
FIG. 17 shows a perspective view of an agitator cover which is capable of being used with the surface cleaning head of FIG. 14, consistent with embodiments of the present disclosure.
FIG. 18 shows a bottom view of the agitator cover of FIG. 17, consistent with embodiments of the present disclosure.

FIGS. 17 and 18 show a perspective view and a bottom view of an agitator cover 1000 that may be used with the surface cleaning head 700 of FIG. 14. As shown, the agitator cover 1000 includes a plurality of ribs 1002. The ribs 1002 are configured to engage (e.g., contact) an agitator (e.g., the agitator 18) such that fibrous debris is urged towards at least one predetermined location between distal ends of the agitator (e.g., towards the center of the agitator). As shown, at least one of the ribs 1002 extends transverse to at least one other of the ribs 1002. As such, the transverse ribs 1002 can generally be described as collectively defining a chevron shape. In some instances, the agitator may include one or more flaps that extend helically around an elongated main body of the agitator according to a first and a second direction such that the one or more flaps define a chevron shape.

Figures 19, 20, 21:
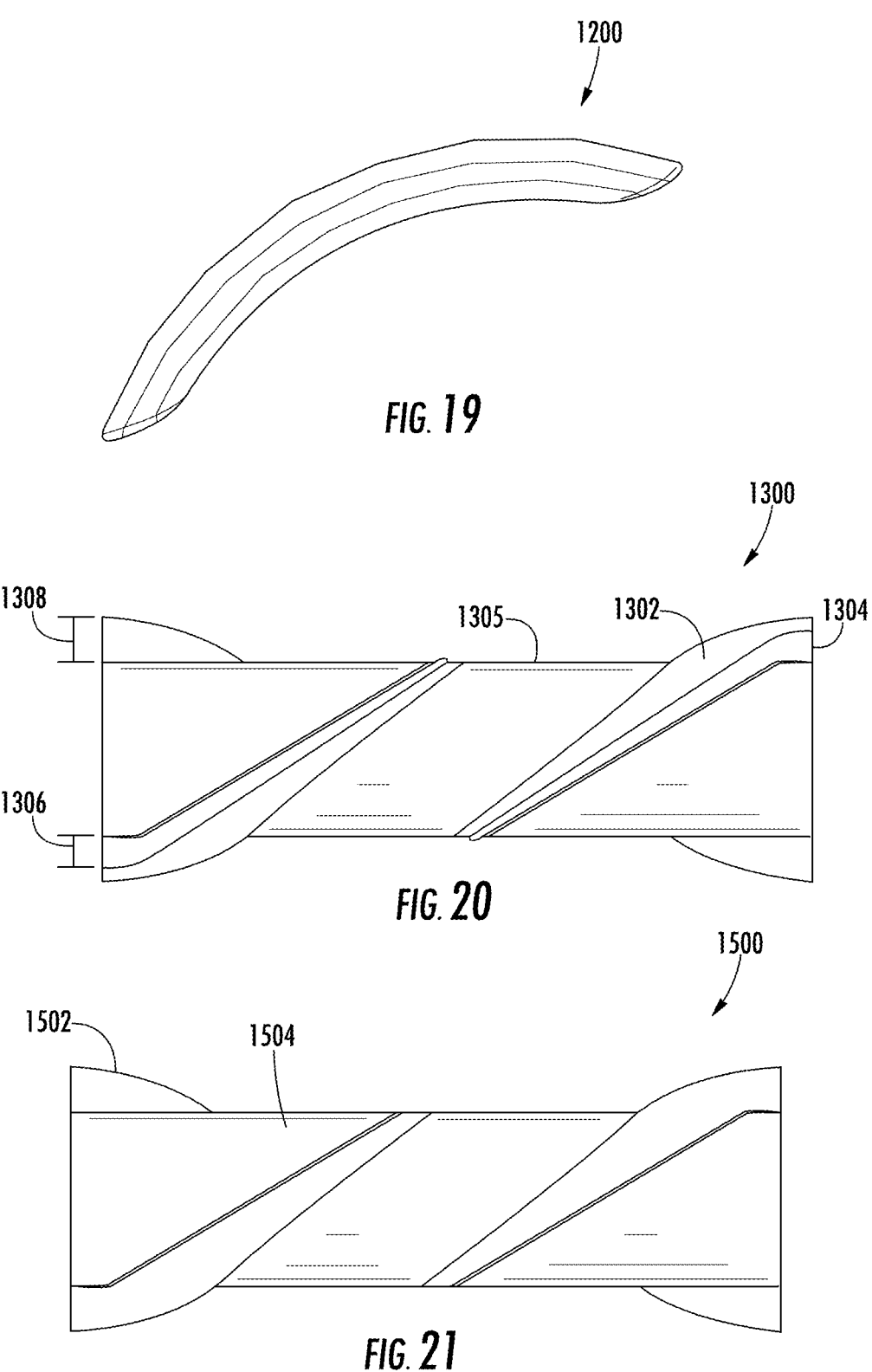
FIG. 19 shows a side view of a rib, consistent with embodiments of the present disclosure.
FIG. 20 shows a schematic view of an agitator having flaps and bristles, consistent with embodiments of the present disclosure.
FIG. 21 shows a schematic view of an agitator having bristles, consistent with embodiments of the present disclosure.

FIG. 19 shows a side view of a rib 1200, which may be an example of the rib 116 of FIG. 1. The rib 116 can have an arcuate shape that extends at least partially around an agitator (e.g., the agitator 18) in a direction transverse (e.g., at a non-perpendicular angle) to a longitudinal axis of the agitator. As such, the rib 1200 may generally be described as extending helically around the elongated main body of the agitator. In some instances, the rib 1200 can be coupled to a surface cleaning head (e.g., the surface cleaning head 12) such that the rib 1200 is stationary relative to the agitator and urges fibrous debris towards a predetermined location.

FIG. 20 shows a schematic example of an agitator 1300, which may be an example of the agitator 18 of FIG. 1. As shown, the agitator 1300 includes a plurality of flaps 1302 and a plurality of bristle strips 1304 extending substantially parallel to a corresponding flap 1302. The bristle strips 1304 may include a plurality of individual bristles extending from an elongated main body 1305 of the agitator 1300.

A bristle height 1306 may measure less than a flap height 1308. For example, the bristle height 1306 may be such that, when the agitator 1300 is rotated within a surface cleaning head, such as the surface cleaning head 12 of FIG. 1, the bristles strips 1304 do not engage (e.g., contact) one or more ribs configured to urge fibrous debris along the agitator 1300. By way of further example, in some instances, the bristle strip height 1306 may measure such that the portion of bristles engaging (e.g., contacting) the one or more ribs measures less than the portion of the flap 1302 engaging (e.g., contacting) the one or more ribs. Alternatively, the bristle height 1306 may measure greater than the flap height 1308. As such, the bristle strips 1304 may come into engagement (e.g., contact) with one or more ribs configured to urge fibrous debris along the agitator 1300. In some instances, the bristle height 1306 may measure substantially equal to the flap height 1308. As such, both the bristle strips 1304 and the flaps 1302 may come into engagement (e.g., contact) with one or more ribs configured to urge fibrous debris along the agitator 1300. In some instances, the agitator 1300 may not include the bristle strips 1304 (for example, as shown, in FIG. 9). In some examples, the bristle height 1306 and/or the flap height 1308 may be measured from the axis of rotation of the agitator 1300.

FIG. 21 shows a schematic example of an agitator 1500, which may be an example of the agitator 18 of FIG. 1. As shown, the agitator 1500 includes a plurality of bristle strips 1502 extending helically around an elongated main body 1504 of the agitator 1500. The bristle strips 1502 may include a plurality of individual bristles extending from an elongated main body 1504 of the agitator 1500.

Figures 22, 23:
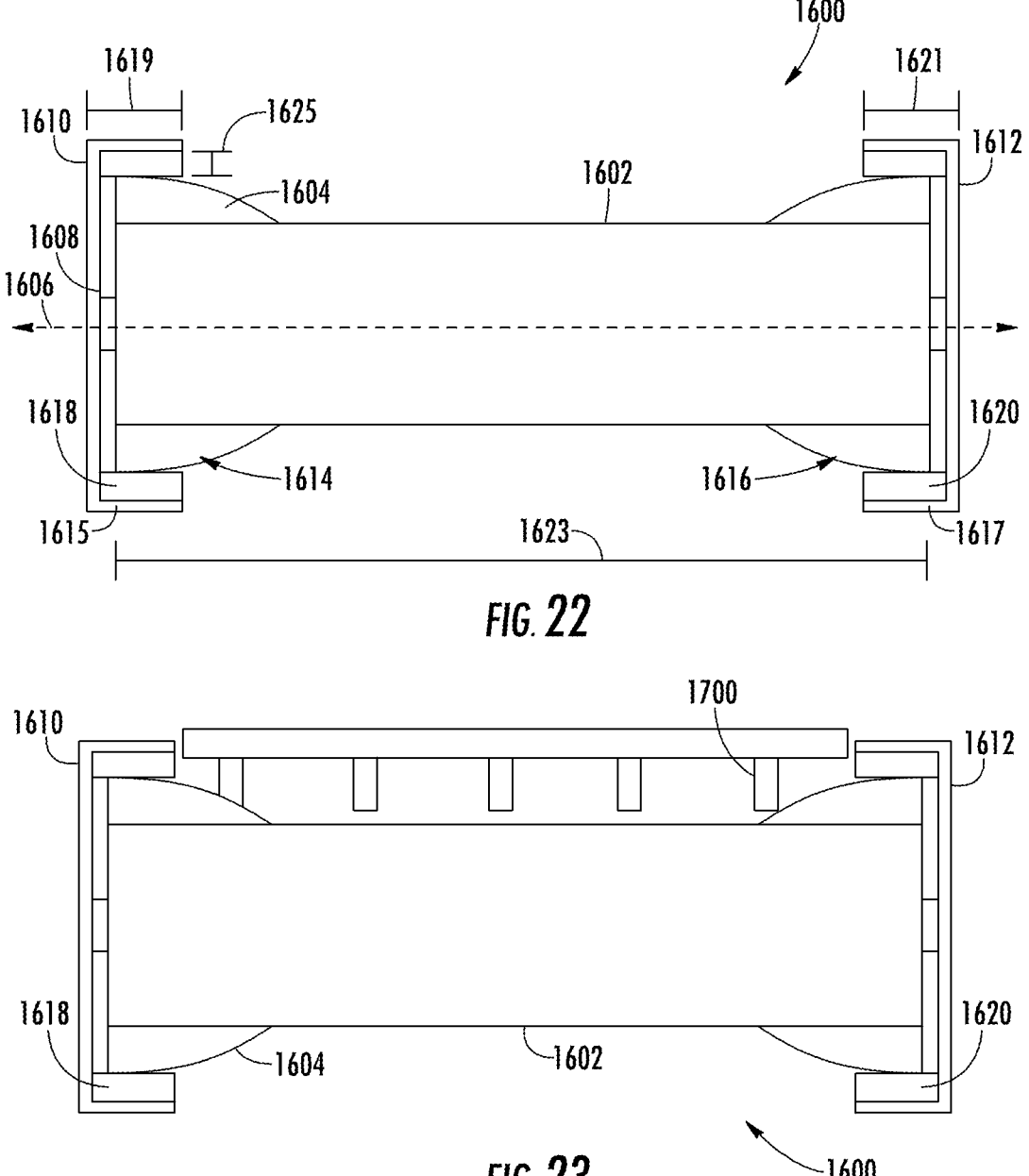
FIG. 22 shows a schematic cross-sectional view of an agitator having end caps, consistent with embodiments of the present disclosure.
FIG. 23 shows a schematic cross-sectional view of an example of the agitator of FIG. 22 having ribs extending along a portion of the agitator and disposed between the end caps, consistent with embodiments of the present disclosure.

FIG. 22 shows a schematic cross-sectional view of an agitator 1600, which may be an example of the agitator 18 of FIG. 1. As shown, the agitator 1600 includes an elongated main body 1602 having one or more flaps 1604 extending therefrom. The flaps 1604 are configured to engage a surface to be cleaned (e.g., a floor). The elongated main body 1602 is configured to rotate about a rotation axis 1606 that extends longitudinally through the elongated main body 1602. One or more axles 1608 can be disposed along the rotation axis 1606 and be coupled to the elongated main body 1602. For example, a plurality of axles 1608 can be coupled to the elongated main body 1602 at opposing ends of the main body 1602.

A first and a second end cap 1610 and 1612 can be disposed at opposing distal ends of the elongated main body 1602. The end caps 1610 and 1612 may generally be described as an agitator cover, wherein at least a portion the agitator cover extends completely around an axis of rotation of an agitator. The first and second end caps 1610 and 1612 are configured to be fixed relative to elongated main body 1602 such that the elongated main body 1602 rotates relative to the first and second end caps 1610 and 1612. For example, the first and second end caps 1610 and 1612 can be coupled to a portion of a surface cleaning head (e.g., the surface cleaning head 12 of FIG. 1).

The first and second end caps 1610 and 1612 can define respective end cap cavities 1614 and 1616 having cavity sidewalls 1615 and 1617. At least a portion of the elongated main body 1602 and at least a portion of one or more of the flaps 1604 are received within respective ones of the end cap cavities 1614 and 1616. When the elongated main body 1602 and the one or more flaps 1604 are received within respective end cap cavities 1614 and 1616, the cavity sidewalls 1615 and 1617 extend longitudinally along the elongated main body 1602 and the one or more flaps 1604 by an extension distance 1619 and 1621. The extension distance 1619 and 1621 may measure, for example in a range of 1% to 25% of a total length 1623 of the elongated main body 1602. By way of further example, the extension distance 1619 and 1621 may measure in a range of 5% and 15% of the total length 1623 of the elongated main body 1602. By way of still further example, the extension distance 1619 and 1621 may measure 10% of the total length 1623 of the elongated main body 1602. By way of still further example, the extension distance 1619 and 1621 may measure in a range of 1.3 centimeters (cm) to 5 cm. In some instances, the extension distance 1619 and 1621 may measure differently for each of the first and second end caps 1610 and 1612.

Each of the end caps 1610 and 1612 can include one or more ribs 1618 and 1620 extending within the end cap cavities 1614 and 1616. The one or more ribs 1618 and 1620 extend toward the elongated main body 1602 in a radial direction such that the one or more ribs 1618 and 1620 engage (e.g., contact) one or more of the flaps 1604. As shown, at least a portion of the one or more flaps 1604 overlap with one or more of the ribs 1618 and 1620. For example, a measure of an overlap between the ribs 1618 and 1620 and one or more of the flaps 1604 may measure in a range of 1% and 99% of a rib thickness 1625. By way of further example, a measure of an overlap between the ribs 1618 and 1620 and one or more of the flaps 1604 may measure in a range of 10% and 75% of the rib thickness 1625. By way of still further example, a measure of an overlap between the ribs 1618 and 1620 and one or more of the flaps 1604 may measure greater than 0% and less than 99% of the rib thickness 1625. Reducing an amount of overlap between the ribs 1618 and 1620 and one or more of the one or more flaps 1604 may reduce the amount of wear experienced by the one or more flaps 1604, increasing the longevity of the one or more flaps 1604.

The one or more ribs 1618 and 1620 can be configured to urge fibrous debris (e.g., hair) in a direction away from the distal ends of the elongated main body 1602 (e.g., in a direction of a central portion of the elongated main body 1602). The interaction between the ribs 1618, 1620 and the flaps 1604 can mitigate and/or prevent fibrous debris from becoming entangled about the one or more axles 1608 and/or entrapped within one or more bearings supporting the one or more axles 1608.

The one or more flaps 1604 can be configured to cooperate with the one or more ribs 1618 and 1620 to urge fibrous debris in a direction away from the distal ends of the elongated main body 1602. For example, the one or more flaps 1604 may extend helically around at least a portion of the elongated main body 1602. In some instances, the one or more flaps 1604 may extend helically around at least a portion of the elongated main body 1602 according to two or more directions such that one or more chevron shapes are formed. In some instances, the one or more flaps 1604 can be configured to urge fibrous debris in a direction away from the distal ends of the elongated main body 1602 after the fibrous debris is spaced apart from the end caps 1610 and 1612. In these instances, the one or more flaps 1604 can urge the fibrous debris to a common location along the elongated main body 1602 such that the fibrous debris can be removed therefrom (e.g., using a combing unit/debriding rib that engages the one or more flaps 1604 and removes fibrous debris therefrom as a result of the rotation of the elongated main body 1602).

As shown in FIG. 23, one or more ribs 1700 can extend between the end caps 1610 and 1612. The ribs 1700 can be coupled to and/or integrally formed from, for example, a portion of a surface cleaning head (e.g., the surface cleaning head 12 of FIG. 1) and/or one or more of the end caps 1610 and 1612. The ribs 1700 may cooperate with the ribs 1618 and 1620 of the end caps 1610 and 1612 to urge fibrous debris (e.g., hair) towards one or more common locations along the elongated main body 1602. When the elongated main body 1602 includes one or more bristles (e.g., in addition to or in the alternative to the one or more flaps 1604) the ribs 1700 may improve the migration of fibrous debris towards one or more locations along the elongated main body 1602.

Figure 24:
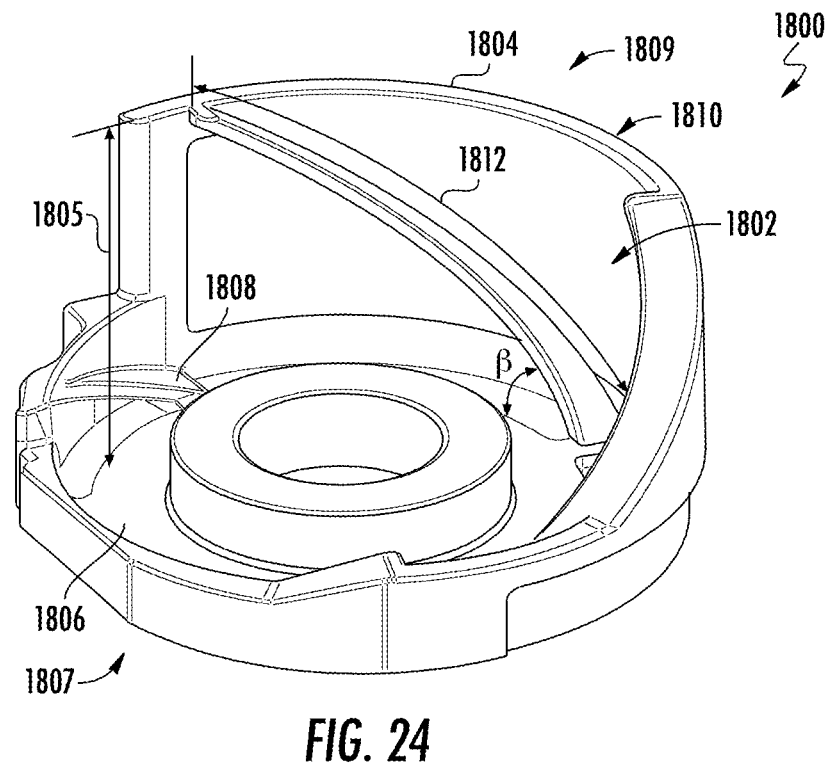
FIG. 24 shows a perspective view of an end cap for an agitator, consistent with embodiments of the present disclosure.

FIG. 24 shows a perspective view of an end cap 1800, which may be an example of the end cap 1610 of FIG. 22. As shown, the end cap 1800 defines a cavity 1802 for receiving at least a portion of an agitator (e.g., the agitator 18 of FIG. 1). The cavity 1802 is defined by a cavity sidewall 1804 extending from a cavity base 1806. The cavity sidewall 1804 may extend from the cavity base 1806 by an extension distance 1805. The extension distance 1805 extends from the cavity base 1806 to a distal surface 1810 of the cavity sidewall 1804, the distal surface 1810 being spaced apart from the cavity base 1806. A measure of the extension distance 1805 can vary along a perimeter of the cavity base 1806. For example, the end cap 1800 can be configured such that a measure of the extension distance 1805 increases with increasing distance from a surface to be cleaned when the end cap 1800 is coupled to a surface cleaning head (e.g., the surface cleaning head 12 of FIG. 1). As shown, a measure of the extension distance 1805 corresponding to a floor facing portion 1807 of the end cap 1800 measures less than a measure of the extension distance 1805 corresponding to a surface cleaning head facing portion 1809 of the end cap 1800. Such a configuration may increase the effective cleaning width of the agitator while still mitigating and/or preventing hair migration into the axles and/or bearings by leaving a greater portion of the agitator exposed on the floor facing portion 1807 when compared to the surface cleaning head facing portion 1809.

The cavity sidewall 1804 can include one or more ribs 1808 that extend from the cavity sidewall 1804 and into the cavity 1802. As shown, the ribs 1808 can extend from the cavity base 1806 along the cavity sidewall 1804 in a direction of the distal surface 1810 of the cavity sidewall 1804. The ribs 1808 can form a rib angle β with the cavity base 1806. The rib angle β may measure greater than or less than 90°. As such, in some instances, the one or more ribs 1808 may extend helically along the cavity sidewall 1804.

As shown, the ribs 1808 extend from the cavity base 1806 to the distal surface 1810 of the cavity sidewall 1804. In some instances, a plurality of ribs 1808 extend from the cavity sidewall 1804. When a plurality of ribs 1808 extend from the cavity sidewall 1804, a measure of a rib length 1812 corresponding to each rib 1808 may be different. For example, a measure of the rib length 1812 may be based, at least in part, on a measure of the extension distance 1805 of the cavity sidewall 1804 at a location along the perimeter of the cavity base 1806 where the corresponding rib 1808 terminates. As shown, a measure of the rib length 1812 corresponding to ribs 1808 proximate the floor facing portion 1807 of the end cap 1800 measures less than a measure of the rib length 1812 corresponding to ribs 1808 proximate the surface cleaning head facing portion 1809 of the end cap 1800.

Figure 25:
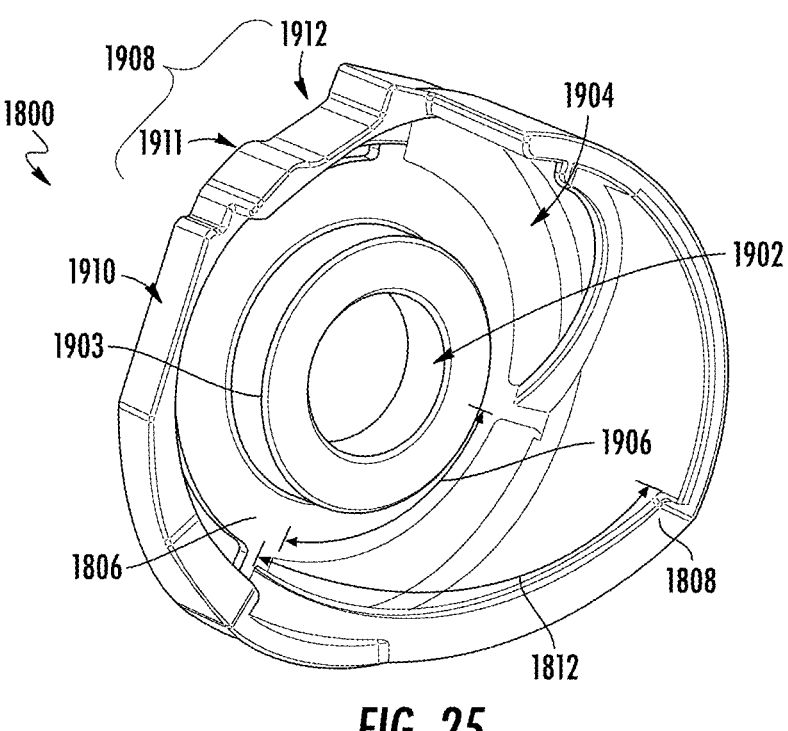
FIG. 25 shows another perspective view of the end cap of FIG. 24, consistent with embodiments of the present disclosure.

FIG. 25 shows another perspective view of the end cap 1800. As shown, the end cap 1800 can include an axle opening 1902 through which at least a portion of an axle (e.g., the axle 1608 of FIG. 22) can extend. A protrusion 1903 can extend from the cavity base 1806 and extend around the axle opening 1902. As also shown, one or more rib openings 1904 can extend along the cavity base 1806. The rib openings 1904 can have a rib opening length 1906 that generally corresponds to a measure of a distance over which a corresponding rib 1808 extends along the cavity base 1806. As such, a measure of the rib opening length 1906 may be less than a measure of the rib length 1812 for a corresponding rib 1808.

The cavity sidewall 1804 can also define an engagement region 1908 that extends on an outer surface 1910 of the cavity sidewall 1804. The outer surface 1910 faces in a direction away from the cavity 1802. The engagement region 1908 is configured to engage, for example, at least a portion of a surface cleaning head (e.g., the surface cleaning head 12 of FIG. 1) such that the end cap 1800 is retained within the surface cleaning head. For example, the engagement region 1908 can include a raised portion 1911 and a recessed portion 1912 that collectively define a portion of a snap-fit joint.

Figure 26:
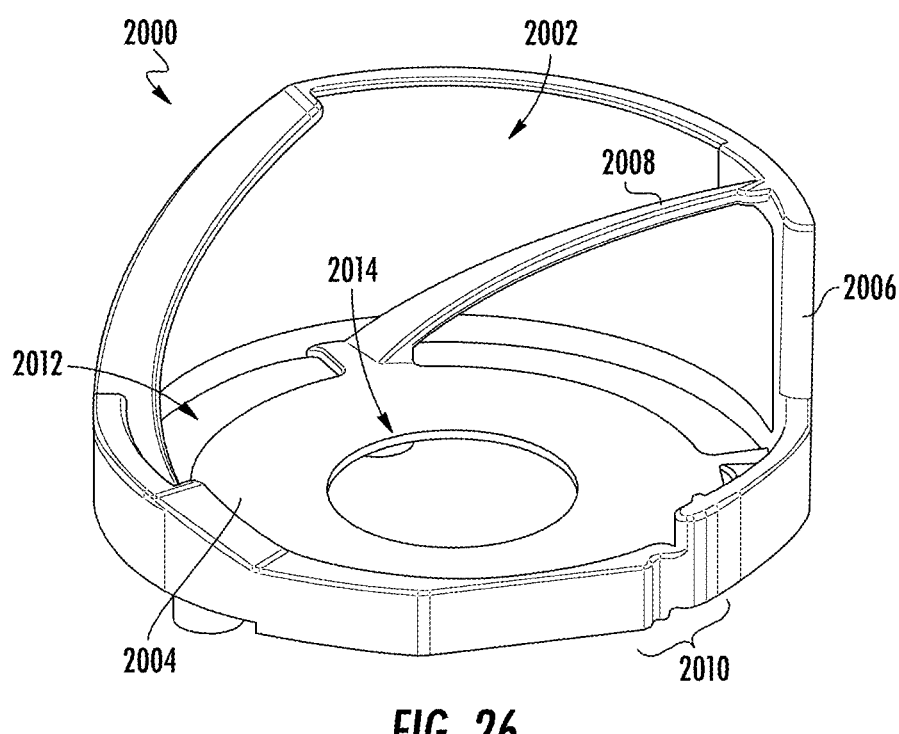
FIG. 26 shows a perspective view of an end cap, consistent with embodiments of the present disclosure.
Figure 27:
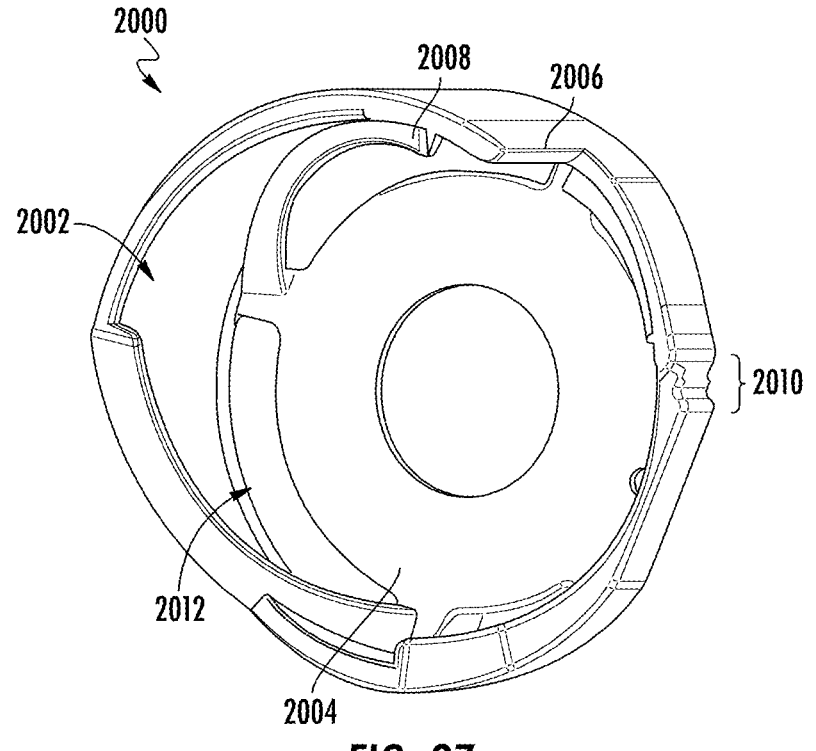
FIG. 27 shows another perspective view of the end cap of FIG. 26, consistent with embodiments of the present disclosure.

FIGS. 26 and 27 show perspective views of an end cap 2000, which may be an example of the end cap 1612 of FIG. 22. As shown, the end cap 2000 includes a cavity 2002 defined by a cavity base 2004 and a cavity sidewall 2006 extending from the cavity base 2004. One or more ribs 2008 can extend from the cavity sidewall 2006 and into the cavity 2002. As shown, the one or more ribs 2008 have a helical shape. In other words, the cavity base 2004, the cavity sidewall 2006, and the ribs 2008 can be similar to the cavity base 1806, the cavity sidewall 1804, and the ribs 1808 described in relation to FIGS. 24 and 25.

As shown, the end cap 2000 can include an engagement region 2010. The engagement region 2010 can be configured to engage, for example, at least a portion of a surface cleaning head (e.g., the surface cleaning head 12 of FIG. 1) such that the end cap 2000 is retained within the surface cleaning head. For example, the engagement region 2010 can define a portion of a snap-fit joint. As also shown, the cavity base 1806 can be substantially planar and include one or more rib openings 2012 and an axle opening 2014 for receiving at least a portion of an axle (e.g., the axle 1608 of FIG. 22).

While the end caps 1800 and 2000 have been illustrated as being separate components from the housing/body of the vacuum cleaner 10, it should be appreciated that any one or more of the end caps described herein may be integrally formed as part of the housing/body of the vacuum cleaner 10. Any one or more of the end caps described herein may be formed as separate components from the agitator 18, such that removal of the agitator 18 does not result in the removal of the end cap. Alternatively, one or more of the end caps may form part of an agitator assembly, wherein removal of the agitator 18 results in the removal of at least one of the end caps.

Figure 27A:
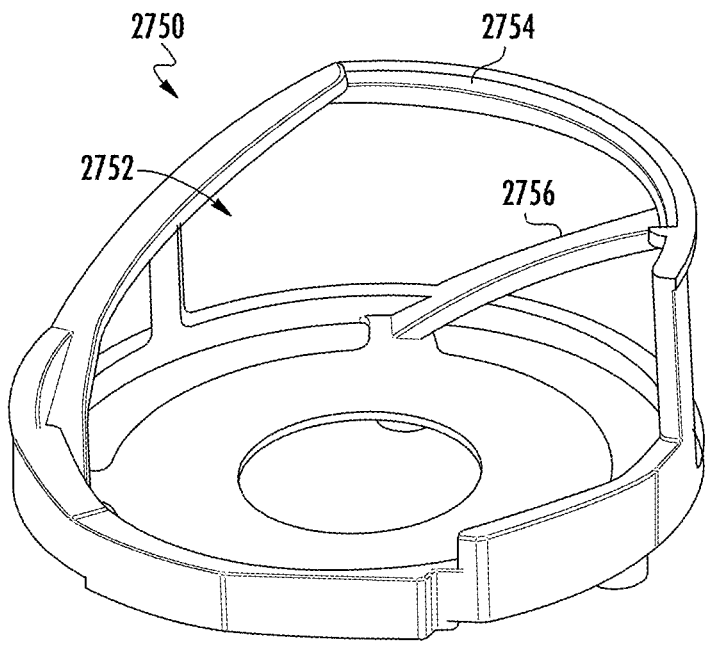
FIG. 27A shows a perspective view of an end cap, consistent with embodiments of the present disclosure.
Figure 27B:
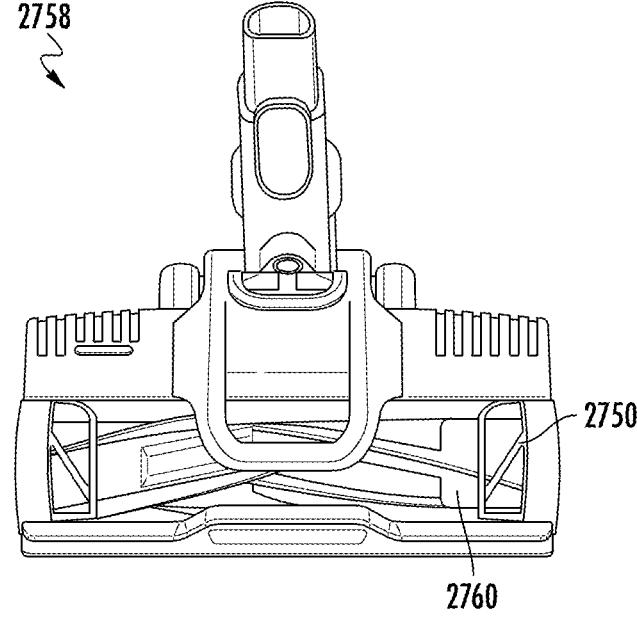
FIG. 27B shows a perspective view of a surface cleaning head having the end cap of FIG. 27A coupled thereto, consistent with embodiments of the present disclosure.

In some instances, one or more openings may extend through at least a portion of the cavity sidewalls 1804 and 2006. For example, FIG. 27A shows an example of an end cap 2750 having one or more openings 2752 extending through a cavity sidewall 2754. As shown, the one or more openings 2752 extend between adjacent ribs 2756. For example, and as shown, a collective area of each of the one or the one or more openings 2752 may measure greater than a surface area of the cavity sidewall 2754. When the end cap 2750 is coupled to a surface cleaning head, a portion of the surface cleaning head extends over the one or more openings 2752. An example of the end cap 2750 in a surface cleaning head 2758 is shown in FIG. 27B. As shown, the end cap 2750 is coupled to an inner surface of the surface cleaning head 2758. For example, the end cap 2750 can be coupled to the surface cleaning head 2758 such that the end cap 2750 extends around at least a portion of a top portion of an agitator 2760. In some instances, at least a portion of the surface cleaning head 2758 may be transparent to visible light such that at least a portion of the agitator 2760 and/or the end caps 2750 are visible.

Figure 28:
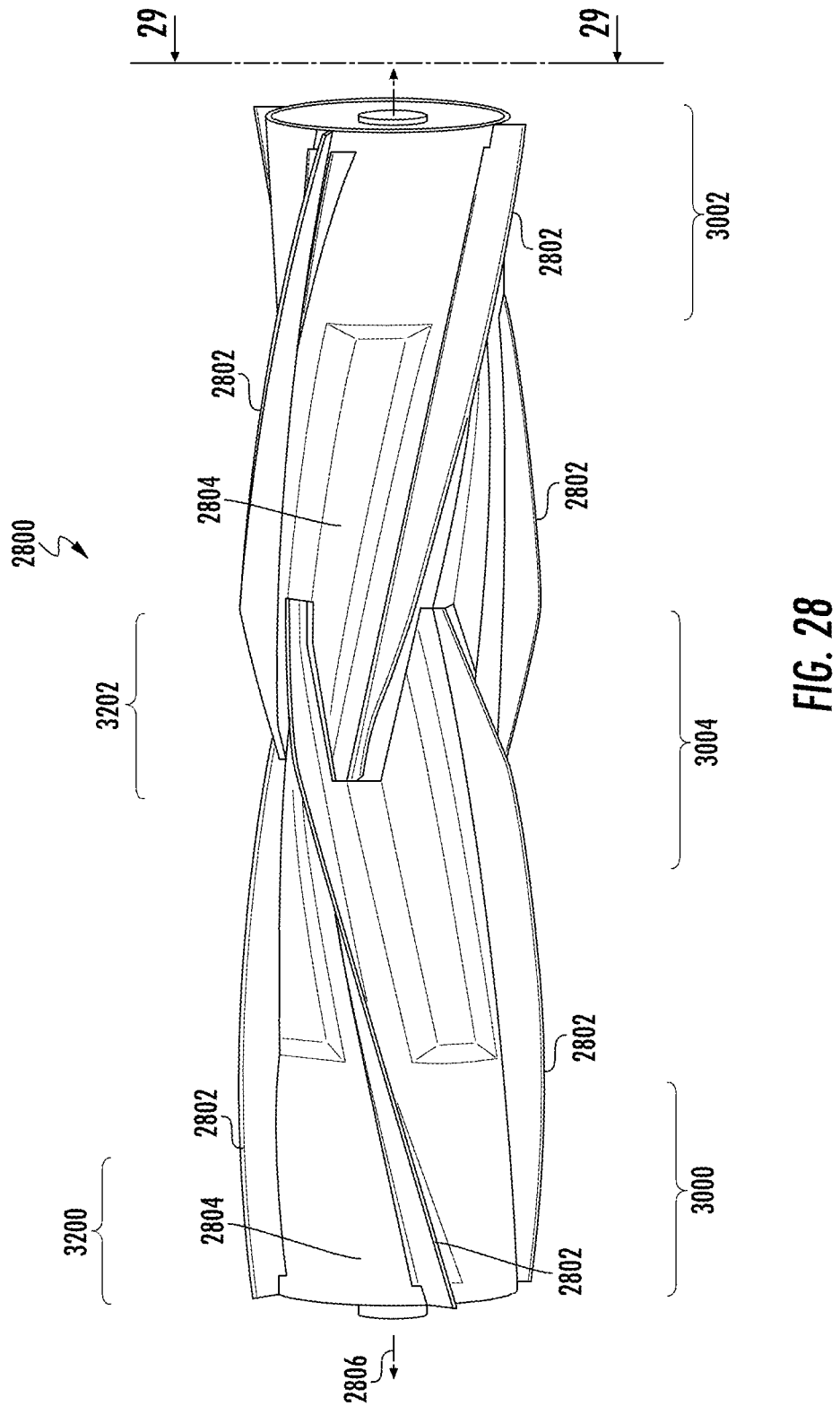
FIG. 28 is a front view of another example of an agitator, consistent with the present disclosure.
Figure 29:
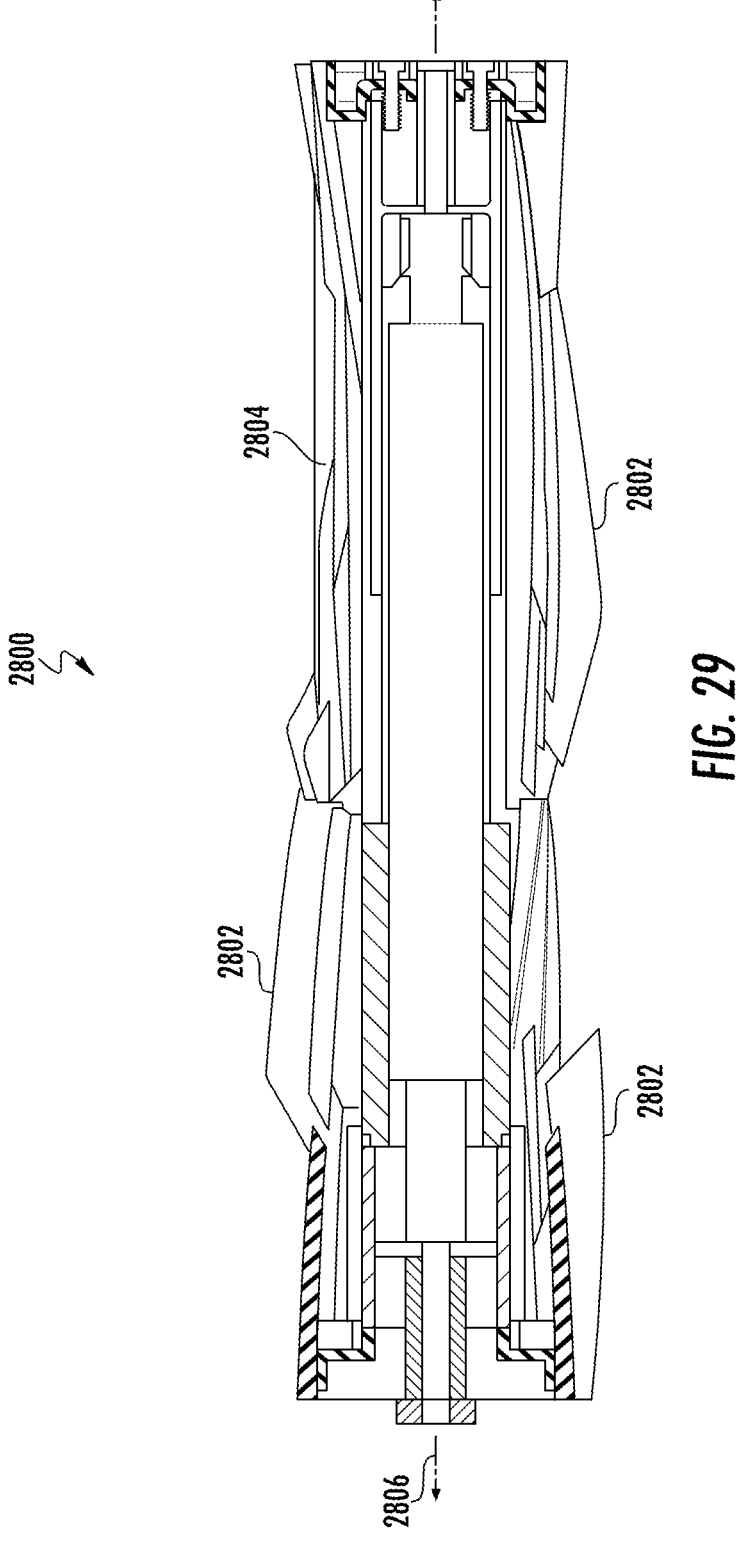
FIG. 29 is a cross-sectional view of the agitator of FIG. 29 taken along line 29-29, consistent with embodiments of the present disclosure.

Turning now to FIGS. 28 and 29, another example of an agitator 2800 is generally illustrated, which may be an example of the agitator 18 of FIG. 1. In particular, FIG. 28 is a front view of the agitator 2800 and FIG. 29 is a cross-sectional view of the agitator 2800 of FIG. 29 taken along line 29-29. The agitator 2800 may include at least one resiliently deformable flap 2802 (which may be an example of the sidewall 62) extending helically around at least a portion of an elongated main body 2804 of the agitator 2800 in a direction along a longitudinal axis 2806 of the agitator 2800. For example, the agitator 2800 may include a plurality of deformable flaps 2802, wherein a length of each of the deformable flaps 2802 measures less than a length of the main body 2804. As shown, the agitator 2800 includes a plurality of deformable flaps 2802 that extend from end regions 3000, 3002 of the main body 2804 to a central region 3004 of the main body 2804. As discussed herein, the agitator 2800 may not include any bristles; however, it should be appreciated that the agitator 2800 may optionally include bristles in addition to (or without) the flaps 2802.

Figure 30:
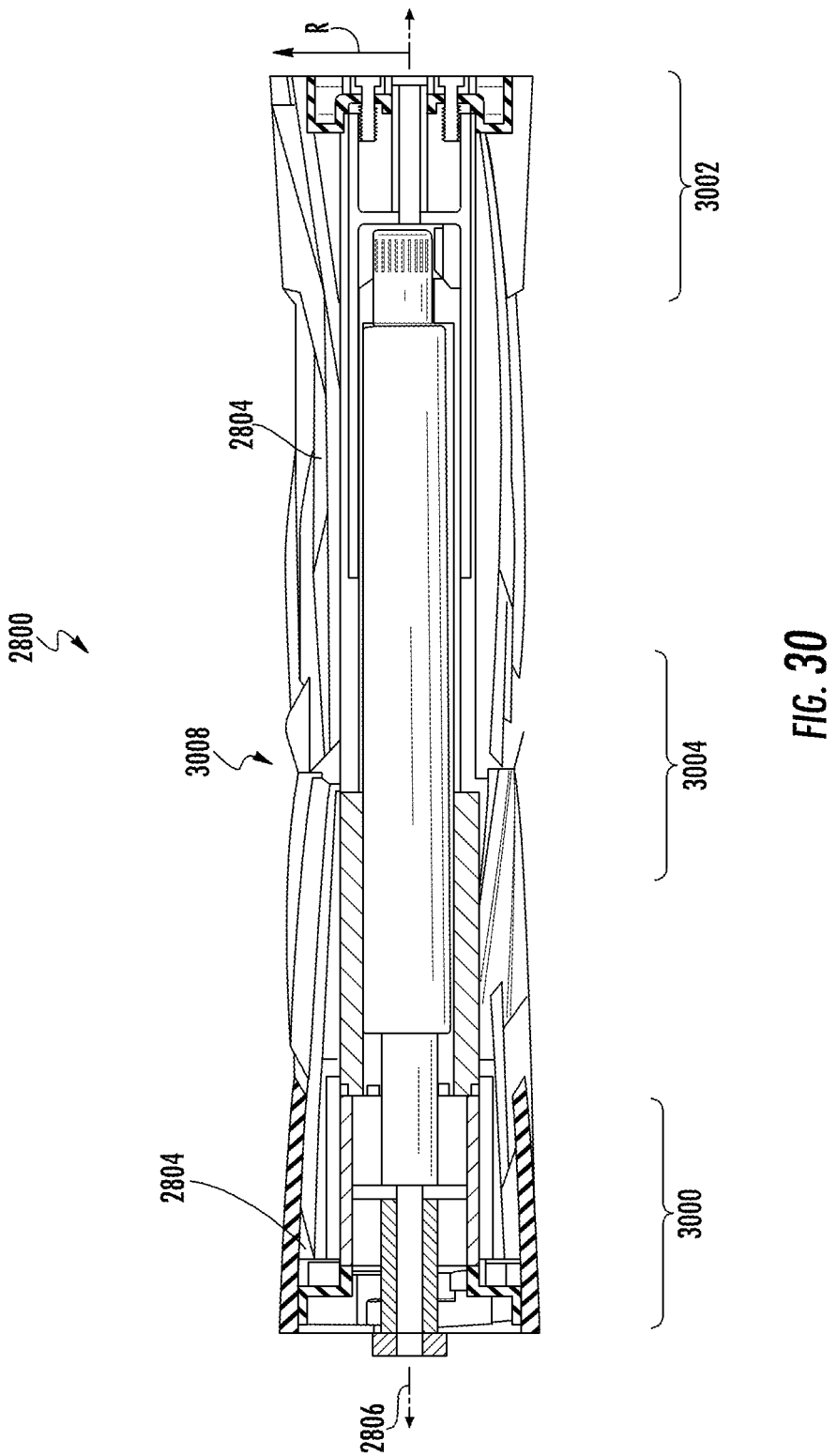
FIG. 30 shows one example of the elongated main body of the agitator of FIG. 29 without the flaps, consistent with embodiments of the present disclosure.

FIG. 30 shows one example of the elongated main body 2804 of the agitator 2800 of FIG. 29 without the flaps 2802 and/or bristles. The elongated main body 2804 of the agitator 2800 may have a generally circular cross-section (taken along a cross-section that is generally transverse to the longitudinal axis 2806). As used herein, the phrase "generally circular cross-section" is intended to mean that the radius R of the elongated main body 2804 at any point within a circular cross-section is within 25% of the maximum radius of the elongated main body 2804 within the circular cross-section. In the illustrated example, the circular cross-section of the elongated main body 2804 is larger in the proximate end regions 3000, 3002 than in the central region 3004. As such, the circular cross-section of the elongated main body 2804 may be said to taper from the proximate end regions 3000, 3002 to the central region 3004. The taper of the proximate end regions 3000, 3002 may be constant (e.g., linear) and/or nonlinear. In at least one example, the middle 3008 of the elongated main body 2804 may have the smallest circular cross-section. The taper of a first proximate end region 3000 may be the same as or different than the taper of the second end region 3002.

The taper of the elongated main body 2804 may increase the stiffness of the resiliently deformable flap 2802 in the proximate end regions 3000, 3002, while increasing the flexibility of the resiliently deformable flap 2802 in the central region 3004. The reduced cross-section of the central region 3004 may also increase debris (e.g., hair) removal by allowing the combing unit 50 (e.g., the teeth 52) to extend further into the resiliently deformable flap 2802 and/or bristles (e.g., further towards the center of the agitator 2800), thereby increasing the contact between the combing unit 50 and the resiliently deformable flap 2802 and/or bristles. As such, the teeth 52 may have a greater length in the central region 3004 when compared to teeth 52 located outside of the central region 3004.

Figures 31A, 31B:
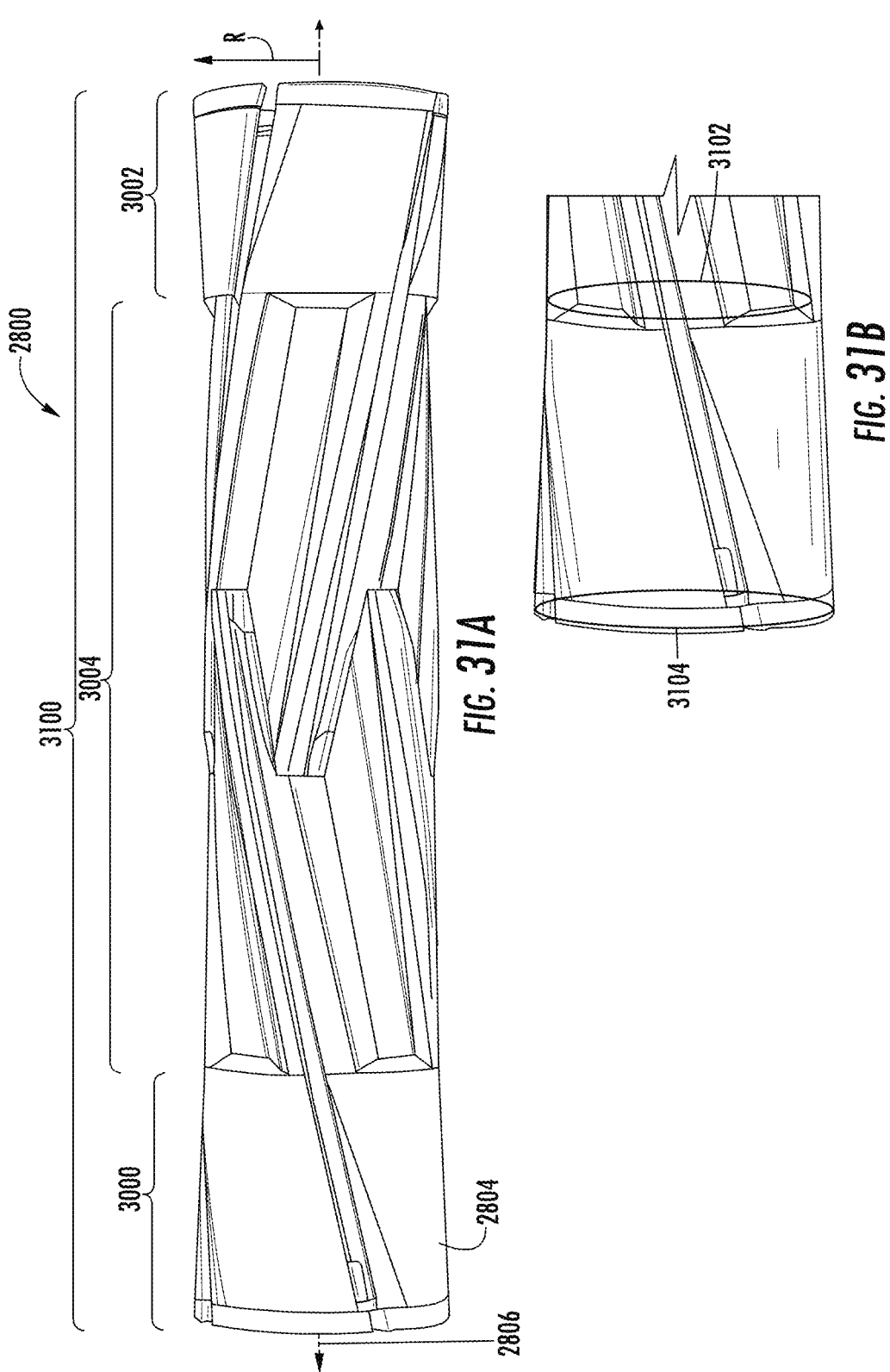
FIG. 31A shows another example of an elongated main body of the agitator of FIG. 30, consistent with embodiments of the present disclosure.
FIG. 31B shows a close-up of an end of the flap of FIG. 31A, consistent with embodiments of the present disclosure.

With reference to FIGS. 31A-B, another example of an elongated main body 2804 of the agitator 2800 of FIG. 30 is shown. Similar to FIG. 30, the elongated main body 2804 may have a generally circular cross-section, wherein the circular cross-section of the proximate end regions 3000, 3002 is greater than in a central region 3004. In at least one embodiment, a first end region 3000 may have a length extending along the longitudinal axis 2806 that is 10% to 40% of the total length 3100 of the elongated main body 2804. For example, the length of the first end region 3000 may be 25% to 30% of the total length 3100 of the elongated main body 2804 and/or 20% of the total length 3100 of the elongated main body 2804.

The length of the second end region 3002 along the longitudinal axis 2806 may be the same as the first end region 3000. Alternatively, the length of the second end region 3002 may be shorter than the first end region 3000. In at least one example, the second end region 3002 may have a length extending along the longitudinal axis 2806 that is 8% to 30% of the total length 3100 of the elongated main body 2804. For example, the length of the second end region 3002 may be 10% to 20% of the total length 3100 of the elongated main body 2804, for example, 17% of the total length 3100 of the elongated main body 2804. By way of a non-limiting example, the overall length 3100 of the elongated main body 2804 may be 222.2 mm, the first end region 3000 may have a length of 45.7 mm, and the second end region 3002 may have a length of 36.9 mm.

As discussed herein, the proximate end regions 3000, 3002 may have a radius R that tapers. The taper may be linear or non-linear (e.g., curvilinear). In at least one embodiment, the radius R of the inner end region 3102 of the proximate end regions 3000, 3002 (e.g., the region 3102 of the proximate end regions 3000, 3002 adjacent to the central region 3004) may be 3-15% less than the radius R of the distal end region 3104 of the proximate end regions 3000, 3002 (e.g., the region 3104 of the proximate end regions 3000, 3002 adjacent to the end caps). For example, the radius R of the inner end region 3102 may be 5-10% less than the radius R of the distal end region 3104 and/or 8.6% less than the radius R of the distal end region 3104. The difference in the radius of the end regions of the first proximate end region 3000 may be the same or different than the difference in the radius of the end regions of the second proximate end region 3002.

By way of a non-limiting example, the radius R of the inner end region 3102 may be 21.25 mm and the radius R of the distal end region 3104 may be 23.25 mm. The taper of the end regions 3000, 3002 may promote hair migration by tapering stiffness of the ribs/flaps and/or bristles. To this end, increasing the length of the free/unsupported portion of the ribs/flaps and/or bristles will result in a decrease in the effective stiffness of the ribs/flaps and/or bristles, thereby enhancing hair migration.

Figure 32:
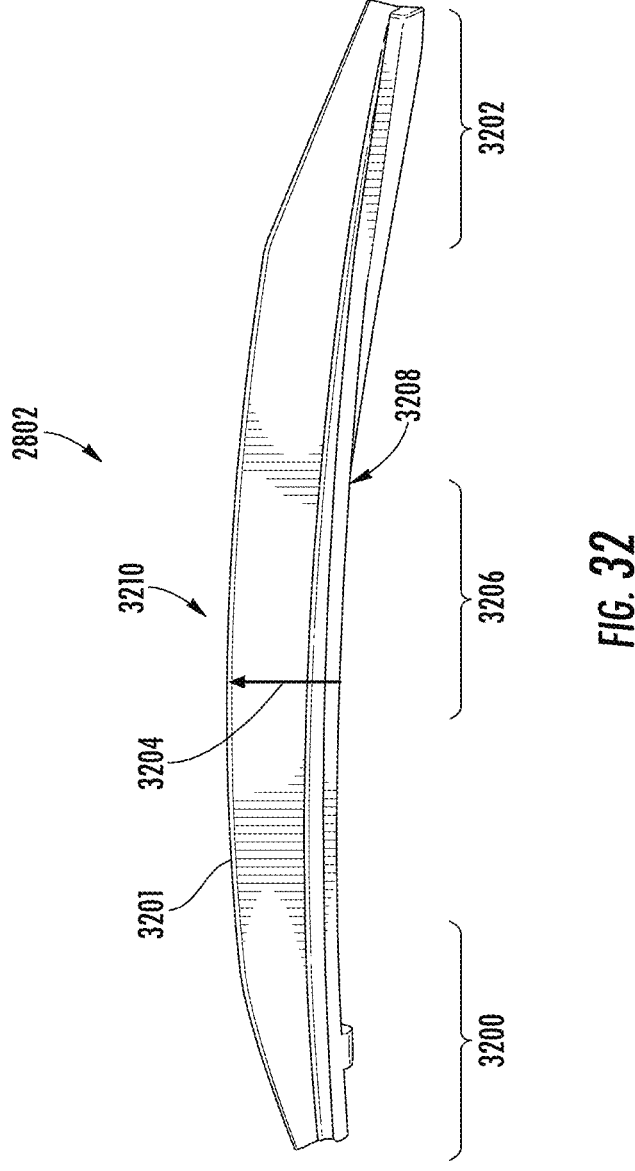
FIG. 32 shows one example of the flap of FIG. 29 without the elongated main body, consistent with embodiments of the present disclosure.
Figure 33:
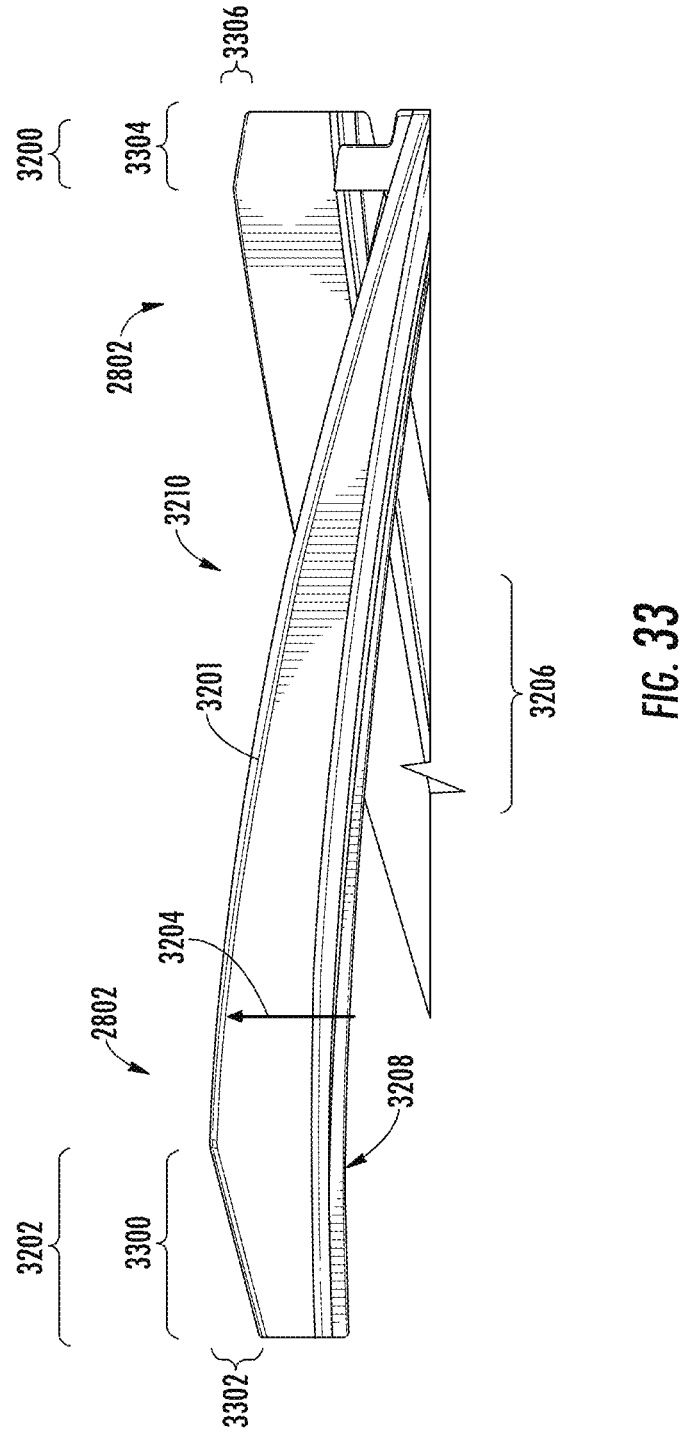
FIG. 33 shows another example of the flap of FIG. 32, consistent with embodiments of the present disclosure.

Turning now to FIGS. 32-33, one example of the flap 2802 of FIG. 29 without the elongated main body 2804 is generally illustrated. As described herein, the flap 2802 may extend generally helically around at least a portion of the elongated main body 2804 and may be formed of a resiliently deformable material. One or more of the end regions 3200, 3202 of the flap 2802 may include a chamfer or taper (e.g., the flap may include a taper in only one or each end region 3200, 3202). As such, the height 3204 of the flap 2802 in at least a portion of the end regions 3200, 3202 may be less than the height 3204 of the flap 2802 in a central region 3206. In other words, the taper may cause a cleaning edge 3201 of the flap 2802 to approach the elongated main body 2804. According to one example, the height 3204 of the flap 2802 may be measured from a base 3208 of the flap 2802 to the cleaning edge 3201 of the flap 2802, where the base 3208 is configured to be secured to the agitator 2800 (e.g., the elongated main body 2804). Alternatively, the height 3204 of the flap 2802 may be measured from the axis of rotation of the agitator 2800 to the cleaning edge 3201 of the flap 2802. The taper of the end regions 3200, 3202 may be constant (e.g., linear) and/or nonlinear. In at least one example, the middle 3210 of the flap 2802 may have the largest height 3204. The taper of a first end region 3200 may be the same as or different than the taper of the second end region 3202.

With additional reference to FIG. 28, the first end region 3200 may be arranged within one of the proximate end regions 3000, 3002 of the elongated main body 2804 and the second end region 3202 may be arranged within the central region 3004 of the elongated main body 2804. The taper of the first end region 3200 may be configured to be at least partially received in an end cap, for example, a migrating hair end cap such as the end caps described in FIGS. 22-27. The taper of the first end region 3200 may reduce wear and/or friction between the flap 2802 and the end caps, thereby enhancing the lifespan of the flap 2802 and the end caps. In at least some examples, the taper of the first end region 3200 may reduce fold-over of flap 2802 (both within the end cap and the portion of the flap 2802 disposed proximate to and outside of the end cap) as the flap 2802 rotates within the end cap. Reducing fold-over of the flap 2802 may increase contact between the flap 2802 and the surface to be cleaned, thereby enhancing the cleaning performance.

With reference to FIG. 33, the taper of the first end region 3200 may have a length 3304 and a height 3306. The length 3304 may be selected based on the dimensions of the end cap to which it is received. For example, the length 3304 may be same as the insertion distance of the flap 2802 in the end cap, shorter than the insertion distance of the flap 2802 in the end cap, or longer than the insertion distance of the flap 2802 in the end cap. The taper of the first end region 3200 helps relieve the bend of the flap 2802 as it is tucked into the end cap. By way of example, the taper of the first end region 3200 may have a length 3304 of between 5-9 mm, and a height 3306 of between 1-3 mm and/or a length 3304 of 7 mm and a height 3306 of 2 mm.

The taper of the second end region 3202 may be configured to enhance hair migration along the agitator 2800. In particular, the taper may enhance hair migration since hair will tend to migrate to smallest diameter. Thus, the taper of the second end region 3202 may allow hair to be more effectively migrated towards a specific location. In addition, the taper of the second end region 3202 may function as a hair storage area. To this end, the central region 3004 of the agitator 2800 may have a smaller overall diameter compared to the overall diameter of the proximate end regions 3000, 3002. As such, hair may build up and wrap around the central region 3004 of the agitator 2800. As generally illustrated in FIGS. 29-30, the taper of the second end region 3202 of a first flap 2802 may partially overlap with the taper of the second end region 3202 of an adjacent flap 2802 within the central region 3004. When the flap 2802 is optionally used in combination with a debrider unit 50 and/or ribs 116, the teeth of the debrider unit 50 and/or ribs 116 may optionally be longer in a region proximate the second end region 3202 of the flap 2802.

Turning back to FIG. 33, the dimensions of the taper of the flap 2802 can impact the performance and/or lifespan of the flaps 2802. Increasing the taper (e.g., length 3300 and/or height 3302) can improve hair migration; however, too large of a taper can negatively impact cleaning performance. For example, a taper of the second end region 3202 that is too large can result in a gap wherein the flap 2802 does not sufficiently contact the surface to be cleaned. On the other hand, too small of a taper in the second end region 3202 (e.g., length 3300 and/or height 3302) may not result in sufficient hair migration.

Experimentation has shown that eliminating the inside chamfer (e.g., eliminating the taper of the second end region 3202) may eliminate the middle gap, which may result in an improved cleaning performance and aesthetic appearance (no chamfer with a kink); however, elimination of the middle gap, may cause hair build up on the agitator 2800 due to insufficient hair migration. A taper in the second end region 3202 having a length 3300 that is too short may mitigate and/or eliminate the detrimental effects caused by the middle gap and may encourage migration of hair; however, such a configuration, may result in too steep of a chamfer and may cause a bad kink. For example, experimentation has shown that a taper in the second end region 3202 having a length 3300 of 5 mm and a height 3302 of 7 mm results in a taper that causes a kink that has an aesthetically displeasing appearance to users and can cause the flap 2802 to fold backwards, which may hurt cleaning/ hair removal.

A taper in the second end region 3202 having a length 3300 that is too long may improve migration of hair and may not kink the flap 2802; however, it may result in a large middle gap. For example, experimentation has shown that a taper in the second end region 3202 having a length 3300 of 30 mm and a height 3302 of 7 mm results in a taper having a large cleaning gap that is potentially detrimental to the overall cleaning performance.

The inventors of the instant application have unexpectedly found that a taper in the second end region 3202 having a length 3300 of 15-25 mm and a height 3302 of 5-12 mm allows hair to migrate, while minimizing the middle cleaning gap and a size of any resulting a kink (e.g., the resulting kink is generally not visible and does not substantially impact performance). By way of non-limiting examples, the taper in the second end region 3202 may have a length 3300 of 17-23 mm and a height 3302 of 6-10 mm, for example, a length 3300 of 20 mm and a height 3302 of 7 mm. Put another way, the taper in the second end region 3202 may have a length 3300 and a height 3302 having a slope of 1 to 0.3, for example, a slope of 0.28 to 0.42, a slope of 0.315 to 0.0385, and/or a slope of 0.35.

Figure 34:
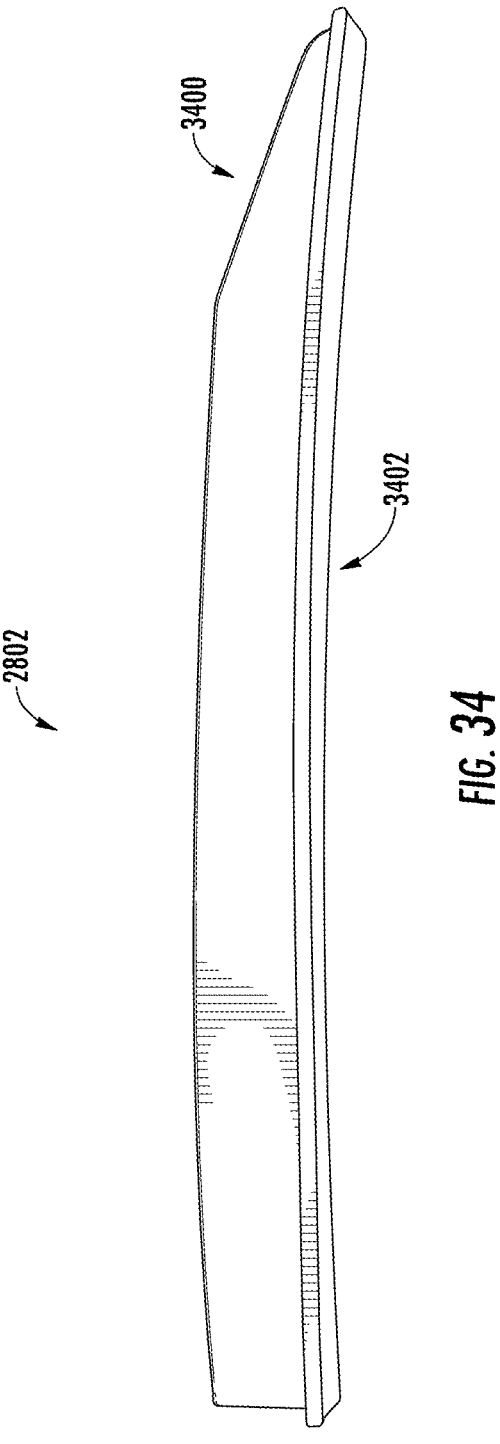
FIG. 34 shows one example of a flap with a portion removed to form a taper, consistent with embodiments of the present disclosure.

One or more of the tapers in the first and/or second end regions 3200, 3202 may be formed by removing a portion 3400 of the outer, cleaning edge 3201 of the flap 2802 (e.g., the edge that contacts the surface to be cleaned), for example, as generally illustrated in FIG. 34. This is particularly useful when the flap 2802 is formed from a non-woven material (such as, but not limited to rubber, plastic, silicon, or the like).

Figure 35:
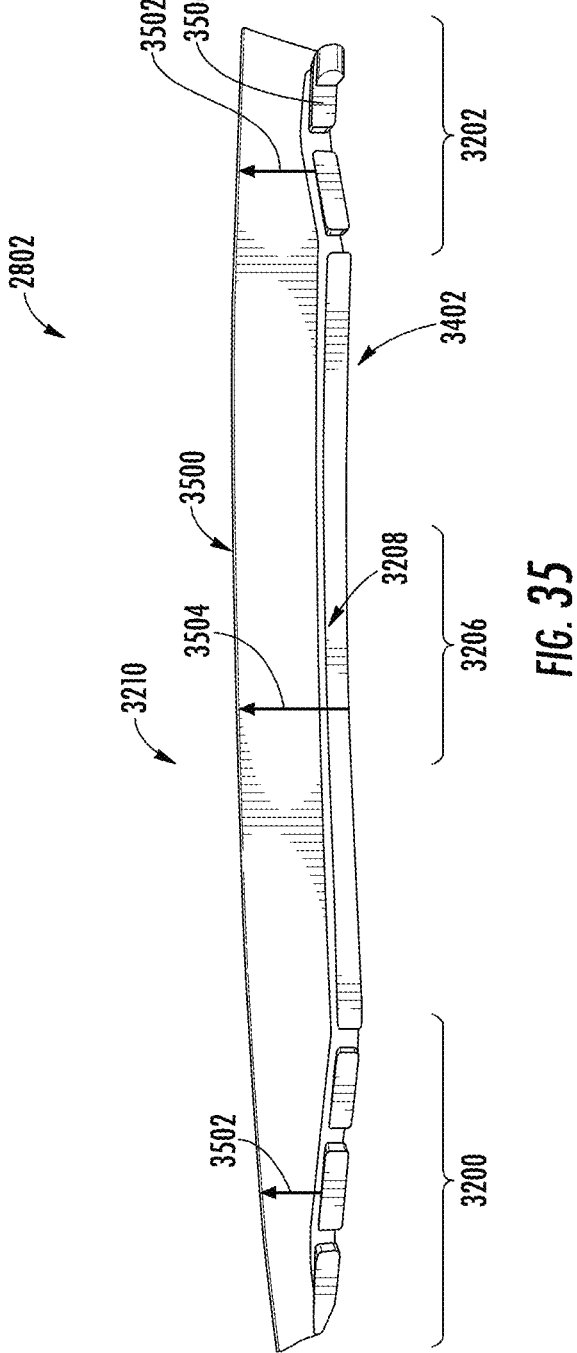
FIG. 35 shows another example of a flap with having a base configured to form a taper, consistent with embodiments of the present disclosure.

In embodiments where the flap 2802 is formed, at least in part, from a woven material, it may be desirable to maintain a selvedge in one or more of the first and/or second end regions 3200, 3202. The selvedge extends along the cleaning edge 3201 of the flap 2802 and the selvedge may improve wear resistance of the flap 2802 when to a portion of the cleaning edge 3201 of the flap 2802 that the does not include a selvedge (e.g., if a portion of the flap 2802 were removed to create the taper). In at least one example, a manufacturer's selvedge is maintained, and one or more of the tapers in the first and/or second end regions 3300, 3202 may be formed modifying the mounting edge of the flap 2802. One example of the selvedge 3500 is generally illustrated in FIG. 35. In particular, the cleaning edge 3201 of the flap 2802 may be substantially linear prior to mounting to the agitator, and the mounting edge 3402 (which may also be the base 3208) of the flap 2802, in the regions of the first and/or second end regions 3200, 3202, may have a reduced length 3502 compared to the length 3504 of the flap 2802 in the central region 3206 (e.g., the middle 3210). In at least one example, the mounting edge 3402 may include a plurality of segments 3506 (e.g., a plurality of contoured "T" segments produced in a mold) that straighten out when the flap 2802 is installed in the agitator body 2804, thereby resulting in a contoured (e.g., tapered) selvedge 3500 in the first and/or second end regions 3200, 3202. In other words, the flap 2802 may generally be described as including the plurality of segment 3506 along the mounting edge 3402 that, when mounted to the body 2804, cause a taper to be formed within the flap 2802.

Figure 36:
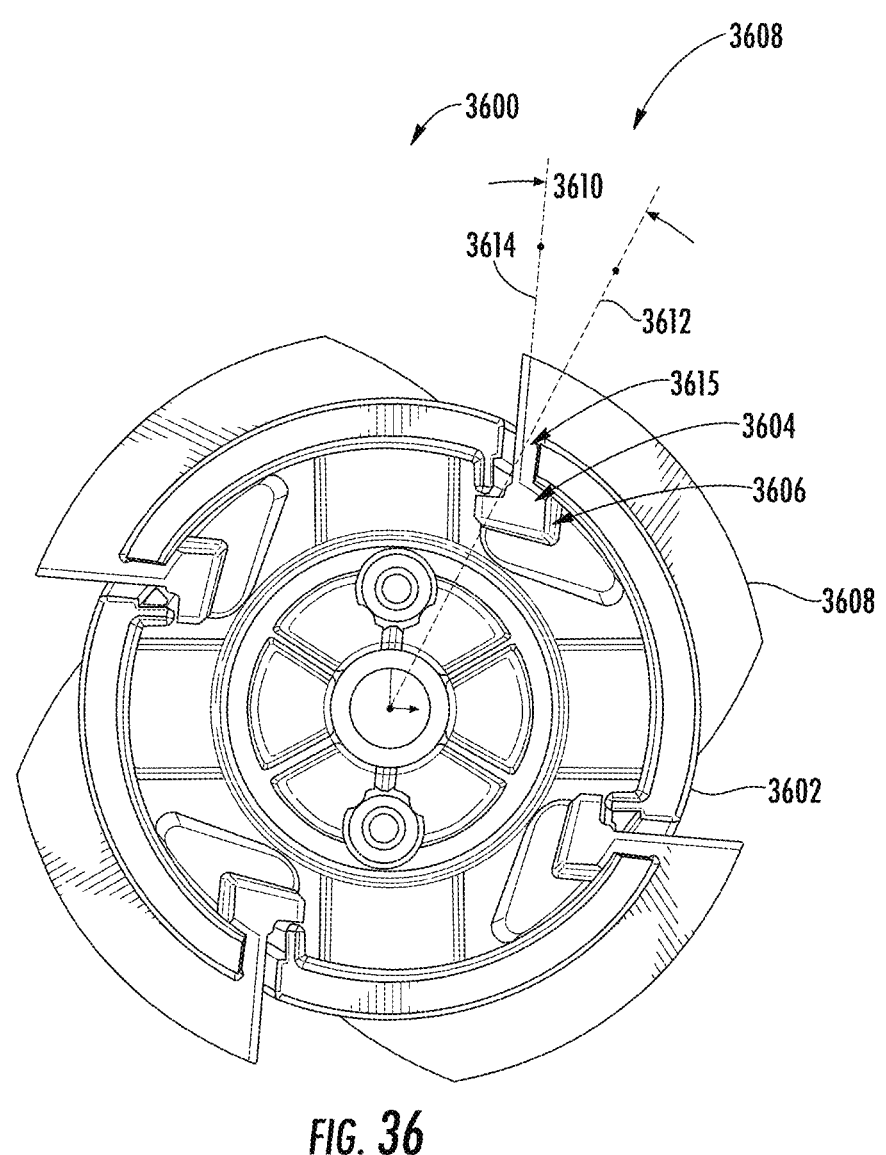
FIG. 36 shows one example of an agitator having a flap disposed at a non-perpendicular angle with respect to the agitator body, consistent with embodiments of the present disclosure.

Turning now to FIG. 36, another example of an agitator 3600 is generally illustrated, which may be an example of the agitator 18 of FIG. 1. The agitator 3600 may include an agitator body 3602 which includes a plurality of channels 3604 configured to receive a mounting edge 3606 of a flap 3608, e.g., as generally described herein. The plurality of channels 3604 and/or mounting edge 3606 of the flap 3608 may be configured to align the flap 3608 at a mounting angle 3610. The mounting angle 3610 may be defined as an angle between a line 3612 extending along the radius of the agitator body 3602 and a line 3614 extending along the length of the flap 3608. The lines 3612, 3614 may intersect at the outer edge 3615 of the agitator body 3602. The mounting angle 3610 may be angled towards the rotation direction (e.g., the line 3614 may contact the surface to be cleaned prior to the line 3612 when the agitator 3600 is rotated). The mounting angle 3610 may be any angle within the range of 10-45 degrees, for example, 15-30 degrees, 30-25 degrees, and/or 22.53 degrees. An aggressive mounting angle 3610 may improve cleaning and help prevent hair from bending the flaps 3608 back and wrapping around the agitator 3600. However, if the mounting angle 3610 is too aggressive, excessive noise and/or wear may be generated.

Figure 37:
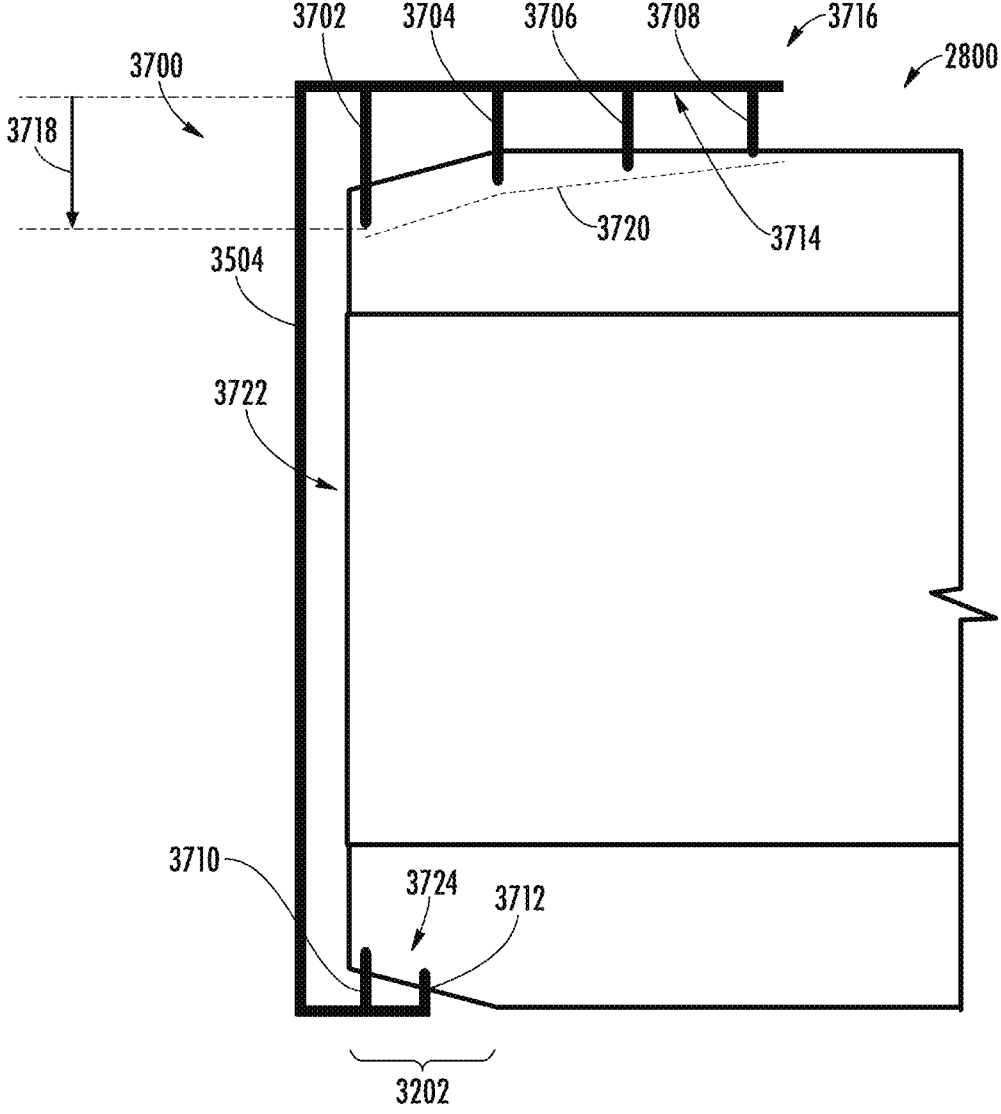
FIG. 37 shows another example of an end cap having a plurality of ribs for engaging with a distal end of a flap, consistent with embodiments of the present disclosure.

With reference now to FIG. 37, a cross-sectional view of another example of an end cap 3700 is generally illustrated. The end cap 3700 may be similar to the end cap 1610 of FIG. 22. As such, like reference numerals refer to similar features unless noted otherwise, and for the sake of brevity, will not be repeated. Similar to end cap 1610, end cap 3700 may include a plurality of ribs 3702-3712. For example, a plurality of ribs 3702-3708 may extend from an inner surface 3714 of the end cap 3700, e.g., proximate a top region 3716 of the end cap 3700. The plurality of ribs 3702-3708 may have different heights 3718. The different heights of the ribs 3702-3708 may help reduce noise and/or wear on the flap 2802.

The heights 3718 of the plurality of ribs 3702-3708 may generally inversely correspond to the taper of the flap 2802 (e.g., the taper of the first end region 3200). In at least one example, the different heights 3718 of the plurality of ribs 3702-3708 may have different amounts of rib/flap engagement 3720. For example, ribs closest to the distal-most end 3722 of the agitator 2800 (e.g., but not limited to, rib 3702) may have a larger rib/flap engagement 3720 compared to ribs furthest away from the end 3722 of the agitator 2800 (e.g., but not limited to, rib 3708). In at least one example, the end cap 3700 may include one or more ribs that engage and/or are close to the flap 2802 but are not within the taper of the first end region 3200. For illustrative purposes, the rib/flap engagement 3720 of the closest rib (e.g., but not limited to, rib 3702) and the further rib (e.g., but not limited to, rib 3708) may taper between 2.0 mm to 0 mm, for example, 1.5 mm to 0 mm. The spacing between adjacent ribs 3702-3712 may be constant or varied. For example, the spacing between adjacent ribs 3702-3712 may be 2-4 mm, for example, 2-3 mm, 2.5-2.75 mm, and/or 2.75 mm. Close proximity of the ribs/teeth 3702-3712 may prevent hair from continuously spinning between two adjacent ribs/teeth. The ribs/teeth 3702-3712 may have a tooth width of 1-3 mm, for example, 1-2 mm, 1.5-1.75 mm, and/or 1.75 mm.

In at least one example, the bottom region 3724 of the end cap 3700 (e.g., a region of the end cap 3700 closest to the surface to be cleaned) may have a different configuration of ribs 3710-3712 compared to the top end region 3716. For example, the bottom region 3724 of the end cap 3700 may have fewer ribs compared to the top end region 3716. The ribs 3710-3712 may also extend across a smaller area of the flap 2802. For example, the ribs 3710-3712 may be disposed only in the taper of the first end region 3200.

Figure 37A:
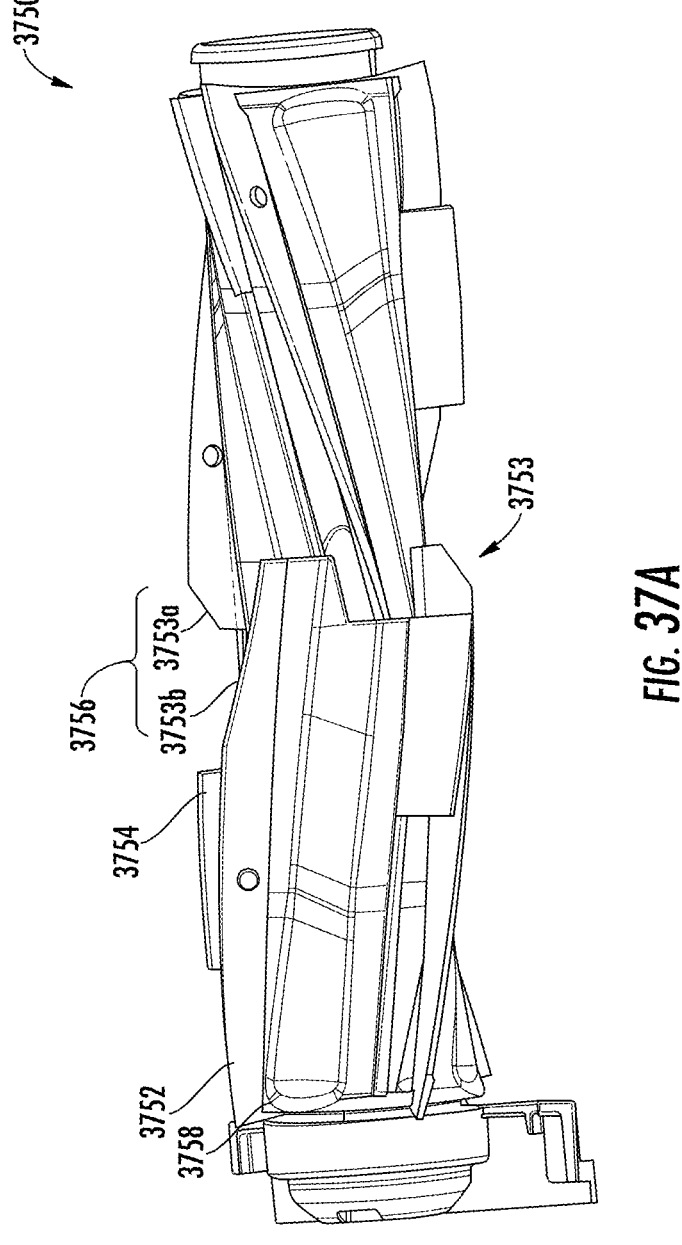
FIG. 37A shows a perspective view of an agitator, consistent with embodiments of the present disclosure.

FIG. 37A shows a perspective view of an example of an agitator 3750 having a plurality of deformable flaps 3752 (which may be an example of the sidewall 62) and a plurality of bristle strips and/or a plurality of tufts arranged in a row 3754. The bristle strips and/or rows of tufts 3754 extend along and generally parallel to at least a portion of a corresponding deformable flap 3752 (e.g., the separation distance between a deformable flap 3752 and an adjacent bristle strip and/or row of tufts 3754 may be deviate less than 10% along the coextensive portions thereof, for example, less than 5% or less than 2%). As shown, a length of the bristle strips and/or rows of tufts 3754 measures less than a length of a corresponding deformable flap 3752. In other words, the bristles strips and/or rows of tufts 3754 extend along only a portion of a corresponding deformable flap 3752. For example, a measure of a length of a bristle strip and/or row of tufts 3754 may be less than half of a measure of a length of a corresponding deformable flap 3752.

One or more of the bristle strips and/or rows of tufts 3754 may be arranged in front of a corresponding deformable flap 3752 (e.g., from a rotational perspective, the bristle strip and/or row of tufts 3754 contact the surface to be cleaned prior to the corresponding deformable flap 3752 immediately adjacent to the bristle strip and/or row of tufts 3754 as the agitator rotates). Alternatively (or in addition), one or more of the bristle strips and/or rows of tufts 3754 may be arranged behind a corresponding deformable flap 3752 (e.g., from a rotational perspective, the bristle strip and/or row of tufts 3754 contact the surface to be cleaned after the corresponding deformable flap 3752 immediately adjacent to the bristle strip and/or row of tufts 3754 as the agitator rotates).

As shown, the deformable flaps 3752 each include a taper 3753 at central end regions 3756. The taper 3753 of the central end region 3756 for at least one deformable flap 3752 may be different from a taper 3753 of the central end region 3756 for at least one other deformable flap 3752. For example, a first group of deformable flaps 3752 may have a first taper 3753a having a first slope and the second group of deformable flaps 3752 may have a second taper 3753b having a second slope, the second slope measuring differently from the first. In some instances, the first and second groups of deformable flaps 3752 may be arranged around a body 3758 of the agitator 3750 in a generally alternating fashion. For example, a deformable flap 3752 having the first taper 3753a may be positioned such that the next immediate deformable flap 3752 on one side has the second taper 3753b and the next immediate deformable flap 3752 on the other side includes the first taper 3753a. By way of further example, a deformable flap 3752 having the first taper 3753a, may be positioned such that the next immediate deformable flap 3752 on either side has the second taper 3753b.

In some instances, the body 3758 of the agitator 3750 may narrow and/or taper towards a central portion of the body 3758. The taper may extend from the distal ends of the body 3758. In some instances, the taper may extend from end regions of the body 3758 such that the taper begins at location spaced apart from a distal end of the body 3758.

Figure 37B:
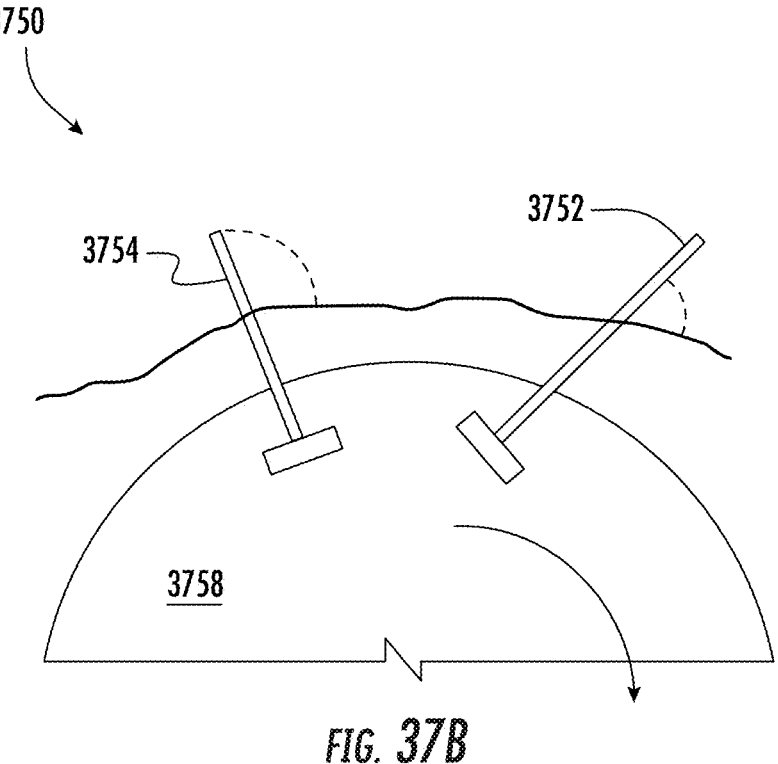
FIG. 37B shows a cross-sectional view of an agitator having passively angled bristles and aggressively angled flaps, consistent with embodiments of the present disclosure.

With reference to FIG. 37B, the bristle strip and/or row of tufts 3754 may be arranged at a passive angle as the agitator 3750 rotates. As used herein, a passive angle means that the base of the bristle strip and/or row of tufts 3754 (i.e., the portion of the bristle strip and/or row of tufts 3754 extending from the agitator 3750 body 3758) is arranged normal to the surface to be cleaned prior to the tip of the bristle strip and/or row of tufts 3754 being arranged normal to the surface to be cleaned as the agitator 3750 rotates. The corresponding deformable flap 3752 may be arranged an aggressive angle as the agitator 3750 rotates. As used herein, an aggressive angle means that the tip of the deformable flap 3752 is arranged normal to the surface to be cleaned prior to the base of the deformable flap 3752 being arranged normal to the surface to be cleaned as the agitator 3750 rotates. By way of non-limiting examples, an aggressive angle may be defined as an angle between a line extending along the radius of the agitator body 3758 and a line extending along the length of the bristle strip and/or row of tufts 3754 or deformable flap 3752 in a direction towards the rotation of the agitator, and may include any angle within the range of 10-45 degrees, for example, 15-30 degrees, 30-25 degrees, 16 degrees, and/or 22.53 degrees. By way of non-limiting examples, a passive angle may be defined as an angle between a line extending along the radius of the agitator body 3758 and a line extending along the length of the bristle strip and/or row of tufts 3754 or deformable flap 3752 in a direction away from the rotation of the agitator, and may include any angle within the range of 10-45 degrees, for example, 15-30 degrees, 30-25 degrees, 16 degrees, and/or 22.53 degrees.

In FIG. 37B, the bristle strip and/or row of tufts 3754 is shown on the left and the deformable flap 3752 is shown on the right as the agitator 3750 rotates clockwise. As noted previously, the arrangement of the bristle strip and/or row of tufts 3754 and the deformable flap 3752 may be reversed (i.e., the bristle strip and/or row of tufts 3754 may be disposed rotationally before the deformable flap 3752). In such an arrangement, the distal end (e.g., tips) of the bristle strip and/or row of tufts 3754 and the deformable flap 3752 may generally converge towards each other (e.g., in an upside down V configuration, though the tips do not have to contact each other).

Figure 37C:
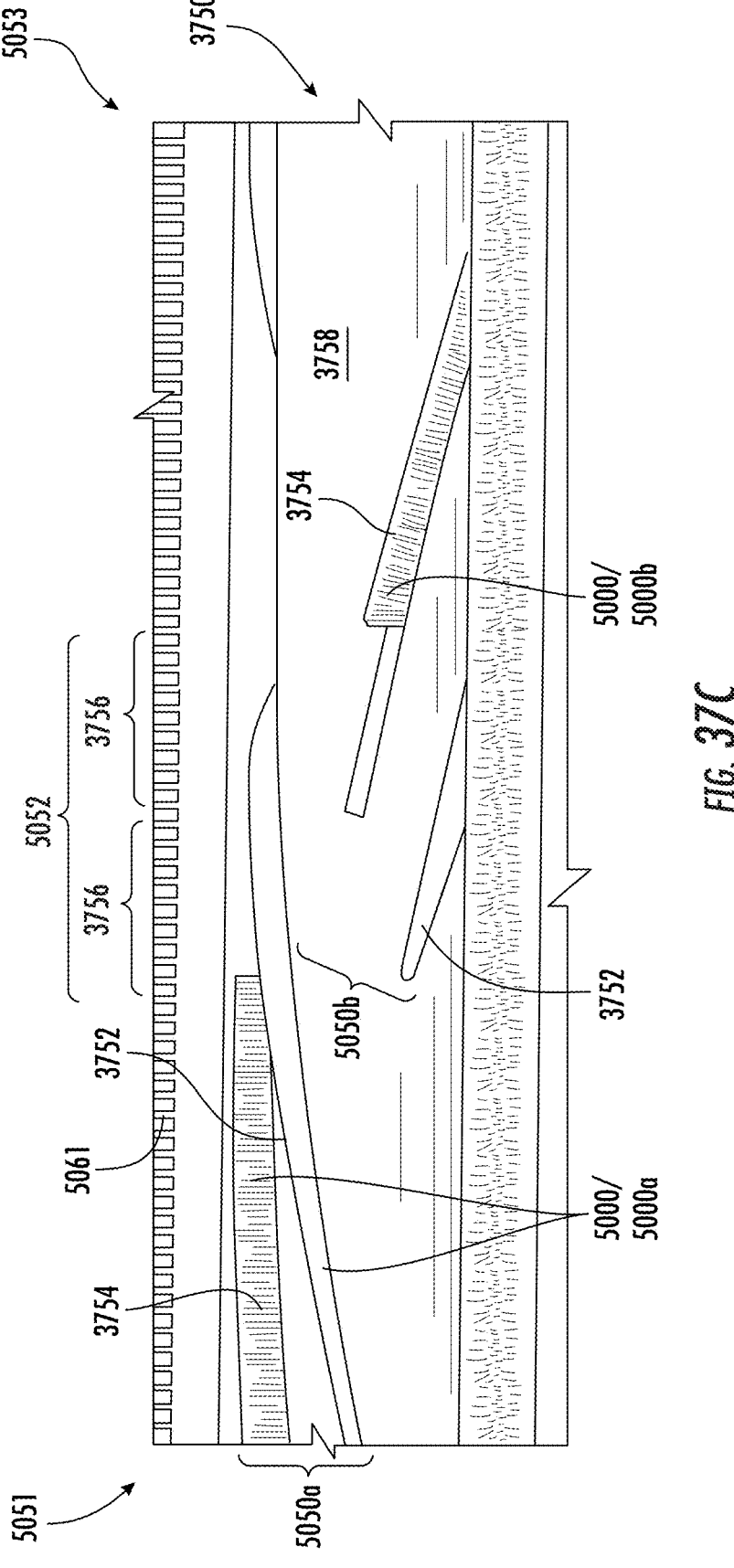
FIG. 37C shows a perspective view of an agitator, consistent with embodiments of the present disclosure.

As noted herein, an agitator 3750 may include one or more bristle strips and/or rows of tufts 3754 that extend along and generally parallel to at least a portion of one or more corresponding deformable flaps 3752 (collectively referred to as bristle/flap arrangement 5000, FIG. 37C). The length of the bristle strips and/or rows of tufts 3754 may be the same as, less than, or longer than a length of a corresponding deformable flap 3752. In one example, a first bristle/flap arrangement 5000a may extend from a first lateral end region 5051 of the agitator 3750 towards a central region 5052 of the agitator 3750 (e.g., to the central region 5052), and a second bristle/flap arrangement 5000b may extend from a second lateral end region 5053 of the agitator 3750 towards the central region 5052 of the agitator 3750 (e.g., to the central region 5052). In at least example, the first and/or second bristle/flap arrangement 5000a, 5000b may extend from the first lateral end region 5051 to the second lateral end region 5053. The second bristle/flap arrangement 5000b may be rotationally/circumferentially offset relative to the first bristle/flap arrangement 5000a such that the first bristle/flap arrangement 5000a initially comes into contact with the surface to be cleaned prior to the second bristle/flap arrangement 5000b as the agitator 3750 rotates. This arrangement of the first and second bristle/flap arrangement 5000a,b may repeat around the agitator 3750.

In at least one example, an agitator 3750 consistent with the present disclosure may include one or more first and second bristle/flap groups 5050a,b. The first bristle/flap group 5050a may include at least two bristle/flap arrangements 5000 and/or at least one bristle/flap arrangement 5000 and one or more bristle strips and/or row of tufts 3754 or deformable flaps 3752. The first bristle/flap group 5050a may extend from the first lateral end region 5051 of the agitator 3750 towards the central region 5052 of the agitator 3750 (e.g., to the central region 5052). In at least one example, the plurality of bristle/flap arrangements 5000 (e.g., bristle strips and/or row of tufts 3754 and/or deformable flaps 3752) within the first bristle/flap group 5050a may be spaced apart from each other by a circumferential distance that is no more than 20% of the circumference of the agitator 3750 body, for example, no more than 15% of the circumference of the agitator 3750 body, no more than 10% of the circumference of the agitator 3750 body, and/or no more than 5% of the circumference of the agitator 3750 body.

The second bristle/flap group 5050b may include at least two bristle/flap arrangements 5000 and/or at least one bristle/flap arrangement 5000 and one or more bristle strips and/or row of tufts 3754 or deformable flaps 3752. The second bristle/flap group 5050b may extend from the second lateral end region 5053 of the agitator 3750 towards the central region 5052 of the agitator 3750 (e.g., to the central region 5052). In at least one example, the plurality of bristle/flap arrangements 5000 (e.g., bristle strips and/or row of tufts 3754 and/or deformable flaps 3752) within the second bristle/flap group 5050b may be spaced apart from each other by a circumferential distance that is no more than 20% of the circumference of the agitator 3750 body, for example, no more than 15% of the circumference of the agitator 3750 body, no more than 10% of the circumference of the agitator 3750 body, and/or no more than 5% of the circumference of the agitator 3750 body.

Optionally, the central end regions 3756 of the deformable flap 3752 and/or bristle strips and/or rows of tufts 3754 of one or more of the bristle/flap arrangements 5000 of the first bristle/flap group 5050a may partially overlap the same area on the surface to be cleaned as the central end regions 3756 of the deformable flap 3752 and/or bristle strips and/or rows of tufts 3754 of one or more of the bristle/flap arrangements 5000 of the second bristle/flap group 5050b when the agitator 3750 rotates. In one example, the length of the bristle strips and/or rows of tufts 3754 in the central region of the agitator 3750 may be shorter than its corresponding deformable flap 3752 and/or eliminated.

The first and second bristle/flap groups 5050a,b may be rotationally/circumferentially offset relative to each other. In other words, the first bristle/flap group 5050a initially comes into contact with the surface to be cleaned prior to the second bristle/flap group 5050b as the agitator 3750 rotates. This arrangement of the first and second bristle/flap groups 5050a,b may repeat around the agitator 3750. In other words, the first and second bristle/flap groups 5050a,b may generally be described as being staggered about the circumference of the agitator 3750 (e.g., a staggered configuration). In some instances, there may be some overlap between the first and second bristle/flap groups 5050a,b. For example, when extending helically around in a staggered configuration, portions of the first and second bristle/flap groups 5050a,b may simultaneously contact the surface to be cleaned. In at least one example, no portion of either bristle/flap group 5050a,b intersects or extends into the other bristle/flap group 5050a,b (e.g., no portion of the bristle/flap arrangements 5000 of either bristle/flap group 5050a,b is disposed between the bristle/flap arrangements 5000 of the other bristle/flap group 5050a,b).

Figure 37D:
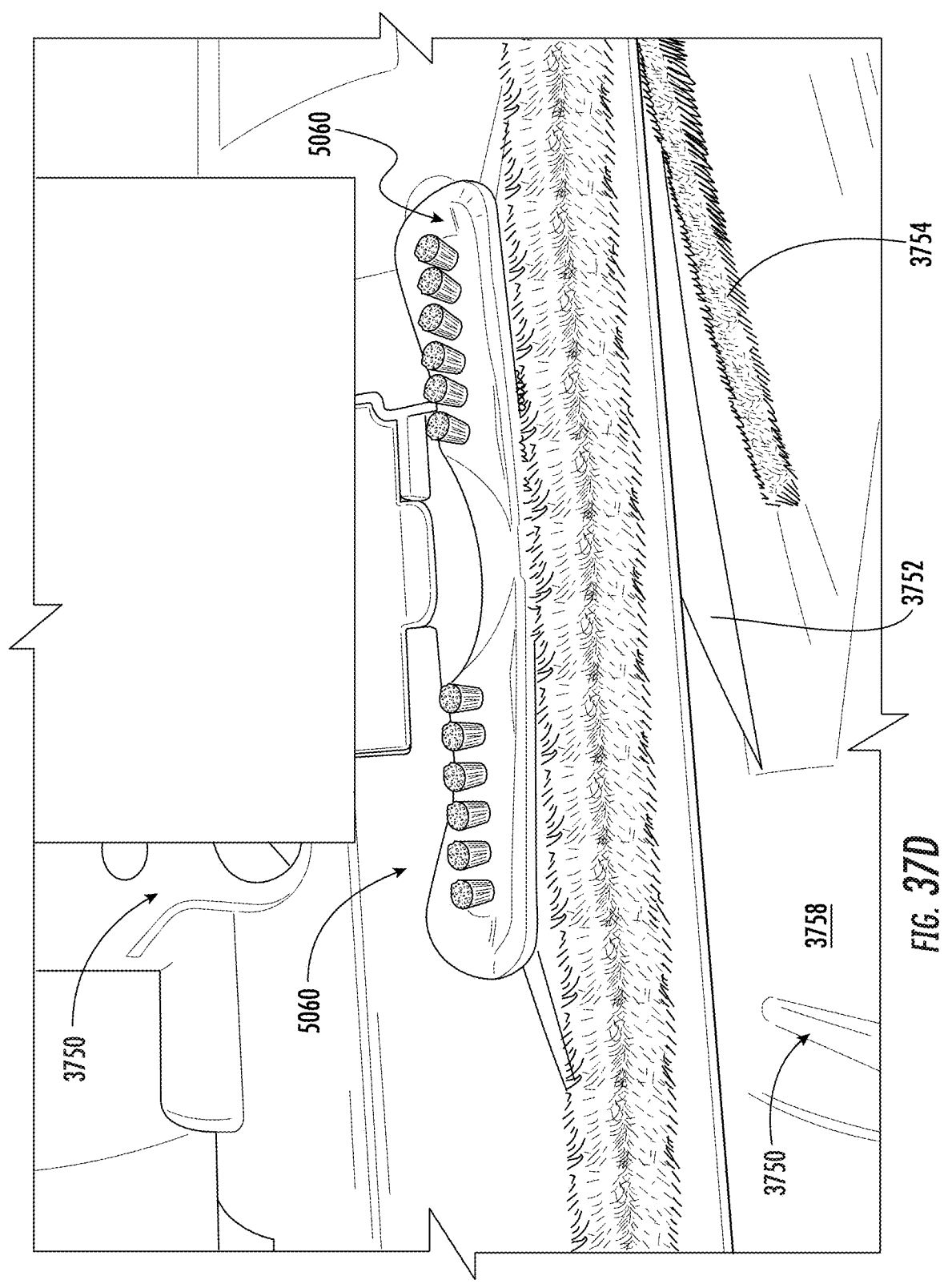
FIG. 37D shows a perspective view of a debrider having bristle combs, consistent with embodiments of the present disclosure.

It should be appreciated that in any of the embodiments described herein, the deformable flaps, row of bristle strips, and/or row of tufts may contact the teeth of the debrider 5061. Alternatively (or in addition), any of the embodiments described herein may include deformable flaps, row of bristle strips, and/or row of tufts that are clearanced (i.e., spaced apart) from the teeth of the debrider 5061 such that deformable flaps, row of bristle strips, and/or row of tufts do not contact the teeth of the debrider 5061. In particular, the deformable flaps, row of bristle strips, and/or row of tufts and the teeth of the debrider 5061 may be spaced apart from each other such that one or more layers of hair (e.g., two or more layers, three or more layers, or the like) on the agitator 3750 may contact the debrider 5061 as the agitator 3750 rotates. In addition, the teeth of any of the debriders 5061 described herein may include either rigid teeth and/or flexible teeth (e.g., bristles of a bristle comb 5060 as generally illustrated in FIG. 37D) that may deflect when in contact with the deformable flaps, rows of bristle strips, rows of tufts, and/or hair on the agitator 3750.

Figure 37E:
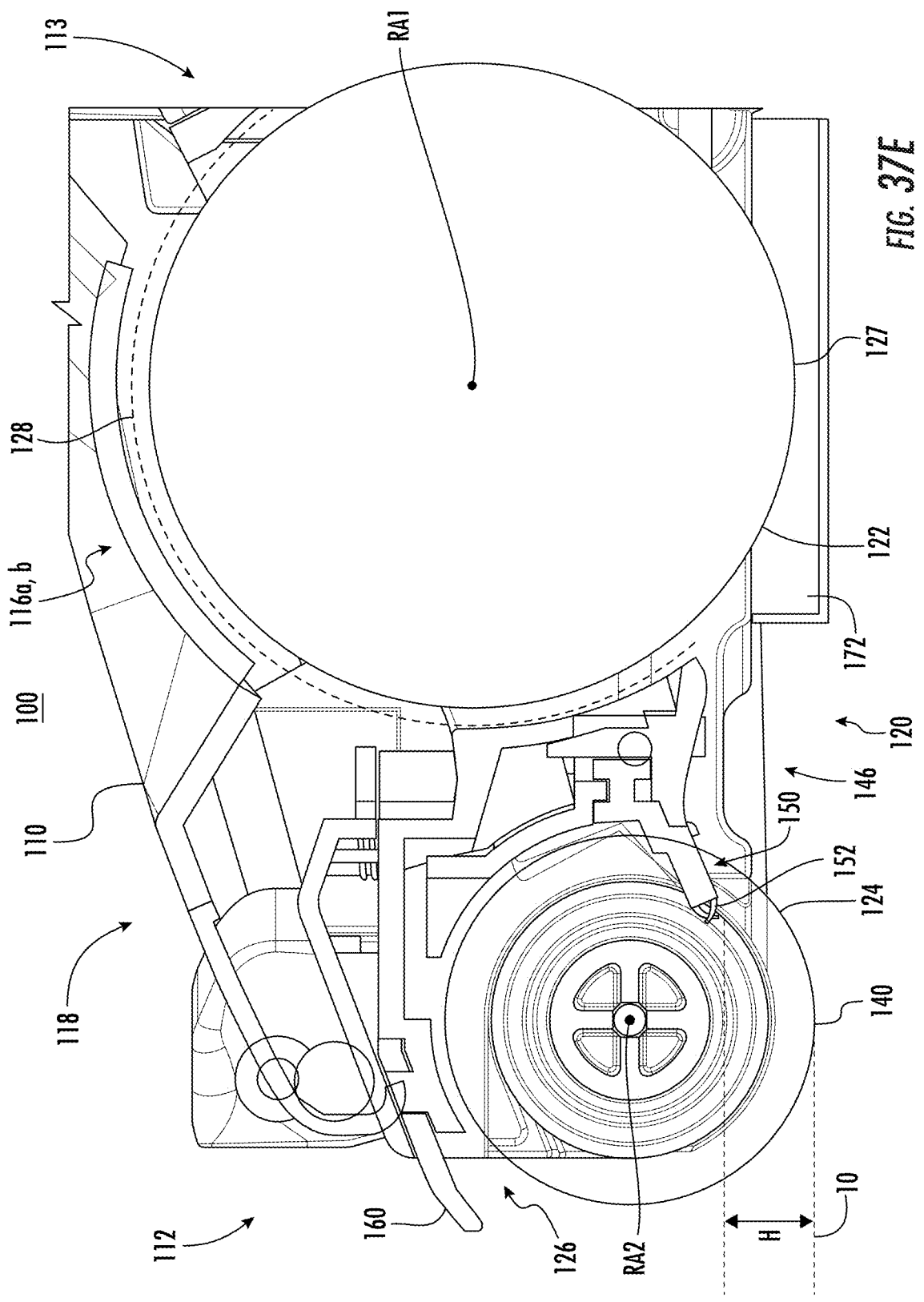
FIG. 37E shows a cross-sectional view of a vacuum cleaner including a leading roller and an agitator consistent with embodiments of FIGS. 37A-D.

The agitator 3750 may be used in any vacuum cleaner known to those skilled in the art. One example of a vacuum cleaner including dual agitators, consistent with an embodiment of the present disclosure, is shown in FIG. 37E. The vacuum cleaner includes a surface cleaning head 100 having a housing 110 with a front side 112, and a back side 113, left and right sides 116a, 116b, an upper side 118, and a lower or under side 120. The housing 110 defines a suction conduit 128 having an opening 127 on the underside 120 of the housing 110. The suction conduit 128 is fluidly coupled to a dirty air inlet, which leads to a suction motor (not shown) either in the surface cleaning head 100 or another location in the vacuum cleaner. The suction conduit 128 is the interior space defined by interior walls in the housing 110, which receives and directs air drawn in by suction, and the opening 127 is where the suction conduit 128 meets the underside 120 of the housing 110. Although an embodiment of the housing 110 is described herein for illustrative purposes, the housing 110 and components thereof may have other shapes and configurations.

The surface cleaning head 100 includes dual rotating agitators 122, 124, for example, a brush roll 122 and a leading roller 124. The brush roll 122 and leading roller 124 may be configured to rotate about first and second rotating axes (RA1, RA2), respectively, that generally extend perpendicular to a longitudinal axis LA of the surface cleaning head 100 (e.g., generally perpendicular to the intended direction of the vacuuming movement of the surface cleaning head 100 and/or generally parallel to the front side 112). The rotating brush roll 122 and/or the leading roller 124 may be coupled to, and rotated about the rotating axes, by one or more motors.

The rotating brush roll 122 (which may include the agitator 3750 as shown in FIG. 37A-D) may be at least partially disposed within the suction conduit 128 (shown schematically in broken lines in FIG. 37E). The leading roller 124 is positioned in front of and spaced from the brush roll 122 and at least substantially outside the suction conduit 128. The leading roller 124 may include any roller known to those skilled in the art including, but not limited to, a soft roller (e.g., a roller having a nap or pile) or the agitator 3750 as shown in FIG. 37A-D. As shown in FIG. 37E, at least an inside upper portion (e.g., at least an inside upper half) of the leading roller 124 may not be exposed to the flow path into the opening 127 of the suction conduit 128 while at least an inside of the bottom portion of the leading roller 124 may be exposed to the flow path into the opening 127 of the suction conduit 128. The leading roller 124 may be received in a leading roller chamber 126, which may prevent the inside upper half of the leading roller 124 from being exposed to the flow path. Other variations are possible with different portions of the leading roller 124 being exposed and not exposed to the flow path. A space between lower portions of the leading roller 124 and the brush roll 122 forms an inter-roller air passageway 146 that may provide at least a portion of the flow path into the opening 127 of the suction conduit 128 and allow debris to be carried into the suction conduit 128.

As shown, the brush roll 122 may be disposed in front of one or more wheels 130 for supporting the housing 110 on the surface 10 to be cleaned. For example, one or more larger wheels may be disposed along the back side 114 and/or one or more smaller middle wheels (not shown) may be provided at a middle section on the underside of the housing 110 and/or along the left and right sides 116a, 116b. Other wheel configurations may also be used. The wheels 130 facilitate moving the surface cleaning head 100 along the surface 10 to be cleaned, and may also allow the user to easily tilt or pivot the surface cleaning head 100 (e.g., brush roll 122 and/or the leading roller 124) off of the surface 10 to be cleaned. The rear wheel(s) 130 and the middle wheel(s) may provide the primary contact with the surface being cleaned and thus primarily support the surface cleaning head 100. When the surface cleaning head 100 is positioned on the surface 10 being cleaned, the leading roller 124 may also rest on the surface 10 being cleaned. In other embodiments, the leading roller 124 may be positioned such that the leading roller 124 sits just above the surface being cleaned.

One or more combing unit, debriding protrusions, and/or ribs may contact a surface of the leading roller 124 and/or the brush roll 122 to facilitate debris removal and/or migrate hair to a desired location. The combing unit, debriding protrusions, and/or ribs may include any combing unit, debriding protrusions, and/or ribs known to those skilled in the and/or described herein including, but not limited to, the combing unit, debriding protrusions, and/or ribs include combing unit 50, 93, debrider 5061, debriding protrusions 150, and ribs 508, 704, 1002, 1200, 1700, 1808, 2008, 3702.

According to an embodiment, one or more sealing strips 170, 172 may be located along the rear and left and right sides of the opening 127 to the suction conduit 128. The sealing strips 170, 172 may contact the surface 10 being cleaned to seal against the surface together with the leading roller 124 contacting the surface 10 in front of the roller. Side edge vacuum passageways may be formed between the side sealing strips 172 and the leading roller 124 to direct air into the inter-roller air passageway 146 and back towards the opening 127 of the suction conduit 128. As such, the side edge vacuum passageways and the inter-roller air passageway 146 provide at least a portion of the air flow path to the suction conduit 128.

The housing 110 may be open at the front side 112 such that a front portion of the leading roller 124 is exposed to facilitate edge cleaning. According to an embodiment, the housing 110 may include a front bumper 160 that extends from the front side 112 of the housing 110 just beyond (or at least as far as) a front contact surface of the leading roller 124 such that the bumper 160 first contacts a vertical surface 12 to prevent damage to the leading roller 124. The bumper 160 may be sufficiently resilient to bend or compress to allow the leading roller 124 to contact the vertical surface 12 for edge cleaning.

Figure 37F:
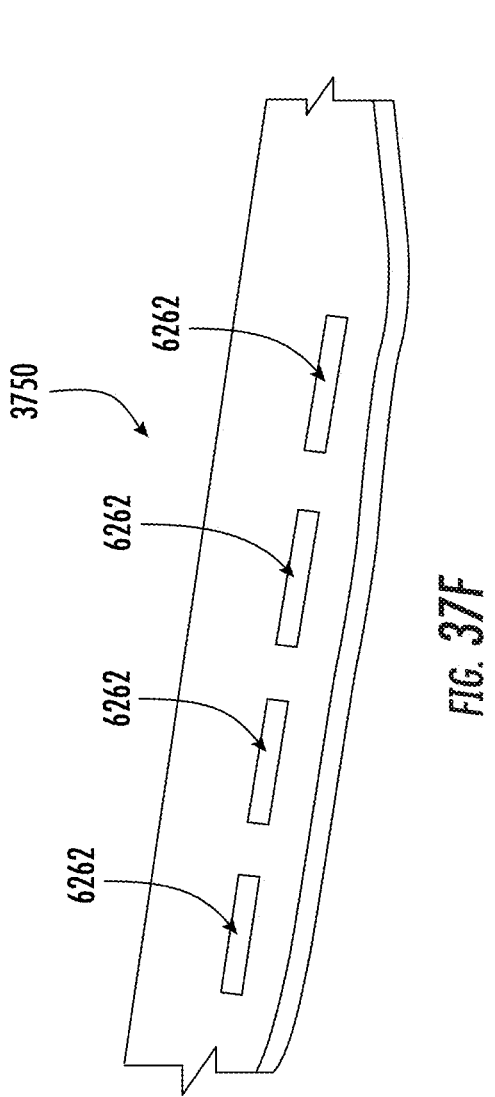
FIG. 37F shows a side view of a deformable flap including one or more holes, consistent with the present disclosure.

The rotating brush roll 122 may have bristles, fabric, or other cleaning elements, or any combination thereof around the outside of the brush roll 122. For example, the rotating brush roll 122 may include the agitator 3750. The agitator 3750 may further two deformable flaps 3752 in front of each row of bristle strips 3754. As such, two deformable flaps 3752 may be disposed in front of (e.g., immediately in front of) each bristle strip 3754 and two deformable flaps 3752 may be disposed behind (e.g., immediately behind) each bristle strip 3754 as the agitator 3750 rotates. Having two deformable flaps 3752 disposed in front of each bristle strip 3754 and two deformable flaps 3752 may be disposed behind each bristle strip 3754 may increase the number of agitating interactions, thereby improving carpet cleaning. With reference to FIG. 37F, one or more of the deformable flaps 3752 may include holes 6262 that may decrease the stiffness of the deformable flaps 3752, thereby reducing noise. The holes 6262 may be located anywhere on the deformable flaps 3752, for example, proximate the base of the deformable flaps 3752.

Figure 37G:
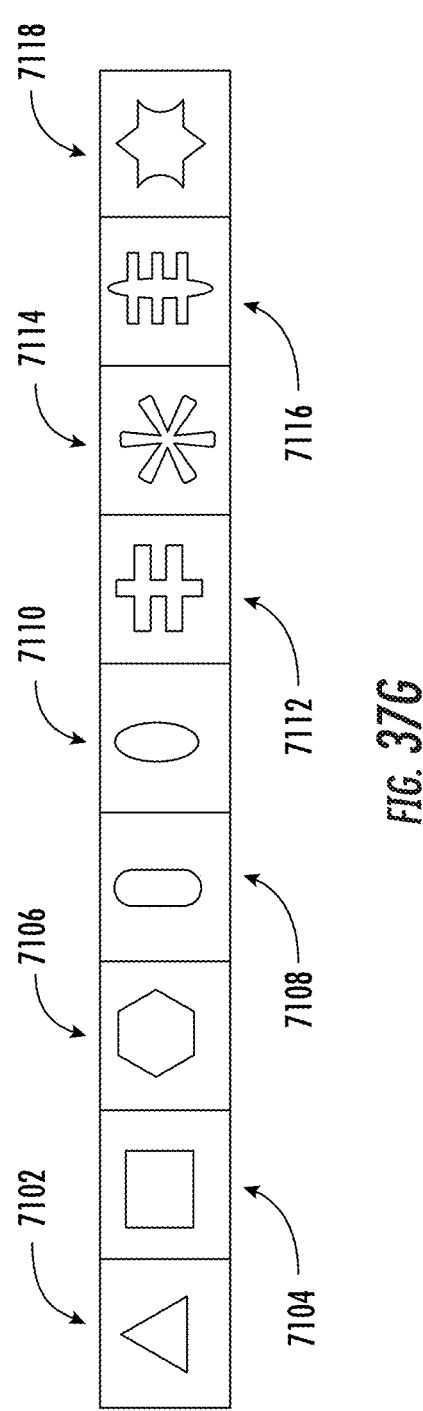
FIG. 37G shows various cross-sections of bristles, consistent with the present disclosure.

In addition, the hardness of the deformable flaps 3752 may be decreased, thereby decreasing the flap impact force and snap back force and reducing the noise. The flap tip OD/flap engagement with the floor may be decreased, which may increase deep-carpet agitation and reduce noise. Optionally, the bristle strip 3754 may be replaced with a row of bristle tufts. The bristle tufts may increase deep-carpet agitation, thereby improving carpet cleaning. The bristle strip 3754 may be aggressively angled, which may increase deep-carpet and abrasive agitation and enhance carpet cleaning and pet hair pickup. The aggressively angled bristle strip 3754 may optionally be used in combination with a passively angled deformable flap 3752 and/or an aggressively angled deformable flap 3752. The bristle filament length diameter/stiffness may be increased to improve deep-carpet agitation and carpet cleaning. Alternatively, the bristle filament length diameter/stiffness may be reduced to decrease human hair wrap and improve hair migration capabilities (e.g., hair migration to the center). Rather than a circular cross-section, the bristle filament shape in any of the examples disclosed herein may include one of more of the following cross-sectional shapes as generally illustrated in FIG. 37G: a triangular cross-section 7102 (optionally having a diameter of 0.15-0.20 mm); a square cross-section 7104 (optionally having a diameter of 0.15-0.20 mm); a hexagon cross-section 7106 (optionally having a diameter of 0.12-0.15 mm); an oval cross-section 7108, 7110 (optionally having a diameter of 0.13-0.15 mm); a not equal cross-section 7112 (optionally having a diameter of 0.13-0.16 mm); a hexalobal cross-section 7114 (optionally having a diameter of 0.16 mm); a caterpillar cross-section 7116 (optionally having a diameter of 0.24-0.30 mm); and a star cross-section 7118 (optionally having a diameter of 0.15-0.30 mm). The change in bristle shape may increase cleaning or pet-hair pickup. A soft material may be added between the deformable flaps 3752 to increase fine scrubbing/wiping of hard floors and increase stuck-on-dust pickup. The rotation speed of the agitator 3750 may be decreased to reduce the number of total interactions, thereby reducing noise.

Other examples of brush rolls and agitators are shown and described in greater detail in U.S. Pat. No. 9,456,723 and U.S. Patent Application Pub. No. 2016/0220082, which are fully incorporated herein by reference.

The leading roller 124 may include a relatively soft material (e.g., soft bristles, fabric, felt, nap or pile) arranged in a pattern (e.g., a spiral pattern) to facilitate capturing debris, as will be described in greater detail below. The leading roller 124 may be selected to be substantially softer than that of the brush roll 122. The softness, length, diameter, arrangement, and resiliency of the bristles and/or pile of the leading roller 124 may be selected to form a seal with a hard surface (e.g., but not limited to, a hard wood floor, tile floor, laminate floor, or the like), whereas the bristles of the brush roll 122 may selected to agitate carpet fibers or the like. For example, the leading roller 124 may be at least 25% softer than the brush roll 122, alternatively the leading roller 124 may be at least 30% softer than the brush roll 122, alternatively the leading roller 124 may be at least 35% softer than the brush roll 122, alternatively the leading roller 124 may be at least 40% softer than the brush roll 122, alternatively the leading roller 124 may be at least 50% softer than the brush roll 122, alternatively the leading roller 124 may be at least 60% softer than the brush roll 122. Softness may be determined, for example, based on the pliability of the bristles or pile being used.

The size and shape of the bristles and/or pile may be selected based on the intended application. For example, the leading roller 124 may include bristles and/or pile having a length of between 5 to 15 mm (e.g., 7 to 12 mm) and may have a diameter of 0.01 to 0.04 mm (e.g., 0.01-0.03 mm). According to one embodiment, the bristles and/or pile may have a length of 9 mm and a diameter of 0.02 mm. The bristles and/or pile may have any shape. For example, the bristles and/or pile may be linear, arcuate, and/or may have a compound shape. According to one embodiment, the bristles and/or pile may have a generally U and/or Y shape. The U and/or Y shaped bristles and/or pile may increase the number of points contacting the floor surface 10, thereby enhancing sweeping function of leading roller 124. The bristles and/or pile may be made on any material such as, but not limited to, Nylon 6 or Nylon 6/6.

The leading roller 124 may have an outside diameter Dlr that is smaller than the outside diameter Dbr of the brush roll 122. For example, the diameter Dlr may be greater than zero and less than or equal to 0.8 Dbr, greater than zero and less than or equal to 0.7 Dbr, or greater than zero and less than or equal to 0.6 Dbr. According to example embodiments, the diameter Dlr may be in the range of 0.3 Dbr to 0.8 Dbr, in the range of 0.4 Dbr to 0.8 Dbr, in the range of 0.3 Dbr to 0.7 Dbr, or in the range of 0.4 Dbr to 0.7 Dbr. As an illustrative example, the brush roll 122 may have an outside diameter of 48 mm and the leading roller 124 may have an outside diameter of 30 mm. While the leading roller 124 may have an outside diameter Dlr that is smaller than the outside diameter Dbr of the brush roll 122, the brush roll 122 may have bristles that are longer than the bristle and/or pile of the leading roller 122.

Positioning a leading roller 124 (having a diameter Dlr that is smaller than the diameter Dbr of the brush roll 122) in front of the brush roll 122 provides numerous benefits. For example, this arrangement decreases the height Hf (see, e.g., FIG. 1) of the front side 112 of the surface cleaning head 100 (e.g., the housing 110) from the surface 10 to be cleaned. The decreased height Hf of the front of the surface cleaning head 100 provides a lower profile that allows the surface cleaning head 100 to fit under objects (e.g., furniture and/or cabinets). Moreover, the lower height Hf allows for the addition of one or more light sources 111 (such as, but not limited to, LEDs), while still allowing the surface cleaning head 100 to fit under objects.

Additionally, the smaller diameter Dlr of the leading roller 124 allows the rotating axis of the leading roller 124 to be placed closer to the front side 112 of the surface cleaning head 100. When rotating, the leading roller 124 forms a generally cylindrical projection having a radius that is based on the overall diameter of the leading roller 124. As the diameter of the leading roller 124 decreases, the bottom contact surface 140 (FIG. 1) of the leading roller 124 moves forward towards the front side 112 of the surface cleaning head 100. In addition, when the surface cleaning head 100 contacts a vertical surface 12 (e.g., but not limited to, a wall, trim, and/or cabinet), the bottom contact surface 140 of the leading roller 124 is also closer to the vertical surface 12, thereby enhancing the front edge cleaning of the surface cleaning head 100 compared t o a larger diameter leading roller. Moreover, the smaller diameter Dlr of the leading roller 124 also reduces the load/drag on the motor driving the leading roller 124, thereby enhancing the lifespan of the motor and/or allowing a smaller motor to be used to rotate both the brush roll 122 and leading roller 124.

Figure 38:
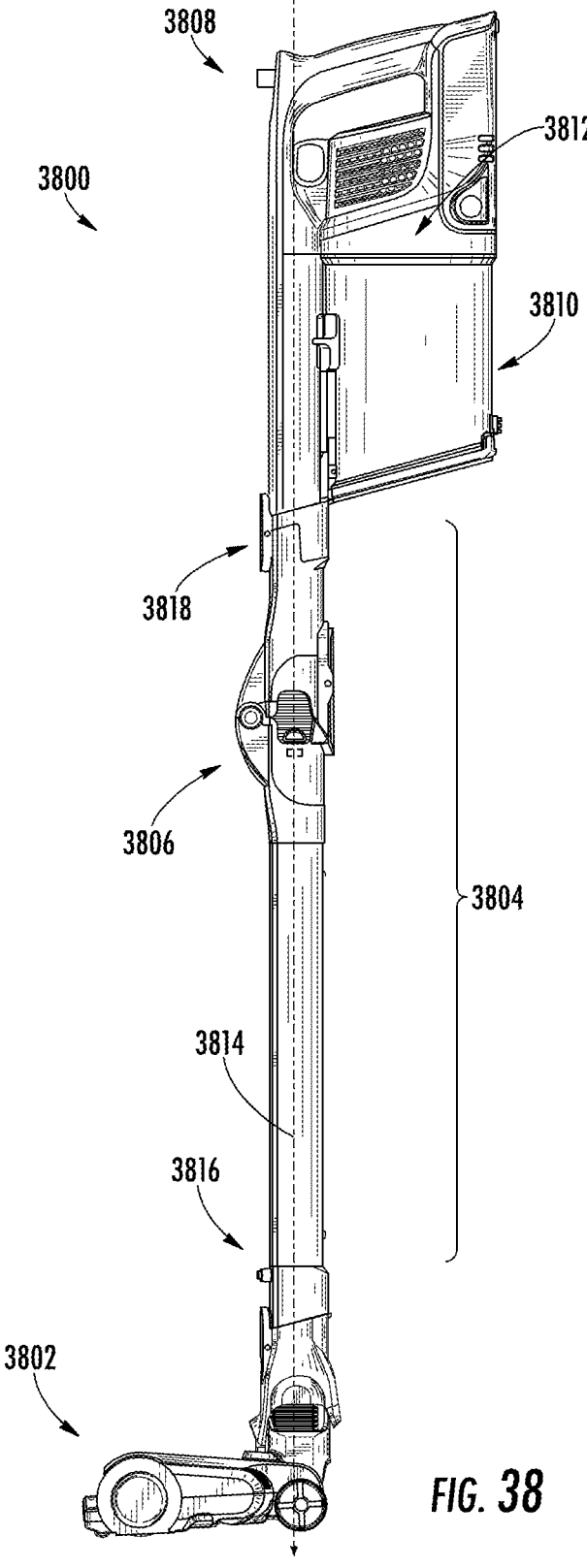
FIG. 38 shows another example of a vacuum cleaner, consistent with embodiments of the present disclosure.

With reference to FIG. 38, another example of a vacuum cleaner 3800 is generally illustrated. The vacuum cleaner 3800 may include a head 3802 (which may optionally include one or more agitators as described herein), a wand 3804 (which may optionally include one or more joints 3806 configured to allow the wand 3804 to bend, e.g., between an extended position as shown, and a bent position), and a hand vacuum 3808. The hand vacuum 3808 may include a debris collection chamber 3810 and a vacuum source 3812 (e.g., a suction motor or the like) for generating an airflow (e.g., partial vacuum) in the head 3802, wand 3804, and debris collection chamber 3810 to suck up debris proximate to the head 3802. The wand 3804 may define a wand longitudinal axis 3814 extending between a first end 3816 configured to be coupled to the head 3802, and a second end 3818 configured to be coupled to the hand vacuum 3808. One or more of the first and second ends 3816, 3818 may be removably coupled to the head 3802 and hand vacuum 3808, respectively.

Figure 39:
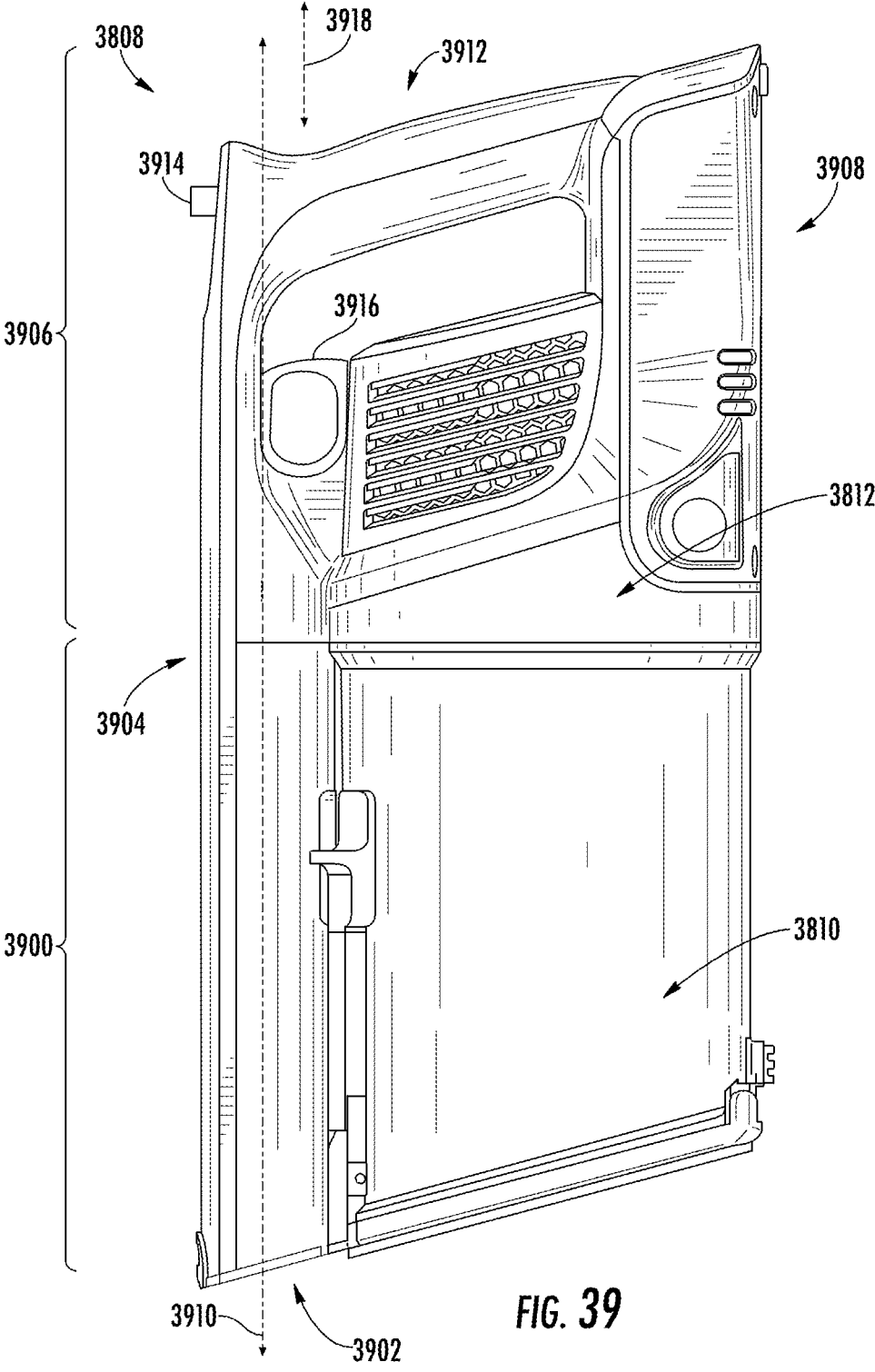
FIG. 39 shows one example of a hand vacuum of FIG. 38 including a trigger, consistent with embodiments of the present disclosure.
Figure 40:
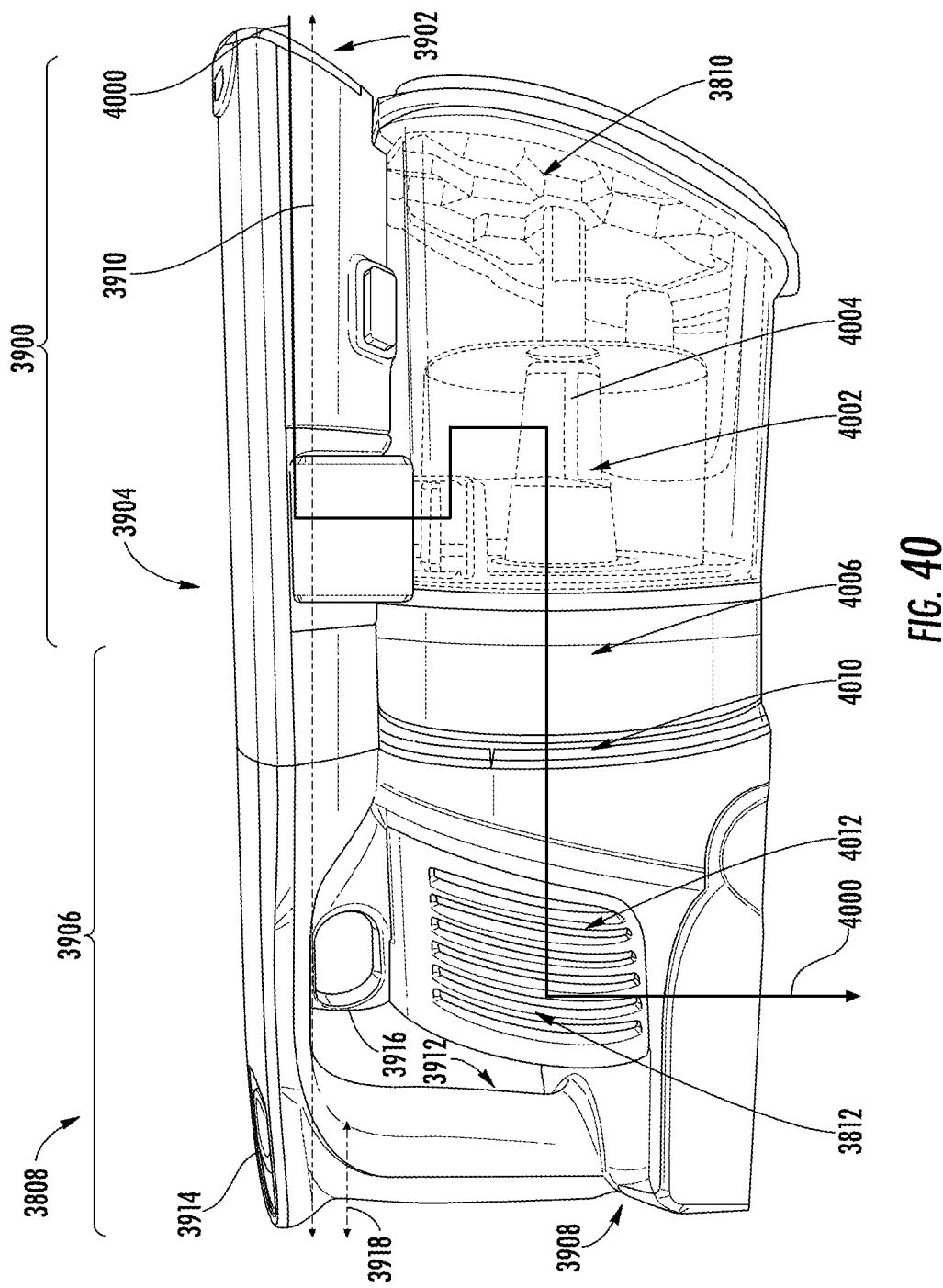
FIG. 40 shows one example of a hand vacuum of FIG. 38 including an air flow pathway extending therethrough, consistent with embodiments of the present disclosure.
Figure 41:
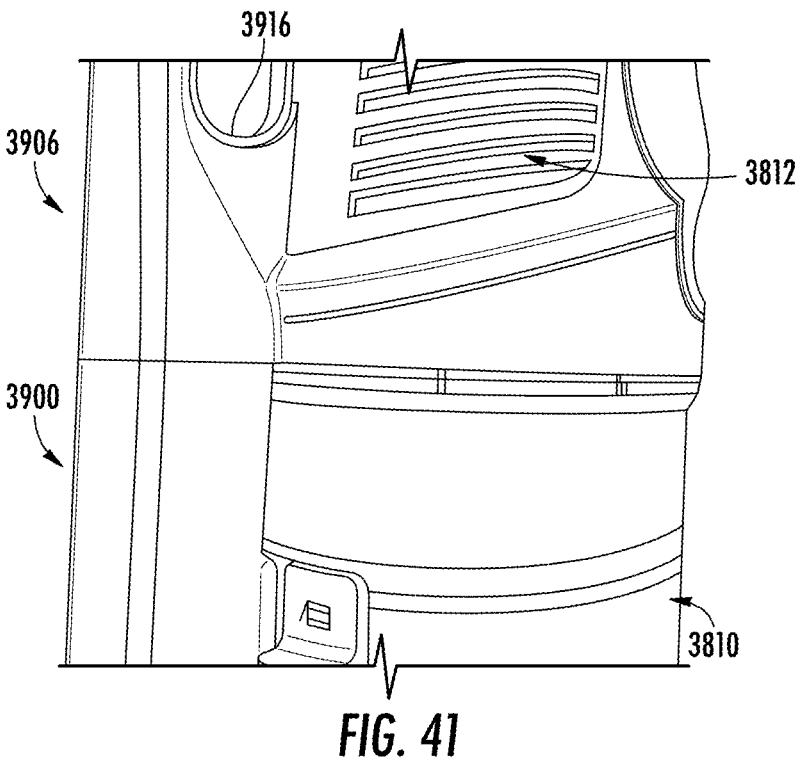
FIG. 41 generally shows one example of a close-up of the debris collection chamber secured to the may body of the hand vacuum, consistent with embodiments of the present disclosure.
Figure 42:
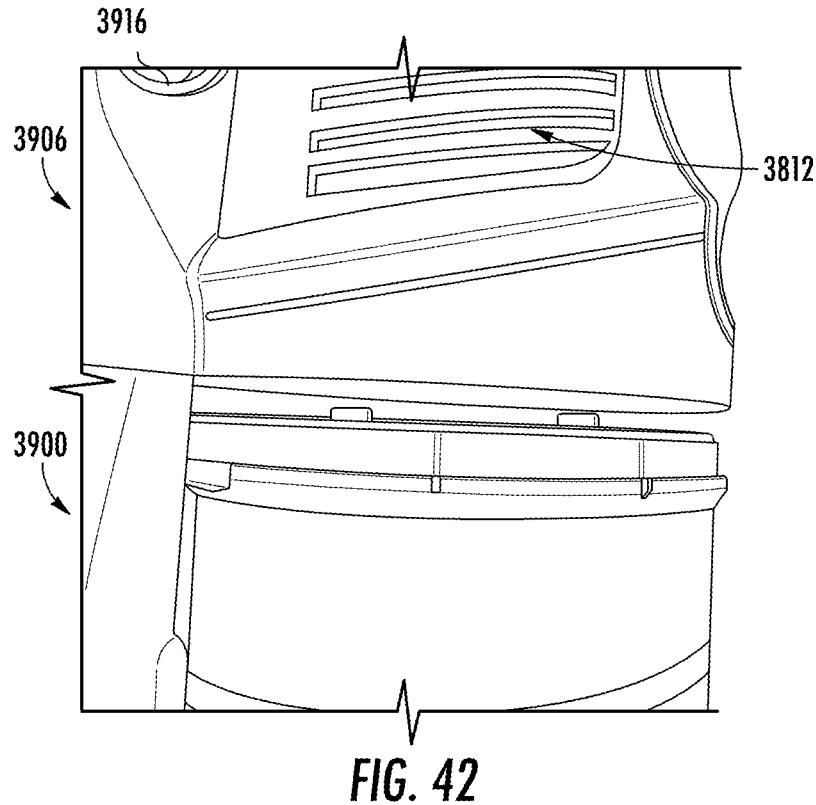
FIG. 42 generally shows one example of a close-up of the debris collection chamber unsecured to the may body of the hand vacuum, consistent with embodiments of the present disclosure.
Figures 43, 44:
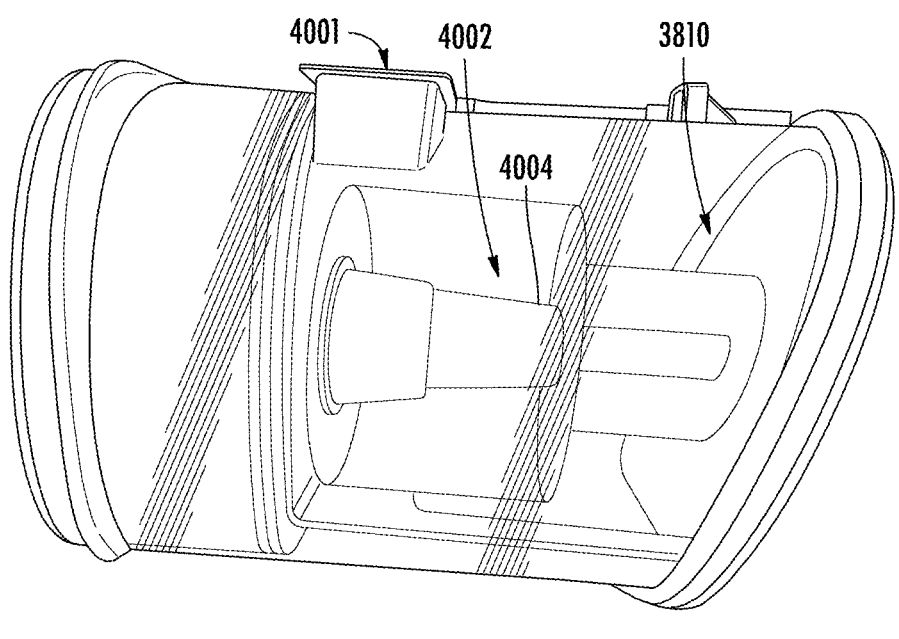
FIG. 43 generally shows one example of the debris collection chamber and the primary filter, consistent with embodiments of the present disclosure.
FIG. 44 generally shows one example of the debris collection chamber of FIG. 43 with a lid open and the primary filter, consistent with embodiments of the present disclosure.
Figure 45:
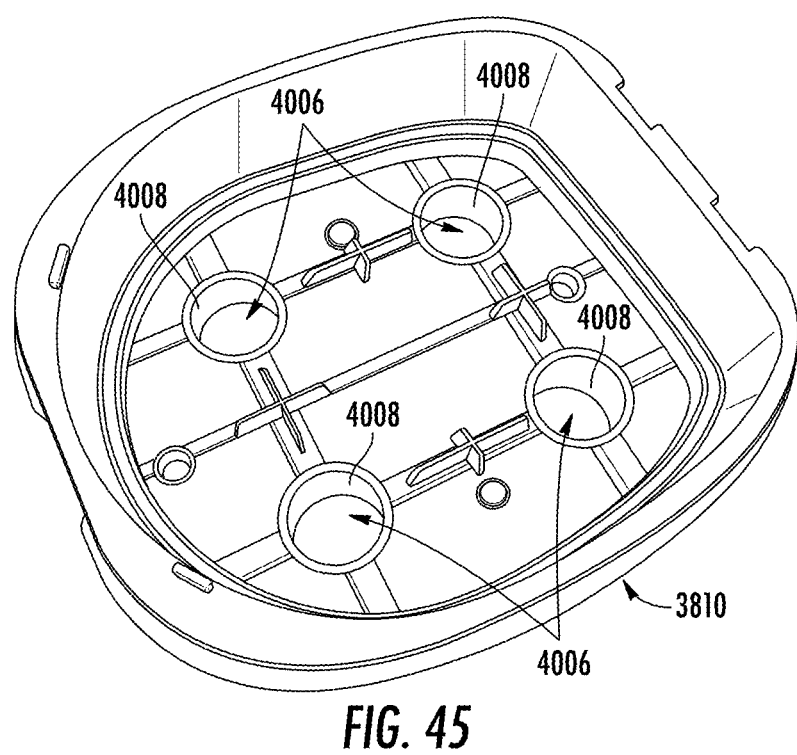
FIG. 45 generally shows one example of the second stage filter, consistent with embodiments of the present disclosure.

Turning now to FIG. 39, the hand vacuum 3808 of FIG. 38 is shown in more detail. In particular, the hand vacuum 3808 may include a wand connector 3900 having a first end region 3902 that is fluidly coupled to the second end 3818 of the wand 3804, and a second end region 3904 that is coupled to a handle body 3906 forming a portion of the main body 3908 of the hand vacuum 3808. The wand connector body 3900 includes a longitudinal wand axis 3910 that extends through the first end region 3902 to the second end region 3904, and through at least a portion of the handle body 3906. The longitudinal wand axis 3910 may be parallel to the wand longitudinal axis 3814. For example, the longitudinal wand axis 3910 may be colinear with the wand longitudinal axis 3814.

The handle body 3906 may further include a handle 3912, for example, in the form of a pistol grip or the like, which the user can grasp to manipulate the hand vacuum 3808. The handle body 3906 may optionally include one or more actuators (e.g., buttons) 3914. The actuator 3914 may be located anywhere on the hand vacuum 3808 (such as, but not limited to, on the handle body 3906). The actuator 3914 may be configured to adjust one or more parameters of the hand vacuum 3808 and/or the head 3802. For example, the actuator 3914 may turn on power to the suction motor 3812 and/or to one or more rotatable agitators located in the head 3802.

Alternatively, or in addition to the actuators 3914, the handle body 3906 may include a trigger 3916 configured to adjust one or more parameters of the hand vacuum 3808 and/or the head 3802. The trigger 3916 may be at least partially located between the handle 3912 and the wand connector 3900, and may move along a trigger direction 3918. The trigger direction 3918 may be linear or non-linear (e.g., arcuate or the like). In at least one example, the trigger direction 3918 may be parallel to the longitudinal wand axis 3910 and/or the wand longitudinal axis 3814. For example, the trigger direction 3918 may be colinear with the longitudinal wand axis 3910 and/or the wand longitudinal axis 3814. The trigger direction 3918 may extend through at least a portion of the wand connector 3900 and/or the wand 3804. The trigger 3916 may be particularly suited for adjusting the suction force of the suction motor 3812 and/or for adjusting the rotational speed of one or more of the rotatable agitators located in the head 3802. The positioning of the trigger 3916 may provide an ergonomically friendly design that facilitates use of the vacuum cleaner 3800.

With reference to FIGS. 40-47, further details of one example of the hand vacuum 3808 of FIGS. 38-39 are shown. In particular, an air pathway 4000 may extend from the wand 3804 (not shown), through the wand connector 3900 (for example, through the first end region 3902) and into the debris collection chamber 3810. At least some of the debris may be collected in the debris collection chamber 3810, for example, through an inlet 4001 (FIGS. 43-44) of the debris collection chamber 3810 which is coupled the second end region 3904 of the wand connector 3900. The air pathway 4000 may extend from the debris collection chamber 3810 and through one or more primary filters 4002 (see, e.g., FIGS. 43-44). In at least one example, the primary filter 4002 may include one or more cyclonic filters 4004 as generally illustrated, though it should be appreciated that any filter may be used. Optionally, the air pathway 4000 may extend through one or more secondary (e.g., second stage) filters 4006 (see, e.g., FIG. 45). The secondary filters 4006 may include any known filter such as, but not limited to, a plurality of cyclones 4008. The plurality of second stage cyclones 4008 may be smaller than the primary filter 4002, and may be configured to separate smaller debris particles from the air pathway 4000 than the primary filter 4002. The secondary filters 4006 may be located in the air pathway 4000 between the primary filter 4002 and the vacuum source 3812.

Figure 46:
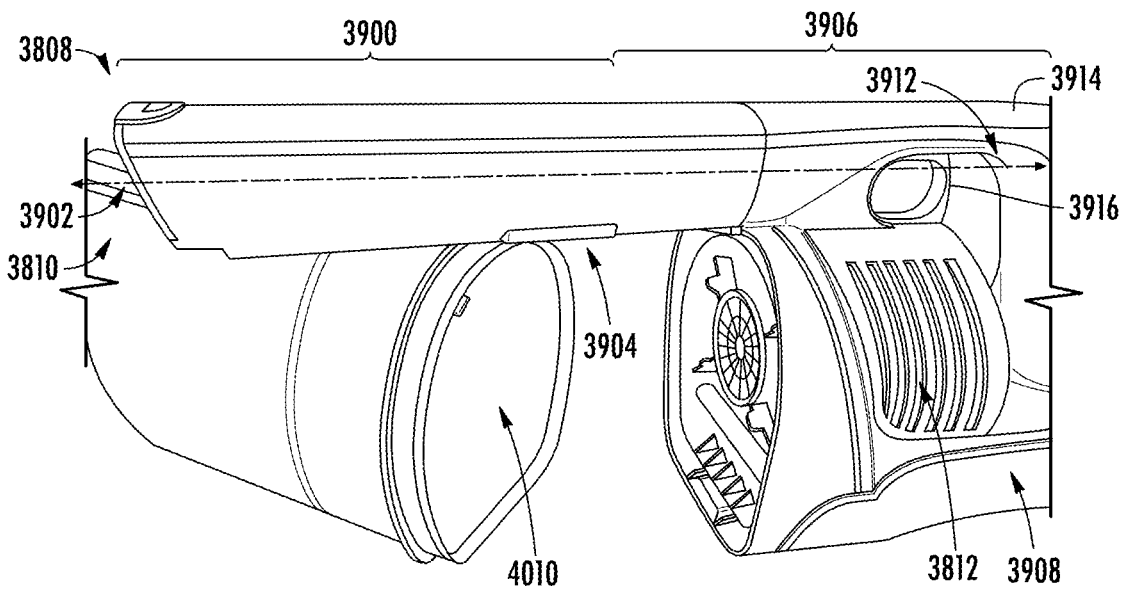
FIG. 46 generally shows one example of the pre-motor filter, consistent with embodiments of the present disclosure.
Figure 47:
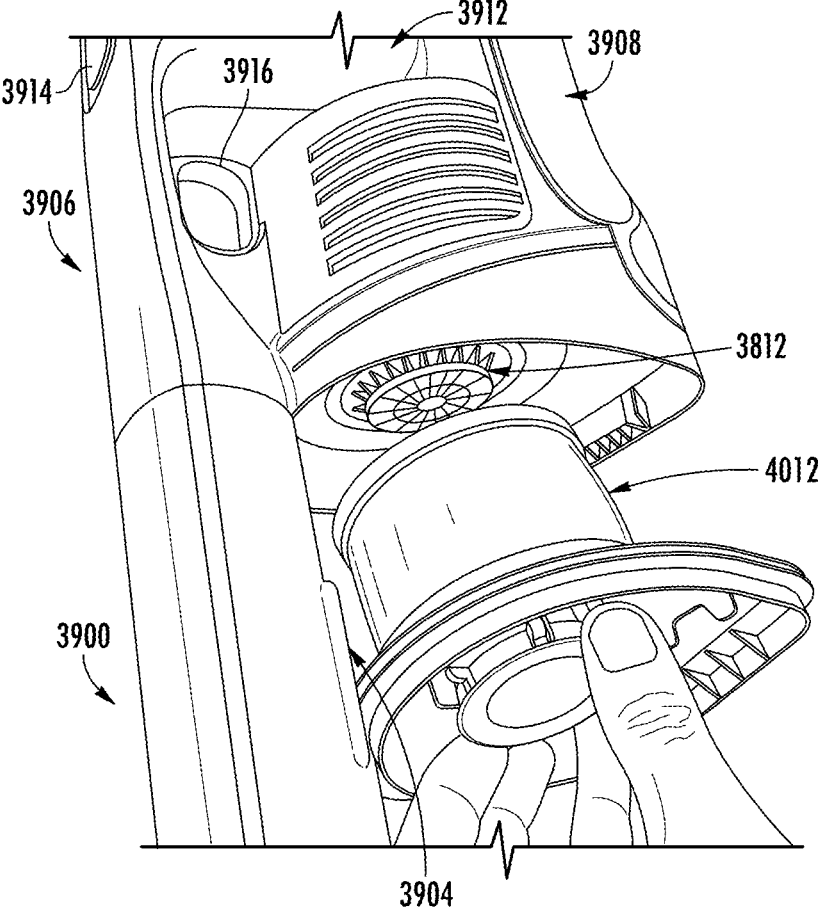
FIG. 47 generally shows one example of the post motor filter, consistent with embodiments of the present disclosure.

Optionally, one or more pre-motor filters 4010 may be provided (see, e.g., FIG. 46). The pre-motor filters 4010 may be located in the air pathway 4000 between the primary filter 4002 and the vacuum source 3812, for example, between the secondary filter 4006 and the vacuum source 3812. The pre-motor filters 4010 may be configured to separate smaller debris particles from the air pathway 4000 than the primary filter 4002 and/or the secondary filter 4006. In at least one example, the pre-motor filters 4010 may include one or more foam layers, cloth and/or woven layers, or the like. Optionally, the exhaust air in the air pathway 4000 may exit the vacuum source 3812 through one or more post motor filters 4012 (see, e.g., FIG. 47). The post motor filters 4012 may include a high-efficiency particulate air (HEPA) filter or the like.

Figure 48:
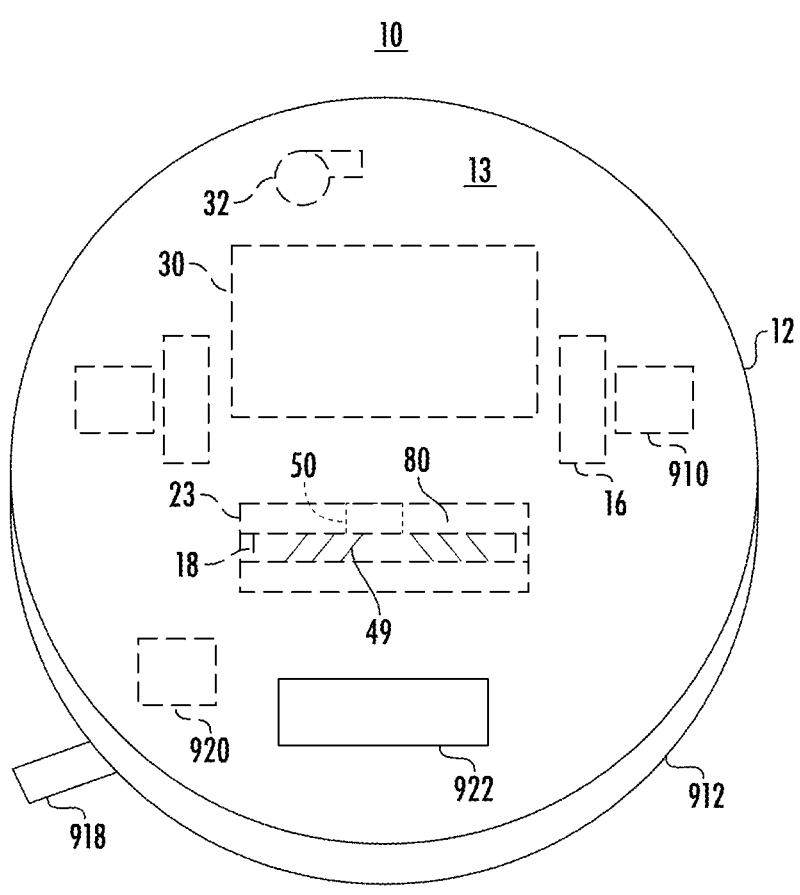
FIG. 48 generally illustrates one embodiment of a robot vacuum cleaner which may include one or more of the features described in the present disclosure.

While various features disclosed herein have been illustrated in combination with a hand-operated vacuum cleaner, any one or more of these features may be incorporated into a robot vacuum cleaner as generally illustrated in FIG. 48. It should be understood that the robotic vacuum cleaner shown is for exemplary purposes only and that a robotic vacuum cleaner may not include all of the features shown in FIG. 48 and/or may include additional features not shown in FIG. 48. The robotic vacuum cleaner may include an air inlet 23 fluidly coupled to a debris compartment 30 and a suction motor 32. The suction motor 32 causes debris to be suctioned into the air inlet 23 and deposited into the debris compartment 30 for later disposal. The robotic vacuum cleaner may optionally include one or more agitators 18 at least partially disposed within the air inlet 23. The agitator 18 may be driven by one or more motors disposed within the robotic vacuum cleaner. By way of a non-limiting example, the agitator 18 may include a rotatable bush bar having a plurality of bristles and/or sidewalls 62 (e.g., resiliently deformable flaps). The robotic vacuum cleaner may include one or more wheels 16 coupled to a respective drive motor 910. As such, each wheel 16 may be generally described as being independently driven. The robotic vacuum cleaner can be steered by adjusting the rotational speed of one of the plurality of wheels 16 relative to the other of the plurality of wheels 16. One or more side brushes 918 can be positioned such that a portion of the side brush 918 extends at least to (e.g., beyond) the perimeter defined by a vacuum housing 13 of the robotic vacuum cleaner. The side brush 918 can be configured to urge debris in a direction of the air inlet 23 such that debris located beyond the perimeter of the vacuum housing 13 can be collected. For example, the side brush 918 can be configured to rotate in response to activation of a side brush motor 920.

A user interface 922 can be provided to allow a user to control the robotic vacuum cleaner. For example, the user interface 922 may include one or more push buttons that correspond to one or more features of the robotic vacuum cleaner. The robotic vacuum cleaner may optionally include a power source (such as one or more batteries) and/or one or more displaceable bumpers 912 disposed along a portion of the perimeter defined by a vacuum housing 13 of the robotic vacuum cleaner. The displaceable bumper 912 may displaced in response to engaging (e.g., contacting) at least a portion of an obstacle that is spaced apart from the surface to be cleaned. Therefore, the robotic vacuum cleaner may avoid becoming trapped between the obstacle and the surface to be cleaned. The robotic vacuum cleaner may include any one or more of the various features disclosed herein.

Figure 49:
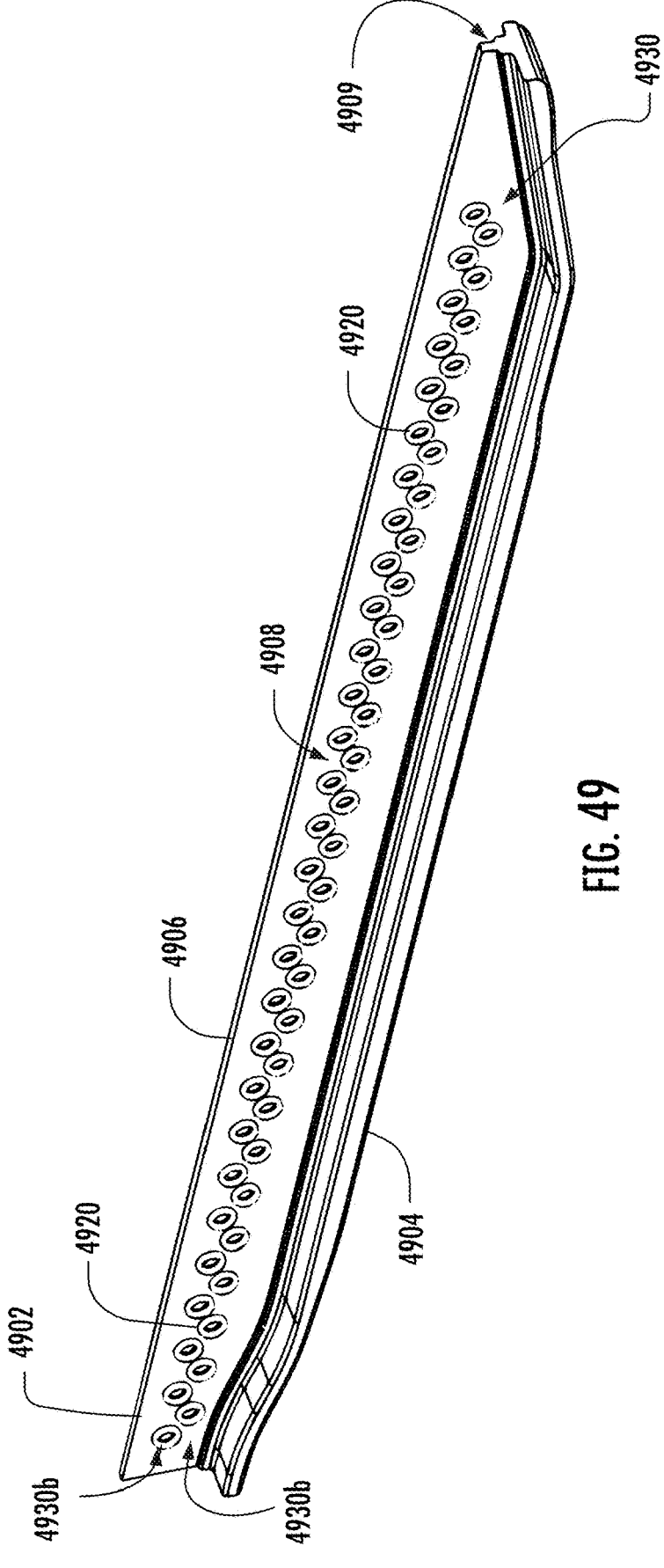
FIG. 49 generally shows a perspective view of another embodiment of a resiliently deformable flap, consistent with the present disclosure.
Figure 50A:
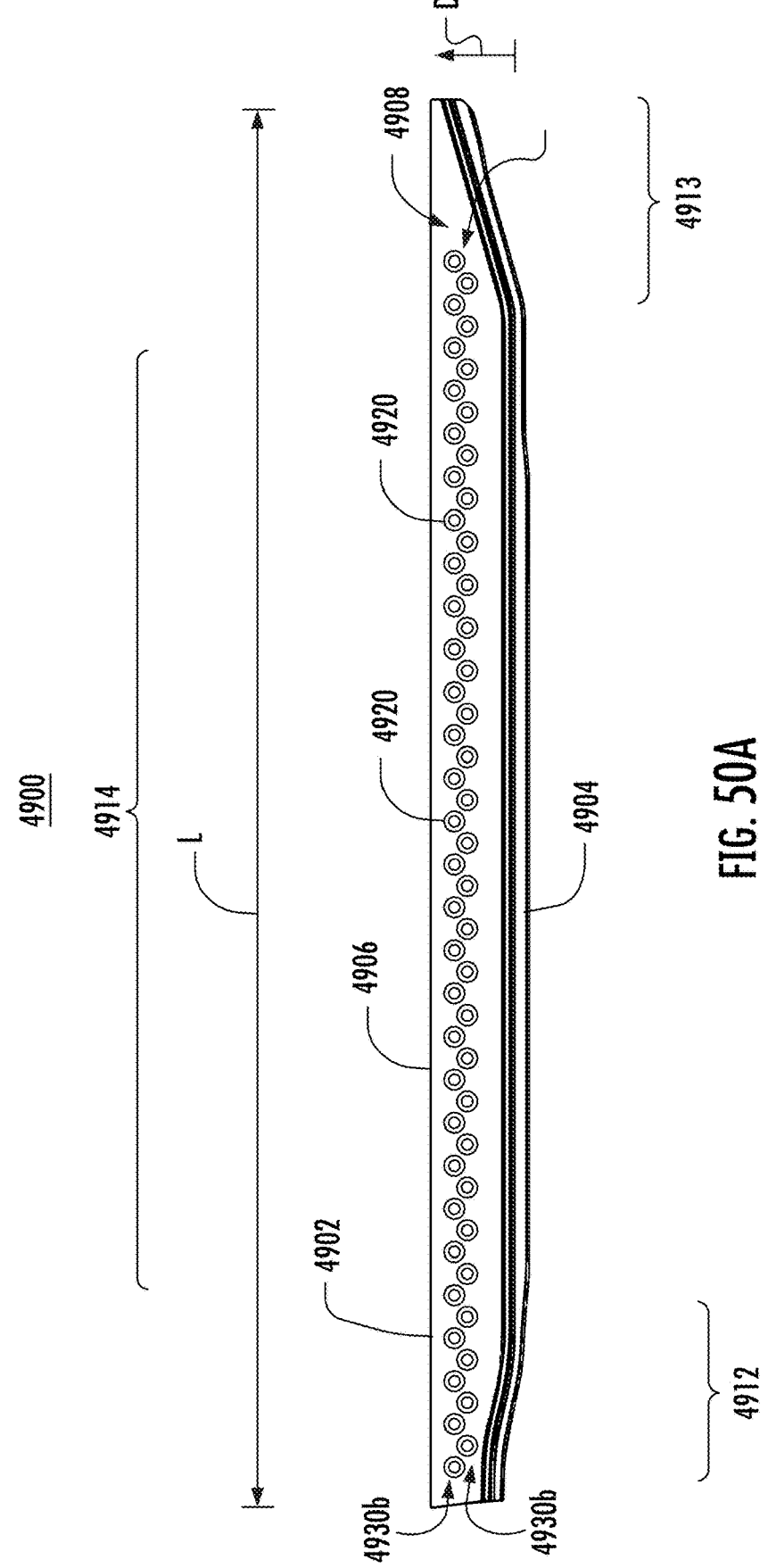
FIG. 50A generally shows a side view of the resiliently deformable flap of FIG. 49.
Figure 50B:
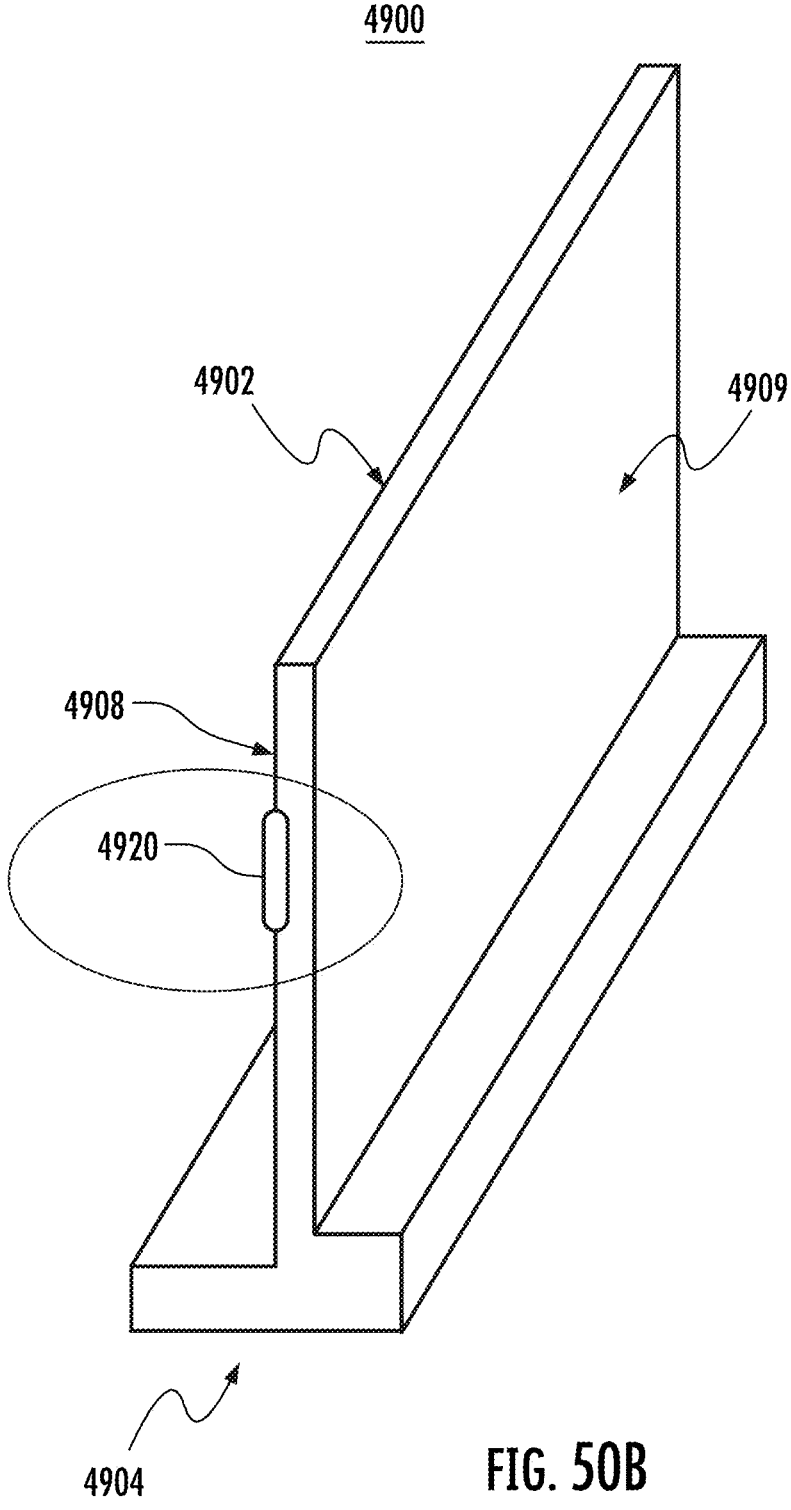
FIG. 50B generally shows a cross-sectional view of the resiliently deformable flap of FIG. 49.
Figure 50C:
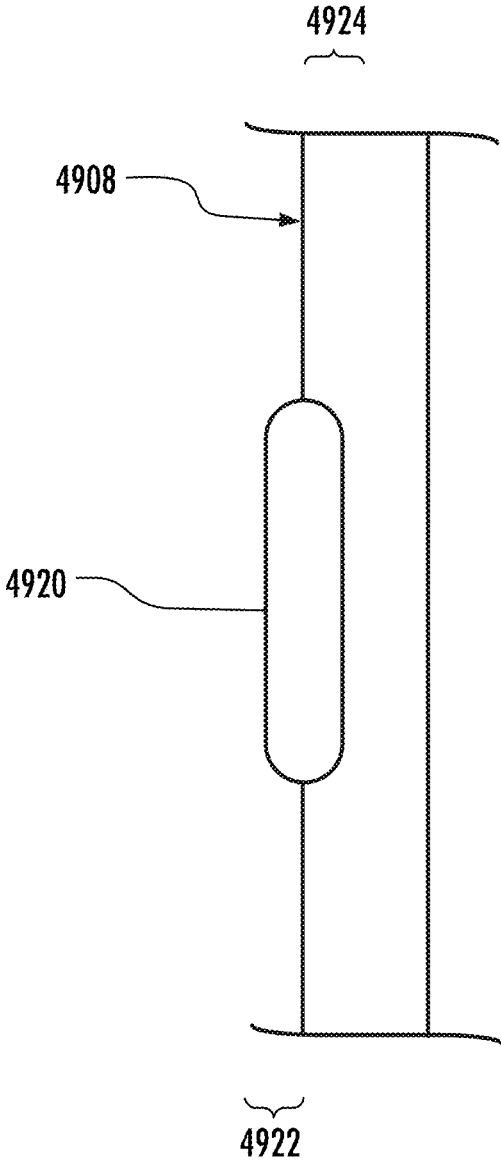
FIG. 50C generally shows an enlarged view of the projection of FIG. 50B.

Turning now to FIGS. 49-50C, another example of a resiliently deformable flap 4900 is generally illustrated. The resiliently deformable flap 4900 may be similar to the resiliently deformable flap and agitator described in FIGS. 28-37G and may therefore include any combination of the features described therein unless. For the sake of brevity, the following discussion will primarily focus on the differences. The resiliently deformable flap 4900 may be used with an agitator in combination with one or more bristle strips and/or row of tufts (e.g., one or more adjacent bristle strips and/or row of tufts) or without bristle strips and/or row of tufts as described herein.

The resiliently deformable flap 4900 includes an elongated body 4902 extending from a base 4904. The elongated body 4902 extends outwardly from the base 4904 and the distal end thereof forms a cleaning edge 4906. The elongated body 4902 may have a generally planar front and/or rear face 4908, 4909; however, it should be appreciated that the front and/or rear face 4908, 4909 may be non-planar. As used herein, the front face 4808 of the elongated body 4902 refers to the face/surface of the elongated body 4902 that approaches the surface to be cleaned (and/or contacts the surface to be cleaned first) when the flap 4900 is coupled to an agitator (i.e., the "front" of the flap 4900) and the agitator is rotating during cleaning, while the rear face 4909 of the elongated body 4902 refers to the face of the elongated body 4902 generally opposite to the front face 4908 (i.e., the "back" of the flap 4900). The cleaning edge 4906 may extend generally linearly along the length L (i.e., left to right as shown in FIG. 50A) of the flap 4900; however, it should be appreciated that the cleaning edge 4906 may be non-linear as well.

The distance D, FIG. 50A, that the elongated body 4902 extends from the base 4904 may be constant or varied along the overall length L. For example, the distance between the base 4904 and the cleaning edge 4906 may be smaller in the first and/or second end regions 4912, 4913 compared to the central region 4914 as generally described herein. The first and/or second end regions 4912, 4913 may have a taper as generally described herein.

The base 4904 (which may also be referred to as a mounting edge) may be configured to be secured to the flap 4900 to an agitator as generally described herein. By way of a non-limiting example, the base 4904 may include a "T" shape configured to be slidingly advanced into a corresponding "T" channel formed in the agitator. The base/mounting edge 4904 may be formed by one continuous section as generally illustrated; however, it may be appreciated that the base/mounting edge 4904 may optionally include a plurality of segments (e.g., a plurality of contoured "T" segments produced in a mold) that straighten out when the flap 4900 is installed in the agitator body, thereby resulting in a contoured (e.g., tapered) cleaning edge 4906 in the first and/or second end regions 4912, 4913 as generally described herein.

The elongated body 4902 may include one or more (e.g., a plurality) of projections 4920. The projections 4920 may be disposed on at least a portion of the front face 4908 of the elongated body 4902. In the illustrated example, the projections 4920 are disposed only on the front face 4908 of the elongated body 4902. It should be appreciated, however, that the projections 4920 may be disposed on both the front and rear faces 4908, 4909 of the elongated body 4902. For example, separate projections 4902 may be disposed on the front and rear faces 4908, 4909 and/or projections 4920 may extend from the front to the rear face 4908, 4909.

One or more of the projections 4920 may extend substantially across a substantial portion of the length of the elongated body 4902, for example, at least 25% of the length of the elongated body 4902, at least 33% of the length of the elongated body 4902, at least 50% of the length of the elongated body 4902, at least 75% of the length of the elongated body 4902, at least 80% of the length of the elongated body 4902, at least 85% of the length of the elongated body 4902, at least 90% of the length of the elongated body 4902, at least 95% of the length of the elongated body 4902, including all values and ranges therein. The resiliently deformable flap 4900 may optionally include two or more rows of projections 4920 may extend substantially across a substantial portion of the length of the elongated body 4902.

Figure 51:
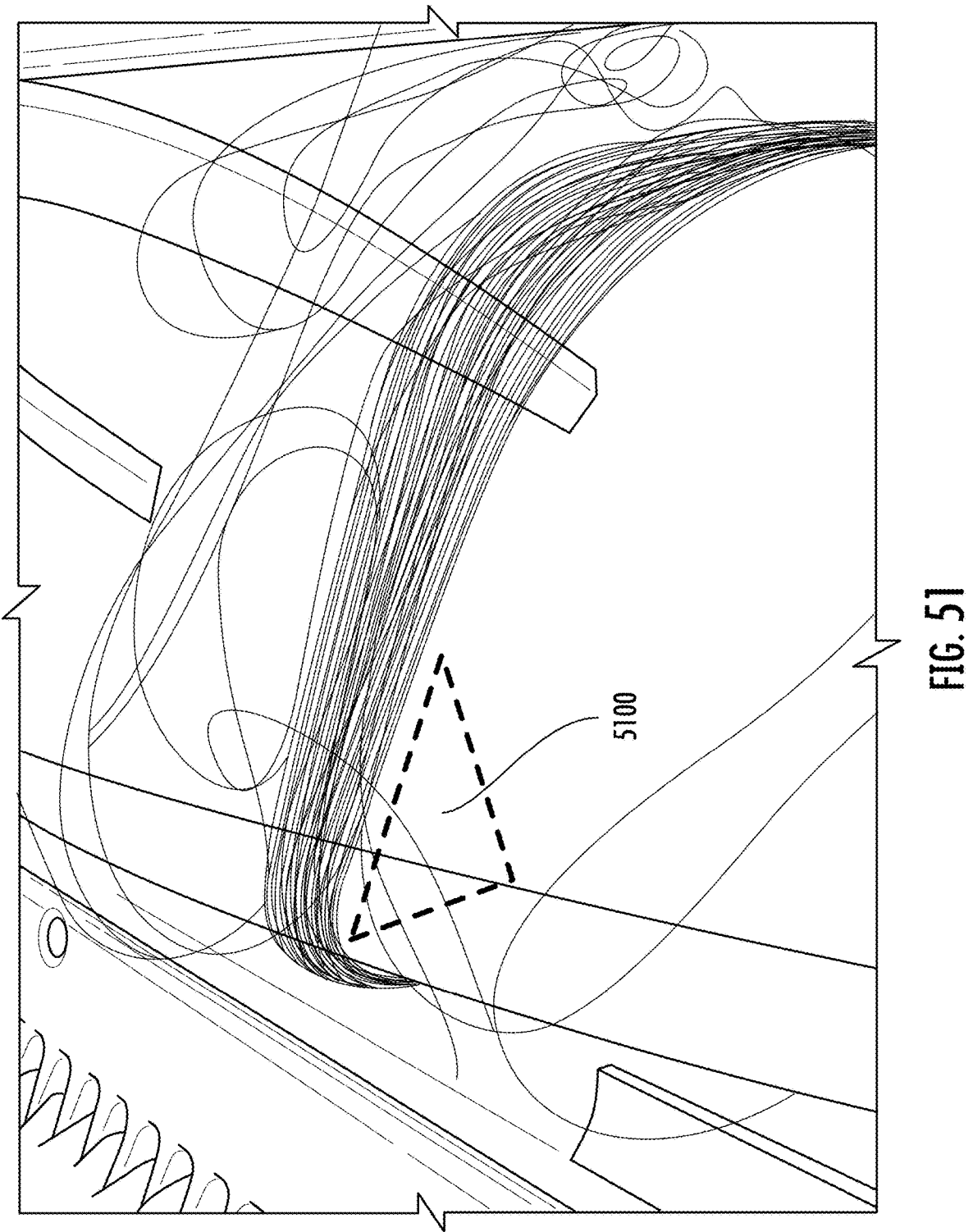
FIG. 51 generally shows one example of hair wrapped around a resiliently deformable flap consistent with the present disclosure.

With reference to FIGS. 50B and 50C, the projections 4920 may include a raised portion 4922 which extends outwardly from the front or rear faces 4908, 4909 of the elongated body 4902. For example, the raised portion 4922 may extend generally perpendicular to the front or rear faces 4908, 4909 of the elongated body 4902. The raised portion 4922 may have a generally annular or ring shape as shown; however, the raise portion 4922 may have other shapes including, but not limited to, rectangular shapes, star shapes, oval shapes, or the like. In addition, the raised portion 4922 may be a partial or truncated shape (e.g., truncated annular or ring shapes, rectangular shapes, star shapes, oval shapes, or the like). The distance that the projections 4920 extend away from the face of the elongated body 4902 (e.g., the thickness of the raised portion 4922) may be selected based on durability, effectiveness for agitation and debris release, repeatability in manufacturing, and/or to minimize the potential for increased hair wrap by staying within the triangle 5100 (see FIG. 51). created by the hair 5102.

The projections 4920 may optionally include a recessed portion 4924. The recessed portion 4924 may extend into the elongated body 4902 (e.g., inwardly relative to the front face 4908 from which the projection 4920 extends and/or inwardly relative to the rear face 4908 from which the projection 4920 extends). In the illustrated example, the recessed portion 4924 is disposed at least partially within the center region of the raised portion 4922. The raised portion 4922 may define a perimeter of the recessed portion 4924 (e.g., the raised portion 4922 may circumscribe the recessed portion 4924). The distance that the projections 4920 extend from the face into of the elongated body 4902 (e.g., the thickness of the recessed portion 4924) may be selected to disperse enough molten material to form the raised portion 4922 and avoid reducing overall durability of the flap 4900. The recessed portion 4924 may have a generally "crater" like shape with a base at the lower/deepest point; however, the present disclosure is not limited to this configuration unless specifically claimed as such.

Referring back to FIGS. 49-50A, a plurality of projections 4920 may be disposed along the length L of the flap 4900. For example, the projections 4920 may be arranged in one or more rows 4930 extending generally along the length L of the flap 4900. In the illustrated example, the projections 4920 are arranged in two rows 4930 (4930a, 4930b). Within each row 4930, the separation distance between adjacent projections 4920 (e.g., center-to-center) may be consistent or varied along the length L. One or more of the rows 4930 (e.g., 4930a) may extend generally parallel to the cleaning edge 4906. One or more of the rows 4930 (e.g., 4930a) may extend generally parallel to another (e.g., adjacent) row 4930

(e.g., 4930b). The projections 4920 within a first row 4930 (e.g., row 4930a) may be offset left-to-right relative to the projections 4920 in an adjacent row 4930 (e.g., row 4930b). Offsetting the projections 4920 in adjacent rows 4930 may allow the projections 4920 to be grouped closer together thereby reducing/minimizing "blank space" between the projections 4920 and increasing the probability that the surface to be cleaned will come into contact with projections 4920 as the agitator rotates. In at least example, the projections 4920 may be spaced apart from the cleaning edge 4906 to mitigate potential of the projections 4920 scratching hard (e.g., wooden) floors.

Figure 52:
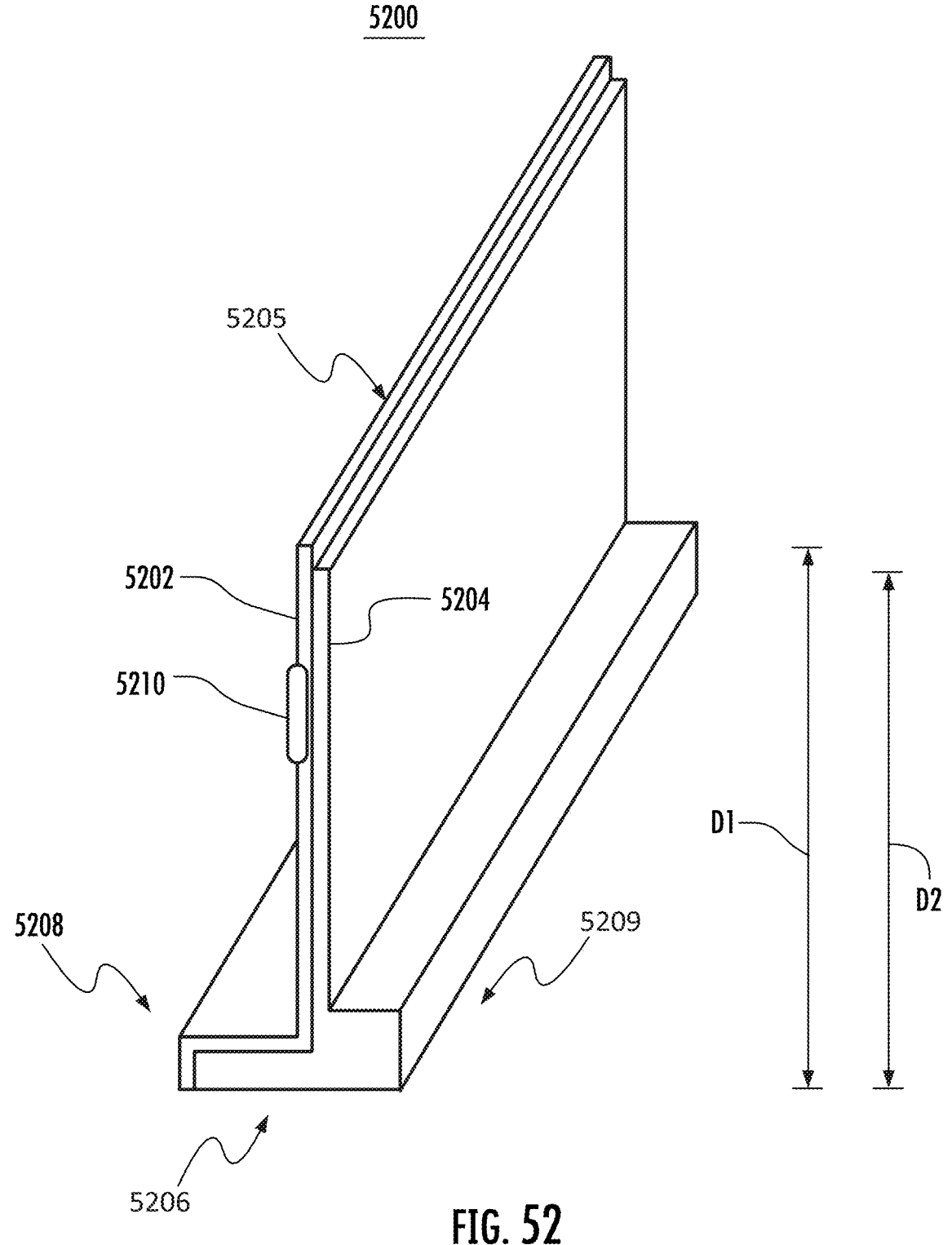
FIG. 52 generally shows a cross-sectional view of another embodiment of a resiliently deformable flap, consistent with the present disclosure.

With reference to FIG. 52, a cross-sectional view of another example of a resiliently deformable flap consistent with FIGS. 49-50 is generally illustrated. The resiliently deformable flap 5200 may include two or more layers. For example, the resiliently deformable flap 5200 may include a facing layer 5202 and a backing layer 5204. As used herein, the facing layer 5202 defines the front face (e.g., the facing layer 5202 faces the rotation direction when the flap 5200 is secured to an agitator and the agitator is rotating about its rotation axis during cleaning) and backing layer 5204 defines the rear face (e.g., the backing layer 5204 is the opposite surface of the flap 5200 and is generally opposite the facing layer 5202). The facing layer 5202 may be configured to provide toughness/durability to the resiliently deformable flap 5200 while the backing layer 5204 may be configured to resilience and support for the facing layer 5202. In at least one example, the facing layer 5202 may include a fabric (such as, but not limited to, woven or non-woven polyester fabric) and the backing layer 5204 may include an elastomer (such as, but not limited to, silicone and/or rubber). It should be appreciated that the flap 5200 may include additional layers between facing layer 5202 and the backing layer 5204. Moreover, the flap 5200 may include only a single layer.

The facing layer 5202 and the backing layer 5204 may be coupled together. For example, the facing layer 5202 and the backing layer 5204 may be bonded together, welded together, adhered together, or the like. In at least some examples, the facing layer 5202 and the backing layer 5204 may be co-molded or overmolded together.

In the illustrated example, the facing layer 5202 and the backing layer 5204 may both form at least a portion of the base 5206 of the flap 5200. The backing layer 5204 may extend across both a front portion 5208 and a rear portion 5209 of the base 5206 while the facing layer 5202 may extend across only a front portion 5208 of the base 5206. It should be appreciated, however, that the base 5206 may be formed from only the facing layer 5202, only the backing layer 5204, or from an entirely different layer (e.g., the base 5206 may not be formed from either the facing layer 5202 or the backing layer 5204).

In the illustrated example, the facing layer 5202 extends radially outwardly further than the backing layer 5204 when the flap 5200 is mounted to the agitator. For example, the facing layer 5202 may extend away from the base 5206 a distance D1 that is further than distance D2 of the backing layer 5204. As such, the distal most end of the facing layer 5202 may be configured to come into contact with the surface to be cleaned whereas the backing layer 5204 may generally not contact the surface to be cleaned. This configuration may be beneficial since the facing layer 5202 may be more durable/wear resistance compared to the backing layer 5204. The cleaning edge 5205 of the flap 5200 may form a selvedge which further enhances the durability/wear resistance of the facing layer 5202.

In one example, the plurality of projections 5210 may be formed in and/or by only the facing layer 5202. In other examples, the plurality of projections 5210 may extend into the facing layer 5202 but may not extend into the backing layer 5204. The plurality of projections 5210 may therefore extend into the facing layer 5202 and optionally any layers between the facing layer 5202 and the backing layer 5204. In yet other examples, the plurality of projections 5210 may be formed by and/or from at least a portion of both the facing layer 5202 as well as the backing layer 5204 (and optionally any layers therebetween).

Figure 53:
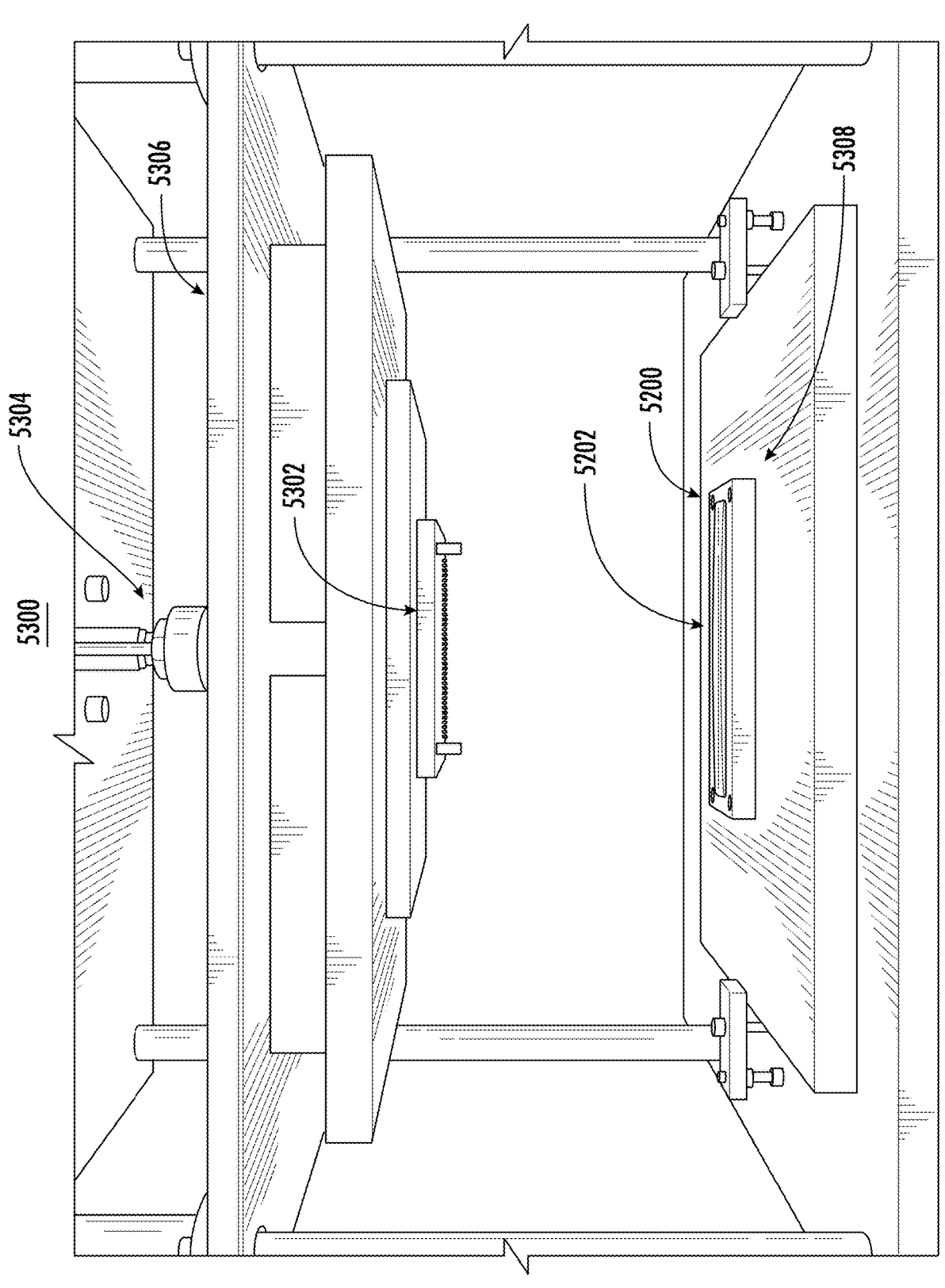
FIG. 53 generally shows a heat stacking machine/process, consistent with the present disclosure.
Figure 54:
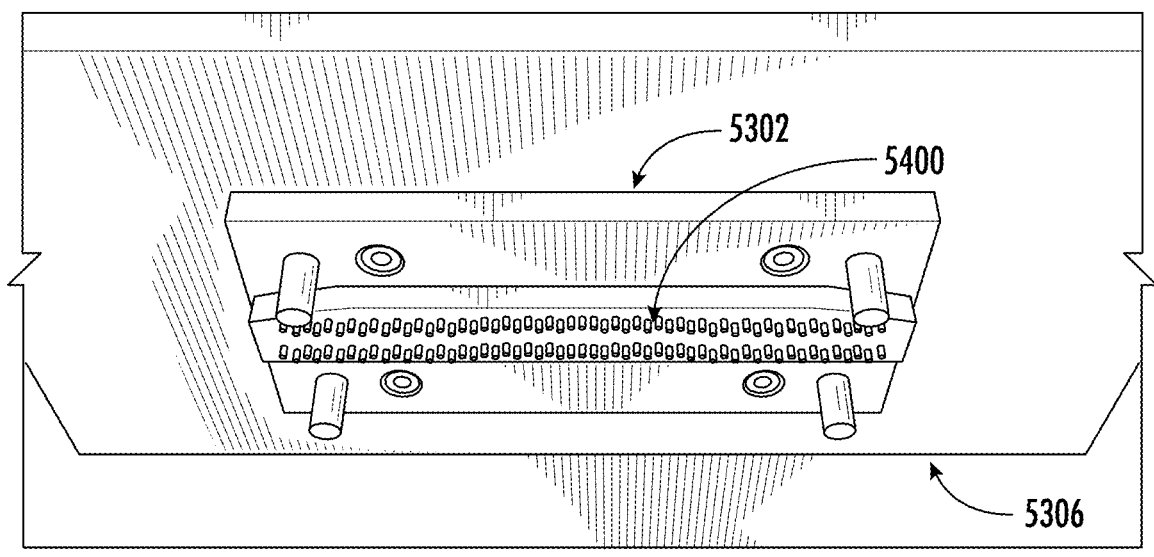
FIG. 54 generally shows a hot melt head consistent with one example of the heat stacking machine/process of FIG. 53.
Figure 55:
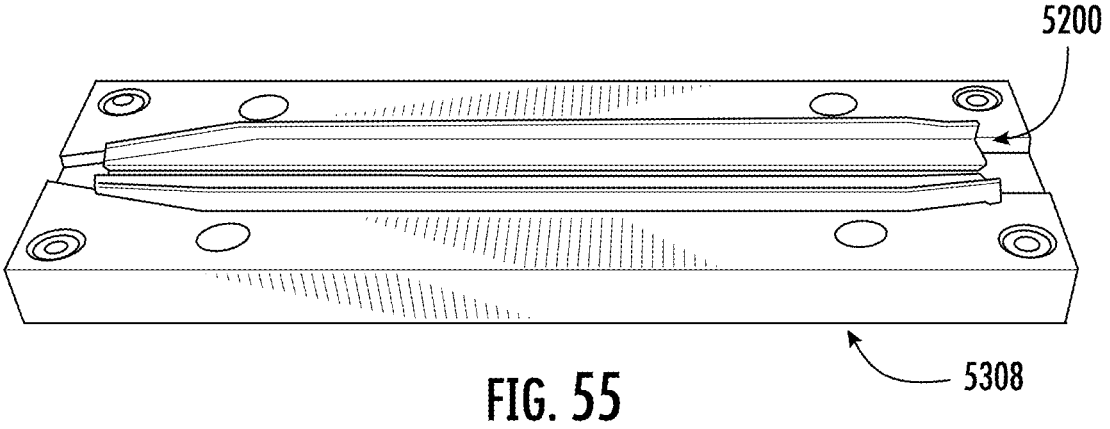
FIG. 55 generally shows a backing plate and resiliently deformable flap consistent with one example of the heat stacking machine/process of FIG. 53.
Figure 56:
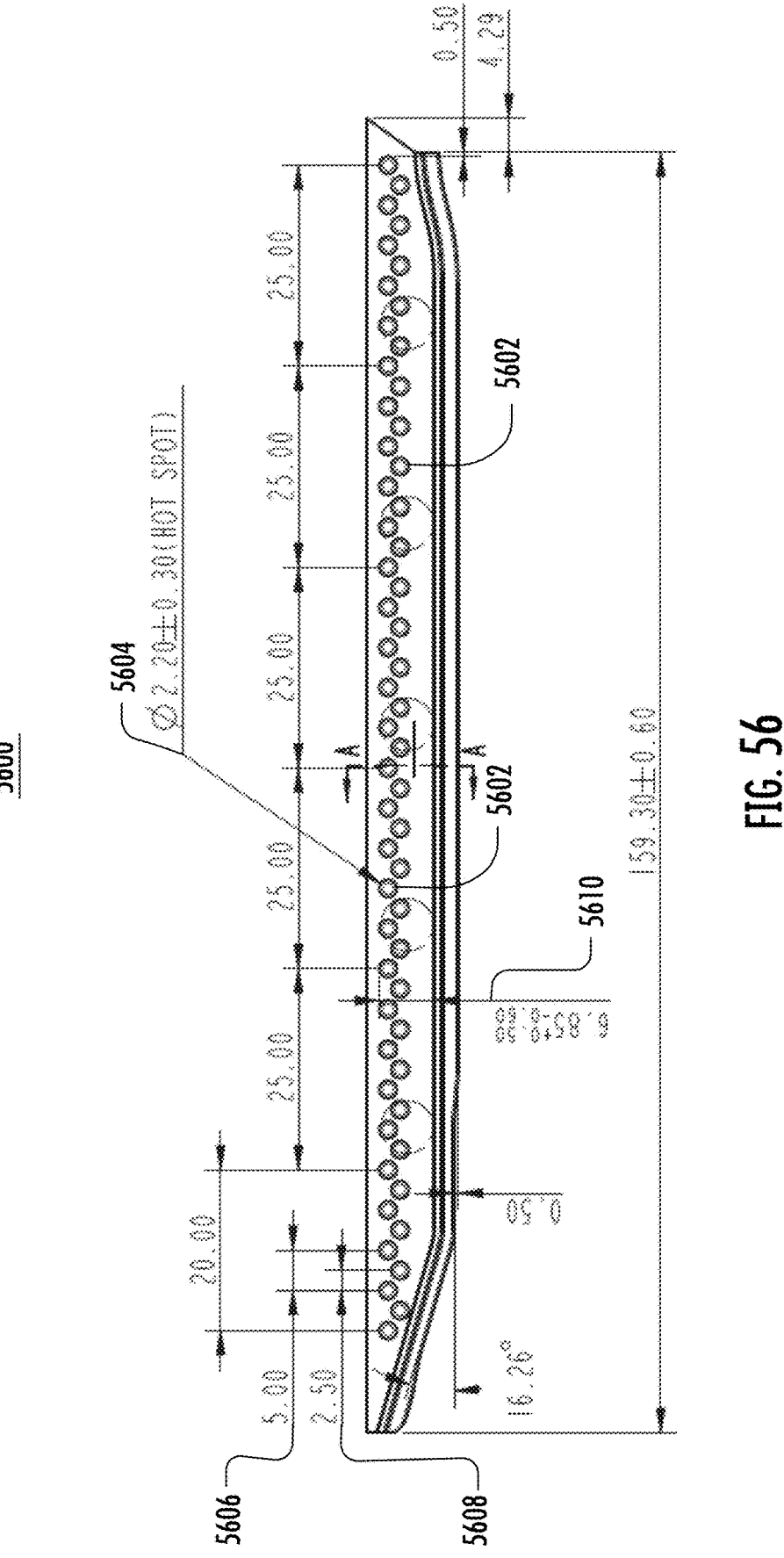
FIG. 56 generally various dimensions of one example of a resiliently deformable flap consistent with the present disclosure.
Figure 57:
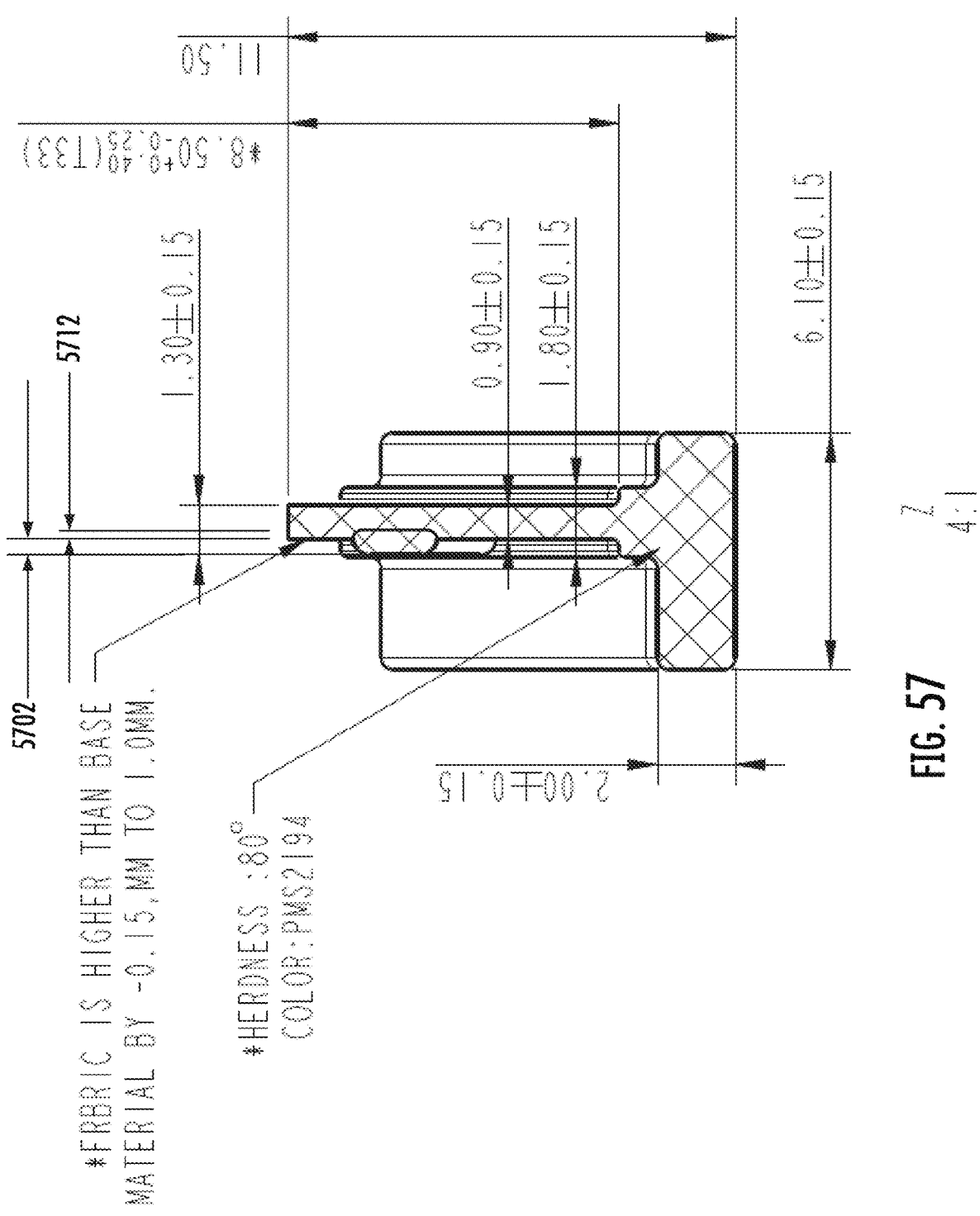
FIG. 57 generally various dimensions of the resiliently deformable flap of FIG. 56.
Figure 58:
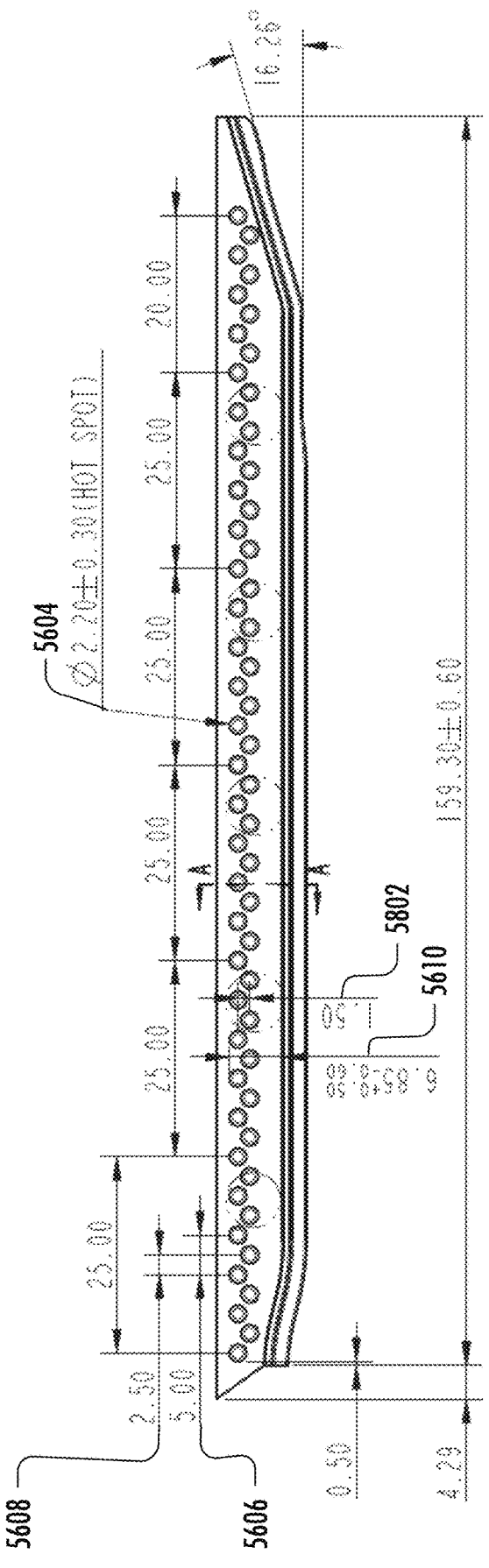
FIG. 58 generally various dimensions of one example of a resiliently deformable flap consistent with the present disclosure.
Figure 58:
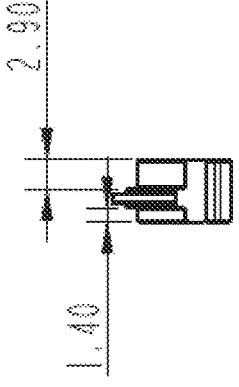
Figure 59:
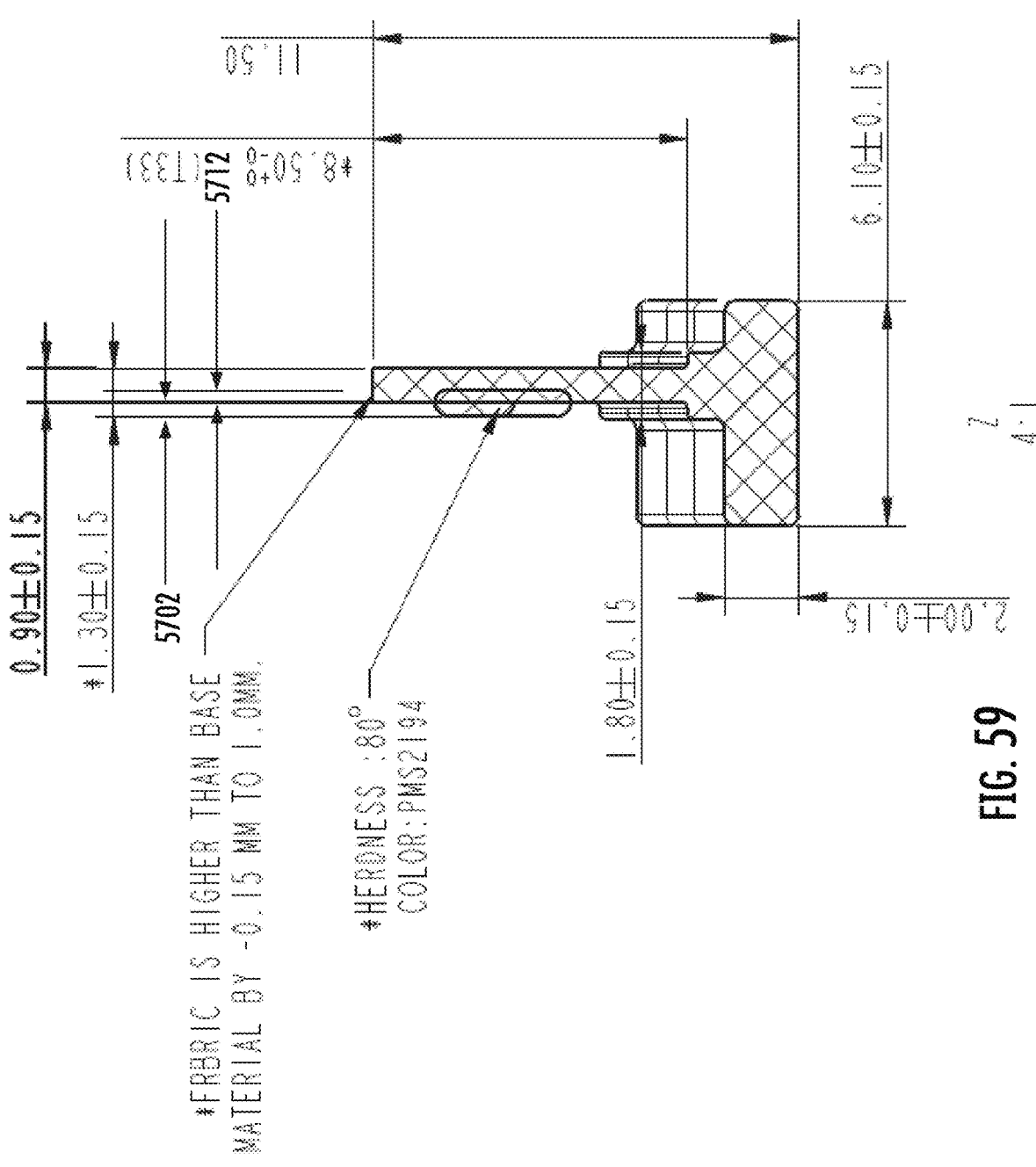
FIG. 59 generally various dimensions of the resiliently deformable flap of FIG. 57.

Regardless, the plurality of projections 5210 may be formed by heat staking 5300 as generally illustrated in FIG. 53. For example, a hot melt head 5302 (FIGS. 53-54) may be pressed onto and/or into the facing layer 5202 of the flap 5200 (and optionally the backing layer 5204 and/or any other layers) using a press 5304 (e.g., a hydraulic press, pneumatic press, or the like having upper and/or lower plates 5306, 5308). As the hot melt head 5302 is urged against the flap 5200, the hot melt head 5302 may be configured to melt a portion of the facing layer 5202 (e.g., but not limited to, melting the polyester fabric) of the flap 5200 to form the plurality of projections 5210. As the facing layer 5202 melts, a portion of the melted facing layer 5202 flows away from the facing layer 5202 to form the raised portion 4922. This displaced portion of the melted facing layer 5202 also forms the recessed portion 4924. The hot melt head 5302 may be configured to melt only the facing layer 5202 (thereby leaving the backing layer 5204 intact). The hot melt head 5302 may also be configured to melt any additional layers (also referred to as intermediate layers) between the facing layer 5202 and the backing layer 5204. The additional layers between the facing layer 5202 and the backing layer 5204 may form all or a portion of the plurality of projections 5210. The hot melt head 5302 may also be configured to melt the backing layer 5204 in which case the backing layer 5204 may optionally form all or a portion of the plurality of projections 5210. Additional hot melt heads may also be provided, for example, to melt the backing layer 5204.

The plurality of projections 5210 may optionally form a hardened polyester plastic projection. Due to the plurality of projections 5210 being formed from the facing layer 5202), a "1-piece" construction between the facing layer 5202 and the plurality of projections 5210 increases adherence between the plurality of projections 5210 and the facing layer 5202. The localized hardened projections may increase agitation without impacting hair migration or hair wrap. The localized hardened projections may also provide high durability to survive wear over the product lifespan vs features made from compliant materials. The plurality of projections 5210 may also form a plurality of microscopic hooks that facilitate pick up of hair or debris, and in particular, pet hair. As may be appreciated, flaps on agitators typically do not do much for hair pickup, and agitators often include bristles (e.g., bristle strips and/or bristle tufts) to improve hair pickup.

Turning now to FIGS. 56-59, various exemplary dimensions of embodiments of a resiliently deformable flap 5600 including a plurality of projections 5602 consistent with FIGS. 49-55 are generally illustrated. One or more of the projections 5602 may have an outer diameter of annulus 5604 (see, e.g., FIGS. 56 and 58) of 2.20 mm+/−0.30 mm. This range of the outer diameter of annulus 5604 may ensure that the facing layer (e.g., the fabric) remains between projections/burns to retain life/durability of flaps 5600.

One or more of the projections 5602 may have a thickness of 3D burn projection 5702 (see, e.g., FIGS. 57 and 59) of 0.40 mm+/−0.15 mm. The thickness of 3D burn projection 5702 may also be referred to as the distance that the raise raised portion 5704 of the projection 5602 extends away from the exterior surface of the facing layer. This thickness range of the 3D burn projection 5702 is configured to provide enough height of the projection 5602 to effectively grab pet hair from carpet while not being so tall that the projection 5602 become fragile or lock onto debris.

One or more of the projections 5602 may have a projection center to center distance 5606 of 5.00 mm+/−1.5 mm in same row and an offset 5608 of 2.5 mm+/−1.5 mm left-right between adjacent rows (e.g., but not limited to, between first and second rows). These ranges may ensure that the facing layer (e.g., the fabric) remains between melts/burns to retain life/durability of flaps 5600 while also achieving 100% (or substantially 100%) coverage width.

One or more of the projections 5602 may have a projection center to center distance between rows of projections 5802 (FIG. 58) of 1.50+/−1.0 mm. This range of the projection center to center distance between rows of projections 5802 may ensure that the facing layer (e.g., fabric) remains between burns to retain life/durability of flaps 5600 while also keeping the second row of projections closer to fin tip/cleaning edge to increase pet hair pickup effectiveness.

One or more of the projections 5602 may have a distance from projection nearest to fin tip/cleaning edge to the fin base 5610 of 6.85 mm+0.50/−0.60 mm. This range of distance from projection nearest to fin tip/cleaning edge to the fin base 5610 is configured to provide 6 sigma tolerance stack that projections 5602 will not scratch bare floors. The projections in the first row (i.e., the row or projections furthest away from the base) may be 1.75 mm+0.50/−0.60 mm.

One or more of the projections 5602 may have a depth of central recessed portion (e.g., "crater") 5712 (see, e.g., FIGS. 57 and 59) of 0.2 mm+/−0.1 mm into facing layer (e.g., fabric surface). This depth of central recessed portion 5712 may be set by downward press of heat staking machine 5300 so hot head pins 5400 will not pierce through the facing layer (e.g., fabric). This range also may be configured to retain life/durability while providing enough displaced molten polyester to form the projections (e.g., burn annulus).

The projections 5602 may be formed using by heat staking 530, e.g., using a hot melt head 5302 having a temperature and time for of approximately 300-400 degrees Celsius for 1-2 seconds. In at least one example, the temperature used was 399 degrees Celsius for 1 second. The temperature of 399 degrees Celsius may produce a rapid deflection of molten material to provide a semi-smooth projection/burn annulus with the desired height. The time of 1 second may allow material to form a projection/burn annulus without becoming brittle or easy to break. The temperature should be hot enough to effectively melt the facing layer (e.g., polyester) without damaging other layers (e.g., the backing layer). Lower temperatures may lead to more dragging of molten debris which may create more fragile projections and increased risk of hair wrap. Increasing melt time past 2 seconds may make the projections more fragile and material can be easily removed from the flap 5200 as it sticks to the hot head fixture 5300.

It should be appreciated that the values and ranges described herein are for exemplary purposed only and are not a limitation of the present disclosure unless specifically claimed. The number and placement of the plurality of projections may vary depending on the application. For example, the plurality of projections may not be arranged in rows, the spacing between adjacent projections may be varied, and the size of the plurality of projections may be varied.

Figure 60:
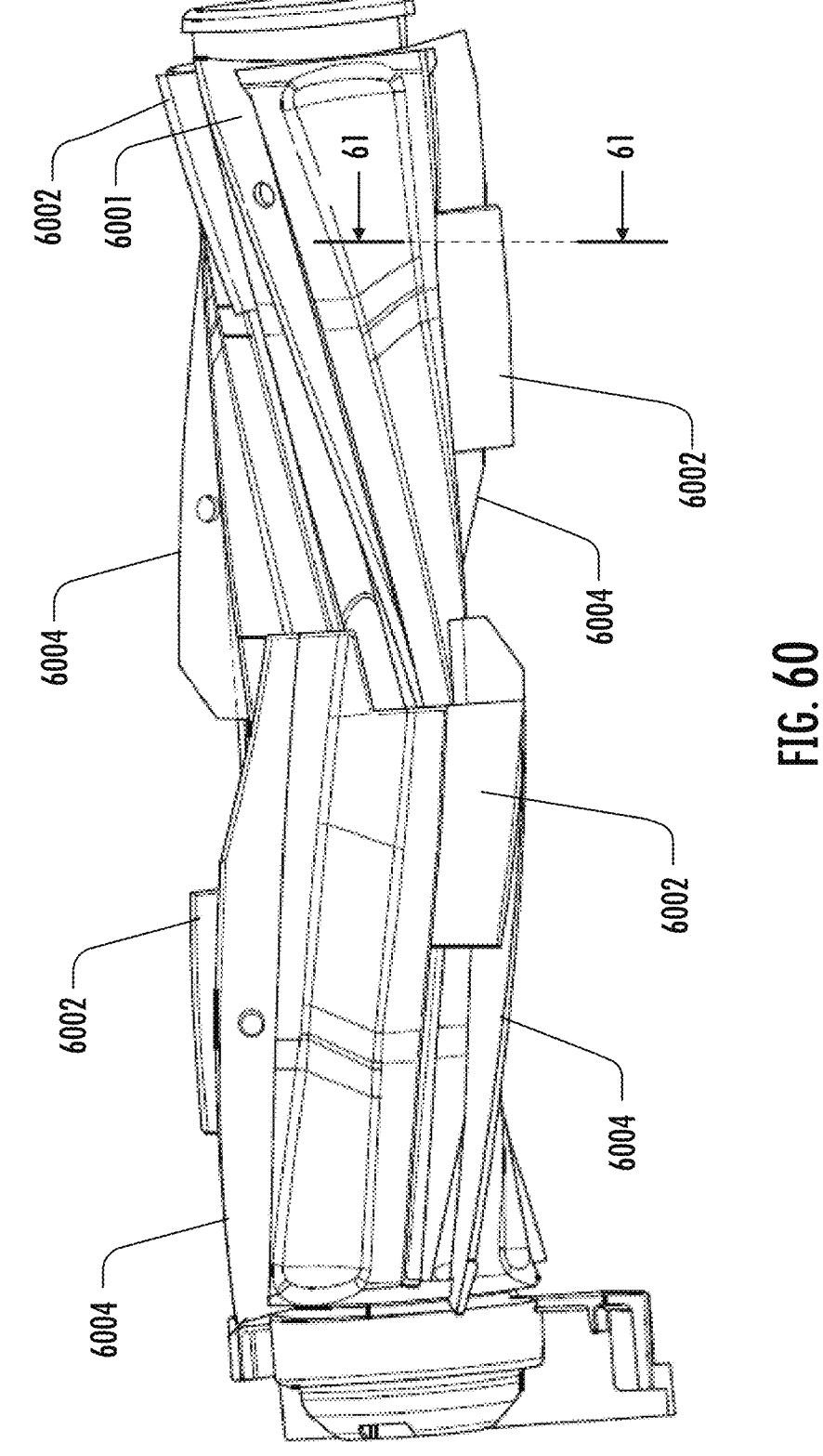
FIG. 60 generally shows a perspective view of an example of an agitator having a body and a plurality of bristle strips and/or a plurality of tufts consistent with the present disclosure.

FIG. 60 shows a perspective view of an example of an agitator 6000 having a body 6001 and a plurality of bristle strips and/or a plurality of tufts 6002. The agitator 6000 may optionally include one or more deformable flaps 6004. The deformable flaps 6004 may include any sidewall or deformable flap described herein.

The plurality of bristle strips and/or a plurality of tufts 6002 arranged in one or more rows 6006. The rows may extend along and generally parallel to at least a portion of a corresponding deformable flap 6004 (e.g., the separation distance between a deformable flap 6004 and an adjacent bristle strip and/or row of tufts 6002 may be deviate less than 10% along the coextensive portions thereof, for example, less than 5% or less than 2%). As shown, a length of the bristle strips and/or rows of tufts 6002 measures less than a length of a corresponding deformable flap 6004. In other words, the bristles strips and/or rows of tufts 6002 extend along only a portion of a corresponding deformable flap 6004. For example, a measure of a length of a bristle strip and/or row of tufts 6002 may be less than half of a measure of a length of a corresponding deformable flap 6004. It should be appreciated, however, that the bristle strips and/or rows of tufts 6002 may have a length equal to or greater than the corresponding deformable flap 6004. In some examples, the bristle strips and/or rows of tufts 6002 may extend substantially from a first lateral end 6006 of the body 6001 of the agitator 6000 to substantially the second lateral end 6005 of the body 6001 of the agitator 6000.

One or more of the bristle strips and/or rows of tufts 6002 may be arranged in front of a corresponding deformable flap 6004 (e.g., from a rotational perspective, the bristle strip and/or row of tufts 6002 contact the surface to be cleaned prior to the corresponding deformable flap 6004 immediately adjacent to the bristle strip and/or row of tufts 6002 as the agitator rotates during cleaning). Alternatively (or in addition), one or more of the bristle strips and/or rows of tufts 6002 may be arranged behind a corresponding deformable flap 6004 (e.g., from a rotational perspective, the bristle strip and/or row of tufts 6002 contact the surface to be cleaned after the corresponding deformable flap 6004 immediately adjacent to the bristle strip and/or row of tufts 6002 as the agitator rotates during cleaning). Again, it should be appreciated that the bristle strip and/or row of tufts 6002 does not need to be used in combination with deformable flaps 6004.

Figure 61:
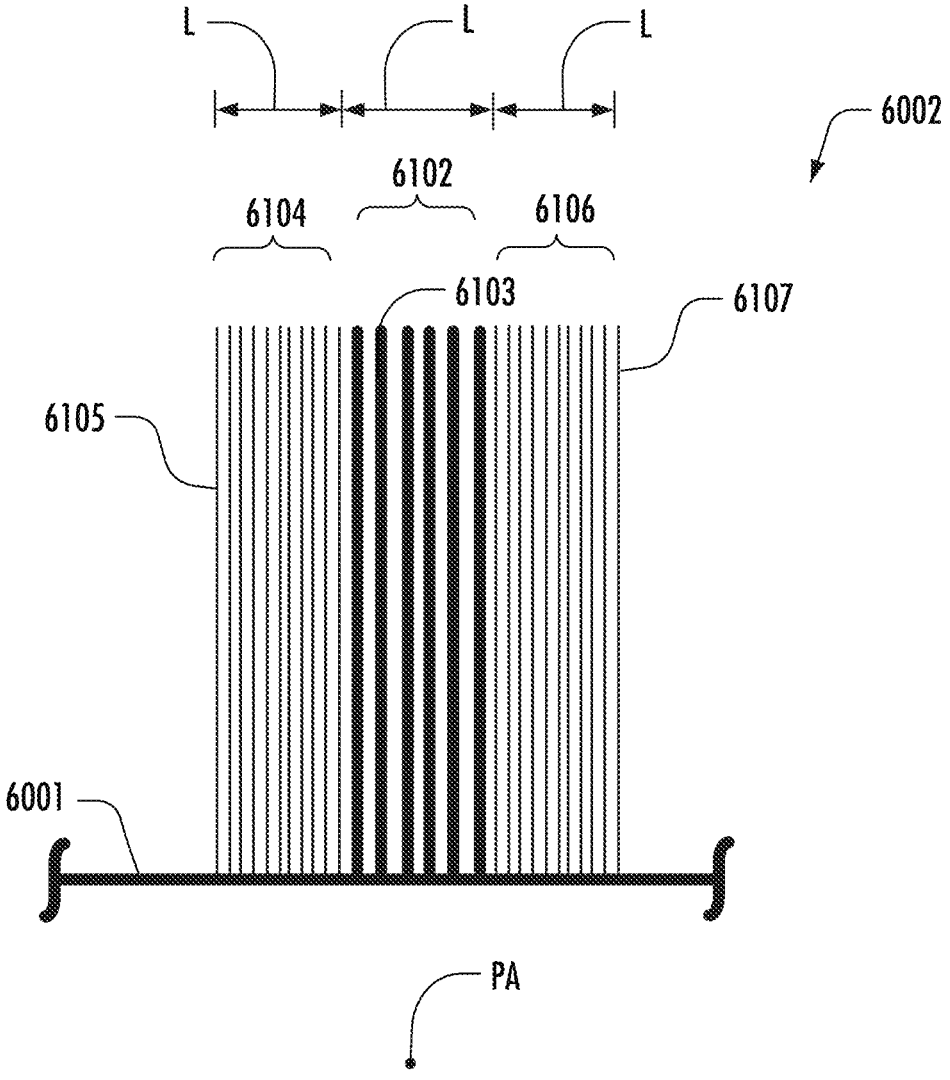
FIG. 61 generally shows a cross-sectional view of the body and the plurality of bristle strips and/or plurality of tufts of FIG. 60.

Turning now to FIG. 61, a cross-section of one example of a bristle strips and/or rows of tufts 6002 is generally illustrated. The bristle strips and/or rows of tufts 6002 may generally extend between the first and second opposite lateral ends of the agitator body 6001 (e.g., generally left and right relative to the pivot axis PA). The bristle strips and/or rows of tufts 6002 may extend substantially entirely between the first and second lateral ends of the body 6001 (e.g., entirely left and right across the body 6001) and/or extend partially between the first and second lateral ends of the body 6001 (e.g., partially left and right across the body 6001). In some examples, the bristle strips and/or rows of tufts 6002 may extend partially or entirely helically across (e.g., left and right) all or a portion of the body 6001. Alternatively (or in addition), the bristle strips and/or rows of tufts 6002 may extend partially or entirely generally linearly across (e.g., left and right) all or a portion of the body 6001. The bristle strips and/or rows of tufts 6002 may cover up between 75% and 100% of the exterior surface of the body 6001, for example, between 50% and 75% of the exterior surface of the body 6001, between 40% and 50% of the exterior surface of the body 6001, between 30% to 40% of the exterior surface of the body 6001, between 20% and 30% of the exterior surface of the body 6001, between 10% and 20% of the exterior surface of the body 6001, between 5% and 10% of the exterior surface of the body 6001, and/or between 1% and 5% of the exterior surface of the body 6001, including all ranges and values therein.

The bristle strips and/or rows of tufts 6002 includes a first bristle group 6102 including a plurality of nylon bristles 6103 and at least a second bristle group 6104 including a plurality of para-aramid (e.g., Kevlar™) bristles 6105. The bristle strips and/or rows of tufts 6002 may optionally include one or more third bristle groups 6106 including a plurality of para-aramid (e.g., Kevlar™) bristles 6107. One or more of the third bristle groups 6106 may be similar to the second bristle group 6104. The second and third bristle groups 6104, 6106 may have bristles formed by a common filament (e.g., a single filament may form a "U" or "V" shape with the base or middle section secured to the body 6001 and the other portions of the "U" or "V" shape forming the bristles in the second and third bristle groups 6104, 6106). The bristle strips and/or rows of tufts 6002 may optionally include one or more fourth first bristle groups (not shown) including a plurality of nylon bristles which may be similar to the first bristle group 6102.

The first bristle group 6102 may extend across along all or one or more portions of the bristle strip 6002. The second bristle group 6104 may extend across along all or one or more portions of the bristle strip 6002. In some examples, the second bristle group 6104 may extend across coextensively with the first bristle group 6102 (e.g., the second bristle group 6104 and the first bristle group 6102 may have the same length and/or may begin/end at the same locations on the body 6001). In other examples, the length of the second bristle group 6104 may be longer and/or shorter than the length of the first bristle group 6102 (e.g., the second bristle group 6104 may begin and/or end at the different locations on the body 6001 than the first bristle group 6102). In at least one example, the second bristle group 6104 may circumscribe the first bristle group 6102. The second bristle group 6104 may partially circumscribe the first bristle group 6102, for example, the second bristle group 6104 may around 50% of the first bristle group 6102, around 60% of the first bristle group 6102, around 70% of the first bristle group 6102, around 80% of the first bristle group 6102, or around 90% of the first bristle group 6102. Alternatively, the first bristle group 6102 may circumscribe the second bristle group 6104. The first bristle group 6102 may partially circumscribe the second bristle group 6104, for example, the first bristle group 6102 may around 50% of the second bristle group 6104, around 60% of the second bristle group 6104, around 70% of the second bristle group 6104, around 80% of the second bristle group 6104, or around 90% of the second bristle group 6104. As noted above, one or more of the third bristle groups 6106 may be similar to the second bristle group 6104.

The second bristle group 6104 may be disposed substantially adjacent to the first bristle group 6102. At least a portion (e.g., all) of the second bristle group 6104 may be disposed in front of the first bristle group 6102 (i.e., the second bristle group 6104 may contact the surface to be cleaned prior to the first bristle group 6102 as the agitator rotates about the pivot axis PA during cleaning). Arranging at least a portion (e.g., all) of the second bristle group 6104 in front of the first bristle group 6102 may reduce the roughness and/or sharpness of the bristle strips and/or rows of tufts 6002 as the agitator rotates during cleaning. It should be appreciated that the bristles of the first, second, and/or third bristle groups 6102, 6104, 6106 may be angled. As such, the distal ends of some of the bristles in any of the first, second, and/or third bristle groups 6102, 6104, 6106 may be disposed in front and/or behind bristles of another one of the first, second, and/or third bristle groups 6102, 6104, 6106. In some examples, the relative positions of the first, second, and/or third bristle groups 6102, 6104, 6106 may be described in terms of the relative positions of the bases of the bristles (i.e., the portion of the bristles extend immediately from the body 6001) within the first, second, and/or third bristle groups 6102, 6104, 6106. The second and third bristle groups 6404, 6106 may be disposed on generally opposite sides of the first bristle group 6102. At least a portion (e.g., all) of the third bristle group 6106 may be disposed behind the first bristle group 6102 (i.e., the third bristle group 6106 may contact the surface to be cleaned after the first bristle group 6102 as the agitator rotates about the pivot axis PA during cleaning). In some examples, the second and/or third bristle groups 6104, 6106 may contact the first bristle group 6102.

The parameters of the first bristle group 6102 and second bristle group 6104 may vary depending on the intended application. The following examples are provided for explanation purposes and are not limitations of the present disclosure unless specifically claimed as such. The first bristle group 6102 may have a filament (bristle) density of 240 fil/cm (±10%) (as measured as the base of the first bristle group 6102 proximate the body 6001). The first bristle group 6102 may have a filament (bristle) diameter of 0.1 mm (±0.015 mm). The height of the first bristle group 6102 (i.e., the distance generally perpendicular to the rotation axis of the agitator away from the base 6001) may be 10.3 mm (±0.25 mm). The length of the first bristle group 6102 (i.e., the distance measured generally between the lateral ends of the agitator) may be 95.7 mm (±0.5 mm). The width of the first bristle group 6102 (i.e., the distance measured generally front to back between the lateral ends of the agitator at the base of the first bristle group 6102 proximate the body 6001) may be 0.5 mm (±1 mm).

The second bristle group 6104 may have a filament (bristle) density of 11952 fil/cm (±10%) (as measured as the base of the second bristle group 6104 proximate the body 6001). The second bristle group 6104 may have a filament (bristle) diameter of 0.02 mm (±0.01 mm). The height of the second bristle group 6104 (i.e., the distance generally perpendicular to the rotation axis of the agitator away from the base 6001) may be 10.3 mm (±0.25 mm). The height of the second bristle group 6104 may be the same as the height of the first bristle group 6102. The height of the second bristle group 6104 may be longer than the height of the first bristle group 6102. The height of the second bristle group 6104 may be shorter than the height of the first bristle group 6102. The length of the second bristle group 6104 (i.e., the distance measured generally between the lateral ends of the agitator) may be 95.7 mm (±0.5 mm). The width of the second bristle group 6104 (i.e., the distance measured generally front to back between the lateral ends of the agitator at the base of the second bristle group 6104 proximate the body 6001) may be 0.5 mm (±1 mm).

The third bristle group 6106 may have a filament (bristle) density of 11952 fil/cm (±10%) (as measured as the base of the third bristle group 6106 proximate the body 6001). The third bristle group 6106 may have a filament (bristle) diameter of 0.02 mm (±0.01 mm). The height of the third bristle group 6106 (i.e., the distance generally perpendicular to the rotation axis of the agitator away from the base 6001) may be 10.3 mm (±0.25 mm). The length of the third bristle group 6106 (i.e., the distance measured generally between the lateral ends of the agitator) may be 95.7 mm (±0.5 mm). The width of the third bristle group 6106 (i.e., the distance measured generally front to back between the lateral ends of the agitator at the base of the third bristle group 6106 proximate the body 6001) may be 0.5 mm (±1 mm).

Testing was performed using four different agitators including three different nylon bristle agitators (BR1, BR2, BR3) and one Kevlar agitator (BR4) using a brush roll isolation rig. BR1 included Nylon bristles only (480 fil/cm^2 density) having 0.1 mm filament diameter. BR2 included Nylon bristles only (72 fil/cm^2 density) having 0.2 mm filament diameter. BR3 included Nylon bristles only (1450 fil/cm^2 density) having 0.04 mm filament diameter. BR4 included Kevlar bristles only (11952 fil/cm^2 density) having 0.02 mm filament diameter. The flaps were removed from all the brush rolls (i.e., bristles only). Time-domain sound pressure data was recorded with ¼ condenser microphone placed 20 cm from the brush roll central axis. RPM was kept low so that the motor noise did not confound data and was monitored with an optical tachometer to keep consistency between tests. Power spectral density, sharpness, and roughness of the time-domain data was computed.

Figure 62:
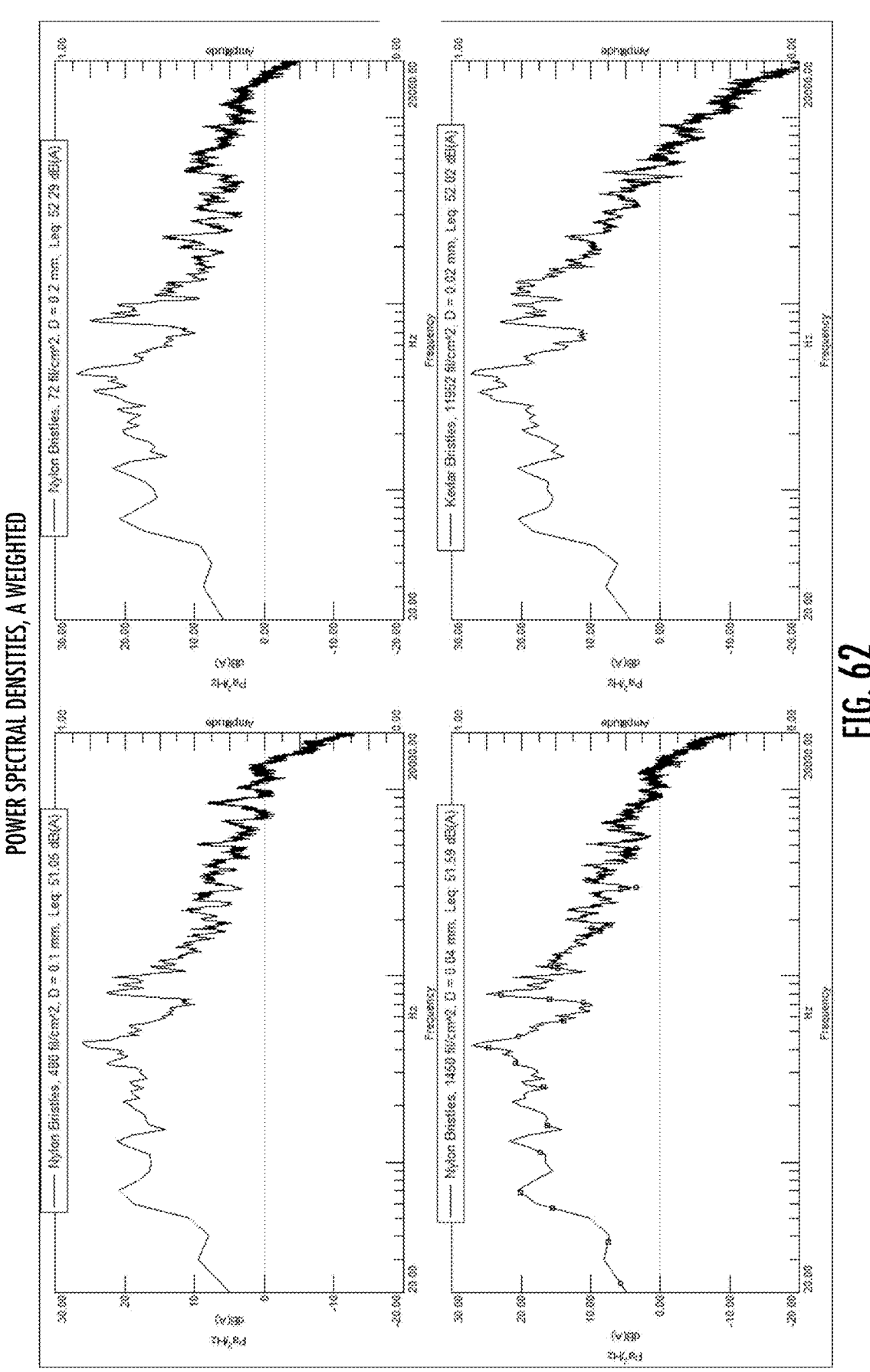
FIG. 62 generally shows exemplary testing of power spectral densities.
Figure 63:
FIG. 63 generally shows exemplary testing of psychoacoustics over time.

The results of the testing (see, e.g., FIGS. 62-63) indicated that the Kevlar bristles did not affect the overall sound pressure level of the brush rolls and that all four brush rolls were similar in level. The Kevlar bristles significantly reduced the roughness of the brush roll. Every time the brush roll spins, each row of bristles contacts the floor once (e.g., 4 rows=4 times total). This contact is believed to create a pressure wave which increases the overall amplitude of the brush roll's pressure. The varying amplitude is believed to be what creates the roughness, and by using the softer material (e.g., Kevlar), this amplitude change appears less drastic. The Kevlar bristles significantly reduced the sharpness of the brush roll. Kevlar is understood to be less "scratchy" than the nylon, thereby reducing high frequency content, which is believed to be due to the smaller filament diameter (as smaller diameter nylon bristles are believed to have lower sharpness than the higher diameter nylon). By putting the Kevlar on the outside of the nylon/Kevlar sandwich (i.e., the first and second bristle groups 6102, 6104), the Kevlar (e.g., second bristle group 6104) is the contacting face of the agitator, thereby reducing the roughness and/or reducing the sharpness.

As used herein, roughness is defined as the psychoacoustic metric which describes the amount of fast amplitude modulation, i.e., it describes the quick changes in the SPL of a sound and is measured in aspers (maximum value of 1 asper). As used herein, sharpness is defined as the psychoacoustic metric which quantified the amount of high frequency content of a signal and is measured in acums. As used herein, A-Weighting is defined as a way to weight frequency domain data which scales it to more accurately represent how humans would perceive those frequencies (based on equal-loudness curves). As used herein, power spectral density is defined as how the acoustic power of a signal varies with frequency. As used herein, sound pressure level is defined as the pressure level of a sound (SPL=20*log 10(pressure/(20*10^−6))).

Figure 64:
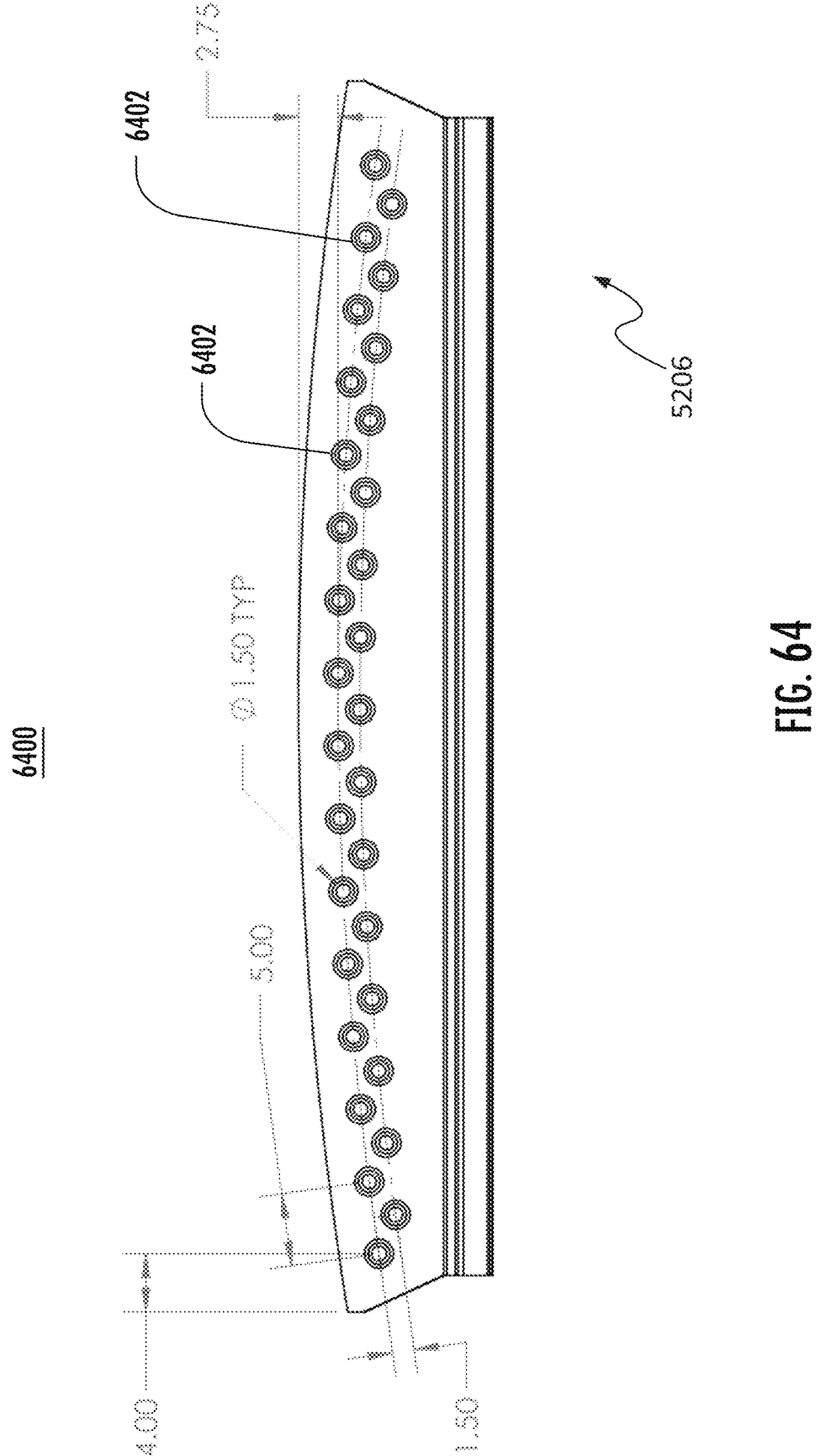
FIG. 64 generally shows one example of a resiliently deformable flap including a plurality of molded projections.

It should be appreciated that the plurality of projections may be formed by molding. With reference to FIG. 64, one example of a resiliently deformable flap 6400 including a plurality of molded projections 6402 is generally illustrated.

For example, the plurality of projections may be molded, polyurethane protrusions 6402. The plurality of projections 6402 may be molded from a flap made from entirely from plastic, e.g., entirely from polyurethane or the like. Flaps 6400 may be molded with raised projections/bumps 6402 to mimic the appearance and/or functionality of burnt dots. The molded projections 6402 may use the same spacing and distribution as burnt dots, but contoured to match the curve of the fin/flap 6400. In at least one example, the molded flap 6400 and projections 6402 may be molded using a 57A polyurethane rubber. The flap 6400 and projections 6402 may be molded completely from polyurethane.

An example of an agitator for a vacuum cleaner, consistent with the present disclosure, may include a body and at least one deformable flap extending from the body. The deformable flap may include at least one taper. The at least one taper causes a cleaning edge of the deformable flap to approach the body.

In some instances, the at least one taper may extend in an end region of the at least one deformable flap. In some instances, the at least one taper may include a first taper and a second taper, each taper extending in a corresponding end region of the deformable flap. In some instances, the first taper may have a first slope and the second taper may have a second slope, the first slope measuring differently from the second slope. In some instances, the deformable flap may comprise a woven material. In some instances, the deformable flap may include a selvedge along the cleaning edge. In some instances, the deformable flap may include a mounting edge, the mounting edge having a plurality of segments that, when mounted to the body, cause the taper to be formed within the deformable flap. In some instances, the at least one deformable flap may include a plurality of deformable flaps, each deformable flap extending helically around the body, and, wherein, a length of each deformable flap measures less than a length of the body. In some instances, each deformable flap may extend from an end region of the body to a central region of the body. In some instances, the agitator may further include at least one bristle strip, the at least one bristle strip extending substantially parallel to a corresponding deformable flap. In some instances, a length of the at least one bristle strip may measure less than a length of the corresponding deformable flap.

An example of a vacuum cleaner, consistent with the present disclosure, may include an agitator chamber including one or more ribs and an agitator disposed within the agitator chamber such that at least a portion of the agitator engages the one or more ribs. The agitator may include a body and at least one deformable flap extending from the body. The deformable flap may include at least one taper. The at least one taper causes a cleaning edge of the deformable flap to approach the body.

In some instances, the one or more ribs may be disposed at opposing distal ends of the agitator chamber. In some instances, the at least one taper may include a first taper and a second taper, the first and second tapers extending within opposing end regions of a corresponding deformable flap. In some instances, the ribs may extend from an agitator cover. In some instances, the agitator cover may be an end cap. In some instances, the agitator may further include at least one bristle strip, the at least one bristle strip extending substantially parallel to a corresponding deformable flap. In some instances, a length of the at least one bristle strip may measure less than a length of the corresponding deformable flap. In some instances, the at least one taper may include a first taper and a second taper, each taper extending in a corresponding end region of the deformable flap. In some instances, the first taper may have a first slope and the second taper may have a second slope, the first slope measuring differently from the second slope. In some instances, the body may include a taper that extends towards a central region of the body.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. It will be appreciated by a person skilled in the art that a surface cleaning apparatus and/or agitator may embody any one or more of the features contained herein and that the features may be used in any particular combination or sub-combination. Modifications and substitutions by one of ordinary skill in the art are considered to be within the scope of the present invention, which is not to be limited except by the claims.

What is claimed is:

1. An agitator for a vacuum cleaner comprising:
an agitator body; and
a resiliently deformable flap extending outwardly from the agitator body, the resiliently deformable flap including:
a front face;
a rear face; and
one or more projections extending outwardly from the front face, wherein the one or more projections includes a raised portion that extends outwardly from the front face and a recessed portion that extends inwardly from the front face;
wherein the resiliently deformable flap includes a polyester layer and a silicone layer, the polyester layer forming the front face and the silicone layer forming at least a portion of the rear face.

2. The agitator of claim 1, further comprising a first bristle strip and/or row of tufts disposed adjacent to the first deformable flap.

3. The agitator of claim 1, wherein the one or more projections includes a first plurality of projections arranged in a first row.

4. The agitator of claim 3, wherein the one or more projections includes a second plurality of projections arranged in a second row.

5. The agitator of claim 4, wherein the first row and the second row are substantially parallel to each other.

6. The agitator of claim 4, wherein the first plurality of projections in the first row are offset left-to-right relative to the second plurality of projections in the second row.

7. The agitator of claim 1, wherein the one or more projections are formed only in the polyester layer.

8. An agitator for a vacuum cleaner comprising:
an agitator body; and
a resiliently deformable flap extending outwardly from the agitator body, the resiliently deformable flap including:
a front face;
a rear face;
one or more projections extending outwardly from the front face, wherein the one or more projections includes a raised portion that extends outwardly from the front face and a recessed portion that extends inwardly from the front face; and
a facing layer coupled to a backing layer, the facing layer forming the front face and the backing layer forming the rear face.

9. The agitator of claim 8, wherein at least a portion of the facing layer is melted to at least partially form the one or more projections.

10. The agitator of claim 9, wherein the melted facing layer forms the one or more projections having a localized hardness.

11. The agitator of claim 9, wherein a portion of the melted facing layer flows away from the facing layer to form the raised portion and the recessed portion.

12. The agitator of claim 9, wherein only a portion of the facing layer is melted to form the one or more projections.

13. An agitator for a vacuum cleaner comprising:

an agitator body; and a resiliently deformable flap extending outwardly from the agitator body, the resiliently deformable flap including:

a front face;

a rear face;

one or more projections extending outwardly from the front face, wherein the one or more projections includes a raised portion that extends outwardly from the front face and a recessed portion that extends inwardly from the front face; and a facing layer coupled to a backing layer by way of one or more intermediate layers, wherein at least a portion of the intermediate layer is melted to at least partially form the one or more projections.

14. The agitator of claim 13, wherein at least a portion of the facing layer is melted to form at least a portion of the one or more projections.

15. The agitator of claim 3, wherein the first row is disposed 1.75 mm+0.50/ −0.60 mm away a cleaning edge of the resiliently deformable flap.

16. The agitator of claim 1, wherein the one or more projections include a raised portion that extends outwardly from the front face having a generally annular shape.

17. The agitator of claim 1, wherein the one or more projections include a raised portion that extends outwardly from the front face having a generally annulus shape.

18. The agitator of claim 17, wherein the one or more projections have an outer diameter of annulus of 2.20 mm+/−0.30 mm.

19. The agitator of claim 3, wherein the first plurality of projections have a projection center to center distance of 5.00 mm.

\* \* \* \* \*